United States Patent
Amano et al.

(10) Patent No.: US 8,122,072 B2
(45) Date of Patent: Feb. 21, 2012

(54) CONTENT PROVISION SYSTEM AND CONTENT PROVISION METHOD

(75) Inventors: Takashi Amano, Yokohama (JP); Shoji Kodama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 390 days.

(21) Appl. No.: 12/123,746

(22) Filed: May 20, 2008

(65) Prior Publication Data
US 2009/0248700 A1    Oct. 1, 2009

(30) Foreign Application Priority Data
Mar. 31, 2008    (JP) .................................. 2008-092733

(51) Int. Cl.
*G06F 17/00*    (2006.01)
(52) U.S. Cl. ........ 707/913; 707/916; 707/922; 707/793; 707/822
(58) Field of Classification Search .................. 707/913, 707/916, 922, 793, 822
See application file for complete search history.

(56) References Cited

U.S. PATENT DOCUMENTS
2009/0055385 A1 *    2/2009    Jeon et al. ......................... 707/5

FOREIGN PATENT DOCUMENTS
JP        2006-229707        8/2006

* cited by examiner

*Primary Examiner* — Sana Al Hashemi
(74) *Attorney, Agent, or Firm* — Brundidge & Stanger, P.C.

(57) ABSTRACT

This content provision system includes a creation unit for associating the first content data and the second content data, assigning a common content ID to the first content data and the second content data, and creating management information of all content data configured from the first content data and the second content data based on the attribute information of content data, an analysis unit for analyzing hobby information of a user based on reference information for deciding hobby information of a user, a search unit for searching content data that coincides with the analyzed hobby information of a user based on the management information of all content data, and a provision unit for providing to a user content information that coincides with hobby information of a user based on the searched content data.

6 Claims, 49 Drawing Sheets

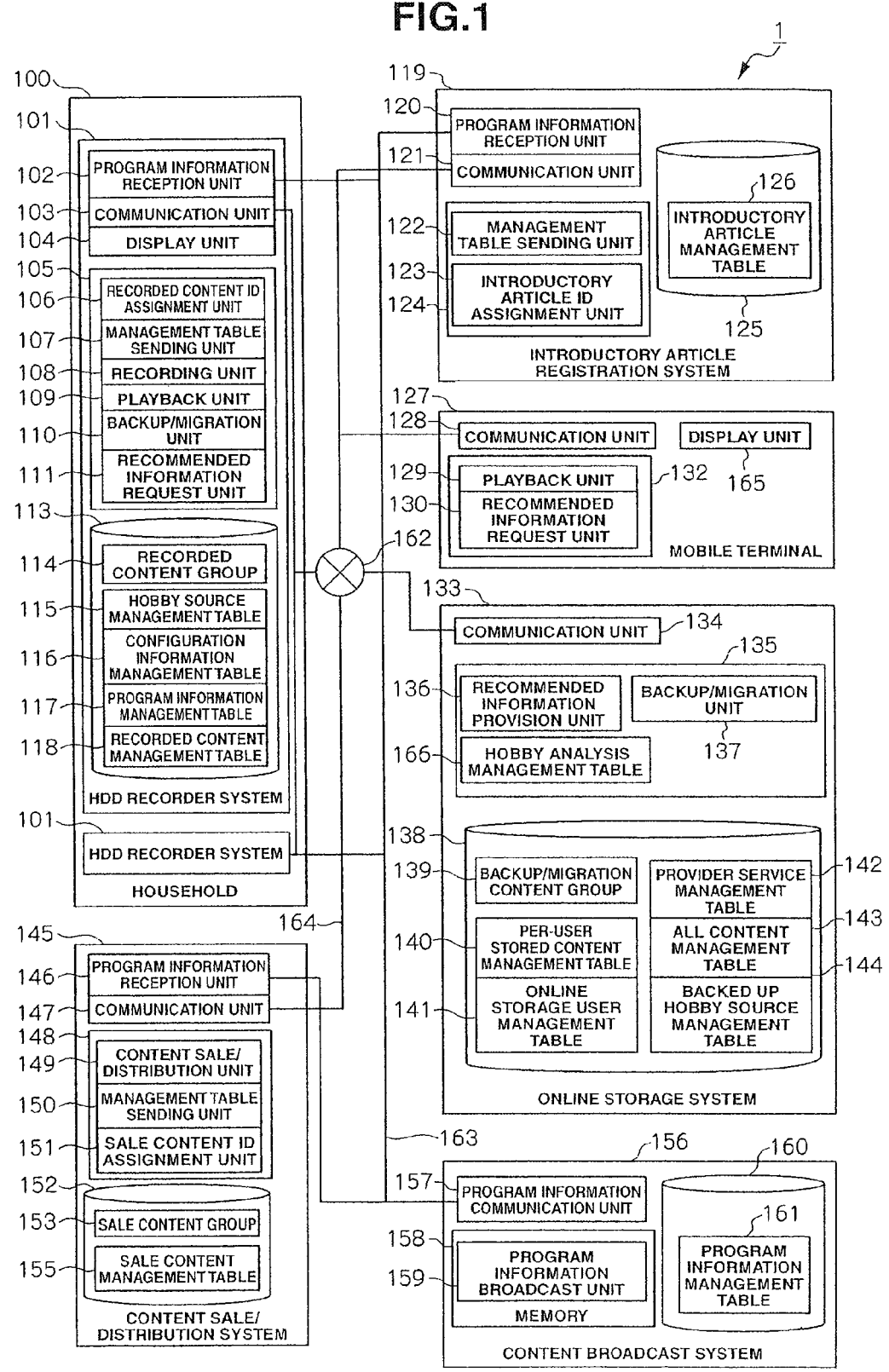

FIG.2

PROGRAM INFORMATION MANAGEMENT TABLE 161

| PROGRAM ID 200 | DATE 201 | REGION 202 | CHANNEL NUMBER 203 | BROADCAST TIME 204 | TITLE 205 | PROGRAM EXPLANATION 206 | CATEGORY 207 | CAST 208 | SERIES NAME 209 | TOTAL NUMBER OF BROADCASTS 210 | EPISODE NUMBER 211 |
|---|---|---|---|---|---|---|---|---|---|---|---|
| P_ID0 | 2008/02/01 | TOKYO | Ch1 | 00:00-01:00 | Title0 | Des0 | Gen0 | Act0, Act1 | 0 | 0 | 0 |
| ... | ... | ... | ... | ... | ... | ... | ... | ... | ... | ... | ... |
| P_ID23 | 2008/02/01 | TOKYO | Ch1 | 23:00-00:00 | Title23 | Des23 | Gen1 | Act2 | 0 | 0 | 0 |
| P_ID24 | 2008/02/01 | TOKYO | Ch2 | 00:00-01:00 | Title24 | Des24 | Gen2 | Act0 | 0 | 0 | 0 |
| ... | ... | ... | ... | ... | ... | ... | ... | ... | ... | ... | ... |
| P_ID71 | 2008/02/01 | TOKYO | Ch3 | 23:00-00:00 | Title71 | Des71 | Gen3 | Act3 | Ser0 | 5 | 1 |
| P_ID72 | 2008/02/02 | TOKYO | Ch1 | 00:00-01:00 | Title72 | Des72 | Gen3 | Act3 | Ser0 | 5 | 2 |
| ... | ... | ... | ... | ... | ... | ... | ... | ... | ... | ... | ... |
| P_ID503 | 2008/02/07 | TOKYO | Ch3 | 23:00-00:00 | Title503 | Des503 | Gen4 | Act8 | 0 | 0 | 0 |

FIG.3

| PROGRAM ID 300 | DATE 301 | REGION 302 | CHANNEL NUMBER 303 | BROADCAST TIME 304 | TITLE 305 | PROGRAM EXPLANATION 306 | CATEGORY 307 | CAST 308 | SERIES NAME 309 | TOTAL NUMBER OF BROADCASTS 310 | EPISODE NUMBER 311 |
|---|---|---|---|---|---|---|---|---|---|---|---|
| P_ID0 | 2008/02/01 | TOKYO | Ch1 | 00:00-01:00 | Title0 | Des0 | Gen0 | Act0, Act1 | 0 | 0 | 0 |
| ... | ... | ... | ... | ... | ... | ... | ... | ... | ... | ... | ... |
| P_ID23 | 2008/02/01 | TOKYO | Ch1 | 23:00-00:00 | Title23 | Des23 | Gen1 | Act2 | 0 | 0 | 0 |
| P_ID24 | 2008/02/01 | TOKYO | Ch2 | 00:00-01:00 | Title24 | Des24 | Gen2 | Act0 | 0 | 0 | 0 |
| ... | ... | ... | ... | ... | ... | ... | ... | ... | ... | ... | ... |
| P_ID71 | 2008/02/01 | TOKYO | Ch3 | 23:00-00:00 | Title71 | Des71 | Gen3 | Act3 | Ser0 | 5 | 1 |
| P_ID72 | 2008/02/02 | TOKYO | Ch1 | 00:00-01:00 | Title72 | Des72 | Gen3 | Act3 | Ser0 | 5 | 2 |
| ... | ... | ... | ... | ... | ... | ... | ... | ... | ... | ... | ... |
| P_ID503 | 2008/02/07 | TOKYO | Ch3 | 23:00-00:00 | Title503 | Des503 | Gen4 | Act8 | 0 | 0 | 0 |

PROGRAM INFORMATION MANAGEMENT TABLE 117

FIG.4

| IP ADDRESS OF ONLINE STORAGE SYSTEM | USER ID | PASSWORD | HDD RECORDER ID |
|---|---|---|---|
| XXX.168.0.100 | User0 | PW01 | H_ID0 |

400, 401, 402, 403

CONFIGURATION INFORMATION MANAGEMENT TABLE 116

FIG.5

RECORDED CONTENTS MANAGEMENT TABLE 118

| RECORDED CONTENT ID 500 | REGION 501 | CHANNEL NUMBER 502 | BROADCAST DATE AND TIME 503 | TITLE 504 | PROGRAM EXPLANATION 505 | CATEGORY 506 | CAST 507 | SERIES NAME 508 | TOTAL NUMBER OF BROADCASTS 509 | EPISODE NUMBER 510 | PLAYBACK COUNT 511 | BACKUP FLAG 512 | MIGRATION FLAG 513 | RECORDED CONTENT STORAGE LOCATION 514 |
|---|---|---|---|---|---|---|---|---|---|---|---|---|---|---|
| R_ID0 | TOKYO | Ch0 | 2008/01/01 09:00-10:00 | Title0 | Des0 | Gen0 | Act0, Act3 | 0 | 0 | 0 | 1 | 0 | 0 | Rcnt0 |
| R_ID1 | TOKYO | Ch1 | 2008/01/02 10:00-11:00 | Title1 | Des1 | Gen1 | Act2 | 0 | 0 | 0 | 1 | 0 | 1 | 0 |
| R_ID2 | TOKYO | Ch2 | 2008/01/03 13:00-14:00 | Title2 | Des2 | Gen2 | Act1 | Ser0 | 3 | 1 | 0 | 1 | 0 | Rcnt2 |
| R_ID3 | TOKYO | Ch2 | 2008/01/05 13:00-14:00 | Title4 | Des4 | Gen2 | Act1 | Ser0 | 3 | 3 | 1 | 0 | 0 | Rcnt3 |
| R_ID4 | TOKYO | Ch3 | 2008/01/05 15:00-16:00 | Title5 | Des5 | Gen3 | Act4 | 0 | 0 | 0 | 0 | 0 | 1 | 0 |

FIG.6

| HOBBY ANALYSIS INFORMATION 600 | | PLAYBACK COUNT 603 |
|---|---|---|
| CATEGORY 601 | Gen0 | 5 |
| | Gen1 | 1 |
| | ⋮ | ⋮ |
| | GenN | 0 |
| CAST 602 | Act0 | 0 |
| | Act1 | 3 |
| | ⋮ | ⋮ |
| | ActN | 2 |

HOBBY SOURCE MANAGEMENT TABLE 115

FIG.7

| 700 | 701 | 702 | 703 | 704 | 705 | 706 | 707 | 708 | 709 | 710 |
|---|---|---|---|---|---|---|---|---|---|---|
| SALE CONTENT ID | PROGRAM IDENTIFYING INFORMATION | TITLE | PROGRAM EXPLANATION | CATEGORY | CAST | SERIES NAME | TOTAL NUMBER OF BROADCASTS | EPISODE NUMBER | PRICE | SALE CONTENT STORAGE LOCATION |
| S_ID0 | (TOKYO, Ch0, 2008/01/01 09:00-10:00) | Title0 | Des0 | Gen0 | Act0, Act3 | 0 | 0 | 0 | ￥1,500 | Scnt0 |
| S_ID1 | (TOKYO, Ch1, 2008/01/02 10:00-11:00) | Title1 | Des1 | Gen1 | Act2 | 0 | 0 | 0 | ￥2,000 | Scnt1 |
| S_ID2 | (TOKYO, Ch2, 2008/01/03 13:00-14:00) | Title2 | Des2 | Gen2 | Act1 | Ser0 | 3 | 1 | ￥1,200 | Scnt2 |
| S_ID3 | (TOKYO, Ch2, 2008/01/04 13:00-14:00) | Title3 | Des3 | Gen2 | Act1 | Ser0 | 3 | 2 | ￥1,200 | Scnt3 |
| S_ID4 | (TOKYO, Ch2, 2008/01/05 13:00-14:00) | Title4 | Des4 | Gen2 | Act1 | Ser0 | 3 | 3 | ￥1,200 | Scnt4 |
| S_ID5 | (TOKYO, Ch3, 2008/01/05 15:00-16:00), (TOKYO, Ch3, 2008/01/25 18:00-19:00) | Title5 | Des5 | Gen3 | Act4 | 0 | 0 | 0 | ￥3,000 | Scnt5 |

SALE CONTENT MANAGEMENT TABLE 145

FIG. 8

| INTRODUCTORY ARTICLE ID (800) | PROGRAM IDENTIFYING INFORMATION (801) | TITLE (802) | PROGRAM EXPLANATION (803) | CATEGORY (804) | CAST (805) | SERIES NAME (806) | TOTAL NUMBER OF BROADCASTS (807) | EPISODE NUMBER (808) | HOBBY ANALYSIS INFORMATION (809) | ARTICLE DESCRIPTION (810) |
|---|---|---|---|---|---|---|---|---|---|---|
| I_ID0 | (TOKYO, Ch0, 2008/01/01 09:00-10:00) | Title0 | Des0 | Gen0 | Act0, Act3 | 0 | 0 | 0 | Gen0 | Rep0 |
| I_ID1 | (TOKYO, Ch0, 2008/01/01 09:00-10:00) | Title0 | Des0 | Gen0 | Act0, Act3 | 0 | 0 | 0 | Act0 | Rep1 |
| I_ID2 | (TOKYO, Ch0, 2008/01/01 09:00-10:00) | Title0 | Des0 | Gen0 | Act0, Act3 | 0 | 0 | 0 | Act1 | Rep2 |
| I_ID3 | (TOKYO, Ch0, 2008/01/02 10:00-11:00) | Title1 | Des1 | Gen1 | Act2 | 0 | 0 | 0 | Gen1 | Rep3 |
| I_ID4 | (TOKYO, Ch1, 2008/01/02 10:00-11:00) | Title1 | Des1 | Gen1 | Act2 | 0 | 0 | 0 | Act2 | Rep4 |
| I_ID5 | (TOKYO, Ch2, 2008/01/03 13:00-14:00) | Title2 | Des2 | Gen2 | Act1 | Ser0 | 3 | 1 | Gen2 | Rep5 |
| I_ID6 | (TOKYO, Ch2, 2008/01/03 13:00-14:00) | Title2 | Des2 | Gen2 | Act1 | Ser0 | 3 | 1 | Act1 | Rep6 |
| I_ID7 | (TOKYO, Ch2, 2008/01/04 13:00-14:00) | Title3 | Des3 | Gen2 | Act1 | Ser0 | 3 | 2 | Gen2 | Rep7 |
| I_ID8 | (TOKYO, Ch2, 2008/01/04 13:00-14:00) | Title3 | Des3 | Gen2 | Act1 | Ser0 | 3 | 2 | Act1 | Rep8 |
| I_ID9 | (TOKYO, Ch2, 2008/01/05 13:00-14:00) | Title4 | Des4 | Gen2 | Act1 | Ser0 | 3 | 3 | Gen2 | Rep9 |
| I_ID10 | (TOKYO, Ch2, 2008/01/05 13:00-14:00) | Title4 | Des4 | Gen2 | Act1 | Ser0 | 3 | 3 | Act1 | Rep10 |
| I_ID11 | (TOKYO, Ch3, 2008/01/05 15:00-16:00), (YOKOHAMA, Ch3, 2008/01/05 15:00-16:00) | Title5 | Des5 | Gen3 | Act4 | 0 | 0 | 0 | Gen3 | Rep11 |
| I_ID12 | (TOKYO, Ch3, 2008/01/05 15:00-16:00), (YOKOHAMA, Ch3, 2008/01/05 15:00-16:00) | Title5 | Des5 | Gen3 | Act4 | 0 | 0 | 0 | Act4 | Rep12 |

INTRODUCTORY ARTICLE MANAGEMENT TABLE 126

FIG.9

| 900 | 901 | 902 | 903 | 904 |
|---|---|---|---|---|
| USER ID | PASSWORD | HDD RECORDER ID | IP ADDRESS | STORAGE LOCATION OF HOBBY SOURCE MANAGEMENT TABLE |
| User0 | PW0 | H_ID0 | XXX.168.0.200 | Osrc0 |
|  |  | H_ID1 | XXX.168.0.201 | Osrc1 |
| User1 | PW1 | H_ID2 | XXX.168.0.202 | Osrc2 |

ONLINE STORAGE USER MANAGEMENT TABLE 141

FIG.10

PROVIDER SERVICE MANAGEMENT TABLE 142

| PROVIDER ID | SERVICE | IP ADDRESS |
|---|---|---|
| IP_ID0 | INTRODUCTORY ARTICLE REGISTRATION SERVICE | XXX.168.0.102 |
| CP_ID0 | CONTENT PURCHASE/SALE SERVICE | XXX.168.0.101 |
| CP_ID1 | CONTENT PURCHASE/SALE SERVICE | XXX.168.0.102 |

FIG.11

PER-USER STORED CONTENT MANAGEMENT TABLE 140

| USER ID | HDD RECORDER ID | RECORDED CONTENT ID | REGION | CHANNEL NUMBER | BROADCAST DATE AND TIME | TITLE | PROGRAM EXPLANATION | CATEGORY | CAST | SERIES NAME | TOTAL NUMBER OF BROADCASTS | EPISODE NUMBER | PLAYBACK COUNT | BACKUP FLAG | MIGRATION FLAG | RECORDED CONTENT STORAGE LOCATION | ONLINE CONTENT STORAGE LOCATION |
|---|---|---|---|---|---|---|---|---|---|---|---|---|---|---|---|---|---|
| User0 | H_ID0 | R0_ID0 | TOKYO | Ch0 | 2008/01/01 09:00-10:00 | Title0 | Des0 | Gen0 | Act0, Act3 | 0 | 0 | 0 | 1 | 0 | 0 | R0cnt0 | 0 |
|  | H_ID0 | R0_ID1 | TOKYO | Ch1 | 2008/01/02 10:00-11:00 | Title1 | Des1 | Gen1 | Act2 | 0 | 0 | 0 | 1 | 0 | 1 | R0cnt1 | Ocnt0 |
|  | H_ID0 | R0_ID2 | TOKYO | Ch2 | 2008/01/03 13:00-14:00 | Title2 | Des2 | Gen2 | Act1 | Ser0 | 3 | 1 | 0 | 1 | 1 | R0cnt2 | Ocnt1 |
|  | H_ID0 | R0_ID3 | TOKYO | Ch2 | 2008/01/05 13:00-14:00 | Title4 | Des4 | Gen2 | Act1 | Ser0 | 3 | 3 | 1 | 0 | 0 | R0cnt3 | 0 |
|  | H_ID0 | R0_ID4 | TOKYO | Ch3 | 2008/01/05 15:00-16:00 | Title5 | Des5 | Gen3 | Act4 | 0 | 0 | 0 | 0 | 0 | 1 | R0cnt4 | Ocnt2 |
|  | H_ID1 | R1_ID0 | TOKYO | Ch5 | 2008/01/05 15:00-16:00 | Title6 | Des6 | Gen5 | Act5 | 0 | 0 | 0 | 2 | 1 | 0 | R0cnt5 | 0 |
| User1 | H_ID2 | R2_ID0 | YOKOHAMA | Ch6 | 2008/01/05 17:00-19:00 | Title7 | Des7 | Gen4 | Act6 | 0 | 0 | 0 | 1 | 0 | 0 | R1cnt0 | Ocnt3 |
|  | H_ID2 | R2_ID1 | YOKOHAMA | Ch5 | 2008/01/05 15:00-16:00 | Title5 | Des5 | Gen3 | Act4 | 0 | 0 | 0 | 5 | 1 | 1 | R1cnt1 | Ocnt4 |

FIG.12

| ALL CONTENTS ID (1200) | PROVIDER ID (1201) | PROGRAM IDENTIFYING INFORMATION (1202) | TITLE (1203) | PROGRAM EXPLANATION (1204) | CATEGORY (1205) | CAST (1206) | SERIES NAME (1207) | TOTAL NUMBER OF BROADCASTS (1208) | EPISODE NUMBER (1209) | PRICE (1210) | PER-HOBBY ARTICLE DESCRIPTION (1211) |
|---|---|---|---|---|---|---|---|---|---|---|---|
| U_ID0 | CP_ID0 | (TOKYO, Ch0, 2008/01/01 09:00-10:00) | Title0 | Des0 | Gen0 | Act0, Act3 | 0 | 0 | 0 | ¥1,500 | (Gen0, Rep0), (Act0, Rep1), (Act3, Rep2) |
| U_ID1 | CP_ID0 | (TOKYO, Ch1, 2008/01/02 10:00-11:00) | Title1 | Des1 | Gen1 | Act2 | 0 | 0 | 0 | ¥2,000 | (Gen1, Rep3), (Act2, Rep4) |
| U_ID2 | CP_ID0 | (TOKYO, Ch2, 2008/01/03 13:00-14:00) | Title2 | Des2 | Gen2 | Act1 | Ser0 | 3 | 1 | ¥1,200 | (Gen2, Rep5), (Act1, Rep6) |
| U_ID3 | CP_ID0 | (TOKYO, Ch2, 2008/01/04 13:00-14:00) | Title3 | Des3 | Gen2 | Act1 | Ser0 | 3 | 2 | ¥1,200 | (Gen2, Rep7), (Act1, Rep8) |
| U_ID4 | CP_ID0 | (TOKYO, Ch2, 2008/01/04 14:00-15:00) | Title4 | Des4 | Gen2 | Act3 | Ser0 | 3 | 3 | ¥1,200 | (Gen2, Rep9), (Act3, Rep10) |
| U_ID5 | CP_ID0, CP_ID1 | (TOKYO, Ch3, 2008/01/05 15:00-16:00), (YOKOHAMA, Ch5, 2008/01/05 15:00-16:00) | Title5 | Des5 | Gen3 | Act4 | 0 | 0 | 0 | ¥3,000, ¥3,100 | (Gen3, Rep11), (Act4, Rep12), (Gen3, Rep11), (Act4, Rep12) |

ALL CONTENT MANAGEMENT TABLE 143

FIG.13

| USER ID | HOBBY ANALYSIS INFORMATION | | PLAYBACK COUNT | RANK |
|---|---|---|---|---|
| User0 | CATEGORY | Gen0 | 8 | 2 |
| | | Gen1 | 2 | 4 |
| | | ⋮ | ⋮ | ⋮ |
| | | GenN | 0 | 15 |
| | CAST | Act0 | 1 | 10 |
| | | Act1 | 10 | 1 |
| | | ⋮ | ⋮ | ⋮ |
| | | ActN | 3 | 3 |
| User1 | CATEGORY | Gen0 | 1 | 10 |
| | | Gen1 | 20 | 1 |
| | | ⋮ | ⋮ | ⋮ |
| | | GenN | 5 | 3 |
| | CAST | Act0 | 12 | 2 |
| | | Act1 | 3 | 4 |
| | | ⋮ | ⋮ | ⋮ |
| | | ActN | 0 | 20 |

1300, 1301, 1302, 1303

HOBBY ANALYSIS TABLE 166

FIG.29

```
<RECOMMENDED INFORMATION>
        <UID>U_ID2</UID>
        <PROGRAM IDENTIFYING INFORMATION>
                <REGION> TOKYO </REGION>
                <CHANNEL NUMBER> CH2 </CHANNEL NUMBER>
                <BROADCAST TIME> 2008/01/03 13:00-14:00 </BROADCAST TIME>
        </BROADCAST IDENTIFYING INFORMATION>
        </INTRODUCTORY ARTICLE>
                <INTRODUCTORY ARTICLE> REP6 </ARTICLE DESCRIPTION>
        </INTRODUCTORY ARTICLE>
        <PROGRAM ATTRIBUTE>
                <TITLE> TITLE 2 </TITLE>
                <PROGRAM EXPLANATION> DES2 </PROGRAM EXPLANATION>
                <CATEGORY> GEN2 </CATEGORY>
                <CAST> ACT1 </CAST>
                <SERIES NAME> SER0 <SERIES NAME>
                <TOTAL NUMBER OF BROADCASTS> 3 <TOTAL NUMBER OF BROADCASTS>
                <EPISODE NUMBER> 1 <EPISODE NUMBER>
        </PROGRAM ATTRIBUTE>
        <PRICE INFORMATION>
                <PRICE> <PRICE>
        <PRICE INFORMATION>

<UID>U_D3</UID>
        <PROGRAM IDENTIFYING INFORMATION>
                <REGION> TOKYO </REGION>
                <CHANNEL NUMBER> CH2 </CHANNEL NUMBER>
                <BROADCAST TIME> 2008/01/04 13:00-14:00 </BROADCAST TIME>
        </BROADCAST IDENTIFYING INFORMATION>
        </INTRODUCTORY ARTICLE>
                <INTRODUCTORY ARTICLE> REP8 </ARTICLE DESCRIPTION>
        </INTRODUCTORY ARTICLE>
        <PROGRAM ATTRIBUTE>
                <TITLE> TITLE 3 </TITLE>
                <PROGRAM EXPLANATION> DES3 </PROGRAM EXPLANATION>
                <CATEGORY> GEN2 </CATEGORY>
                <CAST> ACT1 </CAST>
                <SERIES NAME> SER0 <SERIES NAME>
                <TOTAL NUMBER OF BROADCASTS> 3 <TOTAL NUMBER OF BROADCASTS>
                <EPISODE NUMBER> 2 <EPISODE NUMBER>
        </PROGRAM ATTRIBUTE>
        <PRICE INFORMATION>
                <PRICE> \1,200 <PRICE>
              .
              .
              .
        <PRICE INFORMATION>
</RECOMMENDED INFORMATION>
```

FIG.31

| INFORMATION SOURCE ID 3100 | INFORMATION TYPE 3101 | INFORMATION SOURCE 3102 | WEIGHT 3103 | LAST ACQUISITION DATE AND TIME 3104 | USER ID 3105 | PASSWORD 3106 |
|---|---|---|---|---|---|---|
| IS_ID0 | EMAIL | C:¥mail¥data.pst | 1 | 0 | 0 | 0 |
| IS_ID1 | WEB ACCESS HISTORY | C:¥web¥history | 1 | 2008/2/01 | 0 | 0 |
| IS_ID2 | BLOG | http://wwn.hoge.blog.com/~user0/ | 1 | 2008/2/01 | 0 | 0 |
| IS_ID3 | SNS | http://wwn.hoge.sns.com/~user0/ | 100 | 0 | user001 | pass001 |
| IS_ID4 | VOICE RECORDER | E:¥voice | 1 | 2008/2/01 | 0 | 0 |

INFORMATION SOURCE MANAGEMENT TABLE 3102

EMAIL SOURCE MANAGEMENT TABLE 3015

FIG.33

| COMMUNITY ID | COMMUNITY NAME |
|---|---|
| SC_ID0 | COMEDY |
| SC_ID2 | ACTOR A |
| SC_ID3 | ARTIST A |
| SC_ID4 | ARTIST B |

SNS USER INFORMATION MANAGEMENT TABLE 3025

| COMMUNITY ID | COMMUNITY NAME | CHECK FLAG |
|---|---|---|
| SC_ID0 | COMEDY | 1 |
| SC_ID1 | SPORTS | 0 |
| SC_ID2 | ACTOR A | 1 |
| SC_ID3 | ARTIST A | 1 |

SNS SOURCE MANAGEMENT TABLE 3014

FIG.35

| HOBBY ANALYSIS INFORMATION 3500 | | HIT COUNT 3501 |
|---|---|---|
| CATEGORY | Gen0 | 5 |
| | Gen1 | 1 |
| | ⋮ | ⋮ |
| | GenN | 0 |
| CAST | Act0 | 0 |
| | Act1 | 3 |
| | ⋮ | ⋮ |
| | ActN | 2 |

HOBBY SOURCE MANAGEMENT TABLE 3013

FIG.45

| CDDB_ID 4500 | WAVEFORM INFORMATION 4501 | ALBUM NAME 4502 | SINGER NAME 4503 | TRACK NAME 4504 |
|---|---|---|---|---|
| C_ID0 | Wave0 | Album0 | Singer0 | Track0 |
| C_ID1 | Wave1 | Album0 | Singer0 | Track1 |
| C_ID2 | Wave2 | Album1 | Singer1 | Track0 |

CDDB INFORMATION MANAGEMENT TABLE 4304

FIG.46

| MUSIC CONTENT ID 4600 | WAVEFORM INFORMATION 4601 | ALBUM NAME 4602 | SINGER NAME 4603 | TRACK NAME 4604 | PLAYBACK COUNT 4605 | BACKUP FLAG 4606 | MIGRATION FLAG 4607 | STORAGE LOCATION 4608 |
|---|---|---|---|---|---|---|---|---|
| M_ID0 | Wave0 | Album0 | Singer0 | Track0 | 4 | 1 | 0 | Mcnt0 |
| M_ID1 | Wave1 | Album0 | Singer0 | Track1 | 3 | 0 | 1 | Mcnt1 |
| M_ID2 | Wave2 | Album1 | Singer1 | Track0 | 0 | 0 | 0 | Mcnt2 |

MUSIC CONTENT MANAGEMENT TABLE 4312

FIG.47

| SALE CONTENT ID 4600 | WAVEFORM INFORMATION 4601 | ALBUM NAME 4602 | SINGER NAME 4603 | TRACK NAME 4604 | PRICE 4605 | STORAGE LOCATION 4606 |
|---|---|---|---|---|---|---|
| S_ID0 | Wave0 | Album0 | Singer0 | Track0 | ¥100 | MScnt0 |
| S_ID1 | Wave1 | Album0 | Singer0 | Track1 | ¥100 | MScnt1 |
| S_ID2 | Wave2 | Album1 | Singer1 | Track0 | ¥200 | MScnt2 |

SALE CONTENT MANAGEMENT TABLE 4315

FIG.48

INTRODUCTORY ARTICLE MANAGEMENT TABLE 4300

| INTRODUCTORY ARTICLE ID | ALBUM NAME | SINGER NAME | TRACK NAME | HOBBY ANALYSIS INFORMATION | ARTICLE DESCRIPTION |
|---|---|---|---|---|---|
| I_ID0 | Album0 | Singer0 | Track0 | Gen0 | MRep0 |
| I_ID0 | Album0 | Singer0 | Track0 | Sin0 | MRep1 |
| I_ID1 | Album0 | Singer0 | Track1 | Gen0 | MRep2 |
| I_ID1 | Album0 | Singer1 | Track1 | Sin0 | MRep3 |
| I_ID2 | Album1 | Singer1 | Track0 | Gen1 | MRep4 |
| I_ID2 | Album1 | Singer1 | Track0 | Sin1 | MRep5 |

4700  4701  4702  4703  4704  4705

CONTENT PROVISION SYSTEM AND CONTENT PROVISION METHOD

CROSS-REFERENCES

This application relates to and claims priority from Japanese Patent Application No. 2008-092733, filed on Mar. 31, 2008, the entire disclosure of which is incorporated herein by reference.

BACKGROUND

The present invention relates to technology for providing recommended contents to a user among the contents recorded with an HDD recorder system.

There is a hard disk drive recorder system (hereinafter referred to as the "HDD recorder system") that receives an electronic program guide (hereinafter referred to as the "EPG") broadcast from a broadcast station, and associates and stores the recorded TV programs and the received EPG.

Japanese Patent Laid-Open Publication No. 2006-229707 discloses technology for providing recommended contents to a user that matches the user's hobby information among the contents recorded in the HDD recorder system that have not yet been viewed (or listened to). Incidentally, the term "content" or "content data" as used herein refers to information in general such as text that can be perused via the Website or mediums such as a CD (CD-ROM) or DVD as well as still images, videos, music and audio that can be traded without using a physical medium.

This technology improved the user-friendliness since it enables a user to search unviewed contents that match one's hobby among a plurality of contents recorded in the HDD recorder system.

SUMMARY

To begin with, a user was only able to select an unviewed content (hereinafter referred to as the "recommended content") that matches one's hobby among a plurality of recorded contents from an HDD recorder system.

Among TV programs, there are serial programs having continuity such as a drama series. Even though a user timer-records a serial program with the HDD recorder system, there are times when the serial program cannot be recorded due to an extension of a sports program or an accident such as a blackout. Nevertheless, since an HDD recorder system provides recommended contents to a user only among the recorded contents, it is not possible to supplement and provide a user with an episode that could not be recorded, and it was not possible to introduce all broadcasts of a serial program at once.

In recent years, since content sale/distribution systems that sell contents such as TV programs and movies via a network have appeared, a user is able to purchase the episodes that could not be recorded in the serial program from the content sale/distribution system and view such episodes.

Nevertheless, the HDD recorder system manages the recorded contents with a local (unique) ID in the HDD recorder system, and the content sale/distribution system manages the sale contents with a local ID in the content sale/distribution system. Thus, since contents of the HDD recorder system and contents of the content sale/distribution system are not associated, the HDD recorder system was not able to recommend all broadcasts of a serial program including the episodes purchased by a user.

Further, with conventional technology, a user reads the program explanation of the EPG with little information concerning the program description, and it is not possible to increase the incentive of users to view and listen to contents since it is difficult for the user to know whether the program matches one's hobby. The issue is how the HDD recorder system is to provide recommended contents to a user, and increase the incentive of users to view and listen to the recommended contents.

Thus, an object of the present invention is to provide a content provision system and a content provision method capable of expanding the option of recommended contents to be selected, providing contents including contents (video and musical recordings) that could not be directly stored by a user, and increasing the incentive of users to view and listen to contents.

In order to achieve the foregoing object, the present invention provides a content provision system comprising a first system for storing first content data to be used by a user, a second system for storing second content data to be provided to a user, a third system connected to the first system and the second system and for managing attribute information of content data, a creation unit for associating the first content data and the second content data, assigning a common content ID to the first content data and the second content data, and creating management information of all content data configured from the first content data and the second content data based on the attribute information of content data, an analysis unit for analyzing hobby information of a user based on reference information for deciding hobby information of a user, a search unit for searching content data that coincides with the analyzed hobby information of a user based on the management information of all content data, and a provision unit for providing to a user content information that coincides with hobby information of a user based on the searched content data.

Consequently, since all content data can be managed collectively, the contents to be provided to a user do not have to be limited to content data used by a user, and contents including the contents that could not be directly stored by a user can also be provided. Thus, it is possible to expand the option of content data to be provided to a user as recommended contents.

The present invention additionally provides a content provision method of a content provision system comprising at least a first system for storing first content data to be used by a user, a second system for storing second content data to be provided to a user, and a third system connected to the first system and the second system and for managing attribute information of content data. This content provision method of a content provision system comprises a creation step for associating the first content data and the second content data, assigning a common content ID to the first content data and the second content data, and creating management information of all content data configured from the first content data and the second content data based on the attribute information of content data, an analysis step for analyzing hobby information of a user based on reference information for deciding hobby information of a user, a search step for searching content data that coincides with the analyzed hobby information of a user based on the management information of all content data, and a provision step for providing to a user content information that coincides with hobby information of a user based on the searched content data.

Consequently, since all content data can be managed collectively, the contents to be provided to a user do not have to be limited to content data used by a user, and contents including the contents that could not be directly stored by a user can also be provided. Thus, it is possible to expand the option of content data to be provided to a user as recommended contents.

Accordingly, the present invention is able to expand the option of recommended contents to be selected, provide contents including contents (video and musical recordings) that could not be directly stored by a user, and increase the incentive of users to view and listen to contents.

DESCRIPTION OF DRAWINGS

FIG. 1 is a block diagram showing the configuration of a content provision system according to the first embodiment;

FIG. 2 is a chart showing a program information management table according to the first embodiment;

FIG. 3 is a chart showing a program information recording table according to the first embodiment;

FIG. 4 is a chart showing a configuration information management table according to the first embodiment;

FIG. 5 is a chart showing a recorded content management table according to the first embodiment;

FIG. 6 is a chart showing a hobby source management table according to the first embodiment;

FIG. 7 is a chart showing a sale content management table according to the first embodiment;

FIG. 8 is a chart showing an introductory article management table according to the first embodiment;

FIG. 9 is a chart showing an online storage user management table according to the first embodiment;

FIG. 10 is a chart showing a provider service management table according to the first embodiment;

FIG. 11 is a chart showing a per-user stored content management table according to the first embodiment;

FIG. 12 is a chart showing an all content management table according to the first embodiment;

FIG. 13 is a chart showing a hobby analysis management table according to the first embodiment;

FIG. 29 shows an example of a text display of a recommended information file according to the first embodiment;

FIG. 31 is a chart showing an information source management table according to the second embodiment;

FIG. 33 is a chart showing an SNS user information management table according to the second embodiment;

FIG. 35 is a chart showing an example of a hobby source management table according to the second embodiment;

FIG. 45 is a chart showing a CDDB information management table according to the fourth embodiment;

FIG. 46 is a chart showing a music content management table according to the fourth embodiment;

FIG. 47 is a chart showing a sale content management table according to the fourth embodiment;

FIG. 48 is a chart showing an introductory article management table according to the fourth embodiment.

DETAILED DESCRIPTION

(1) First Embodiment

Figure 14:
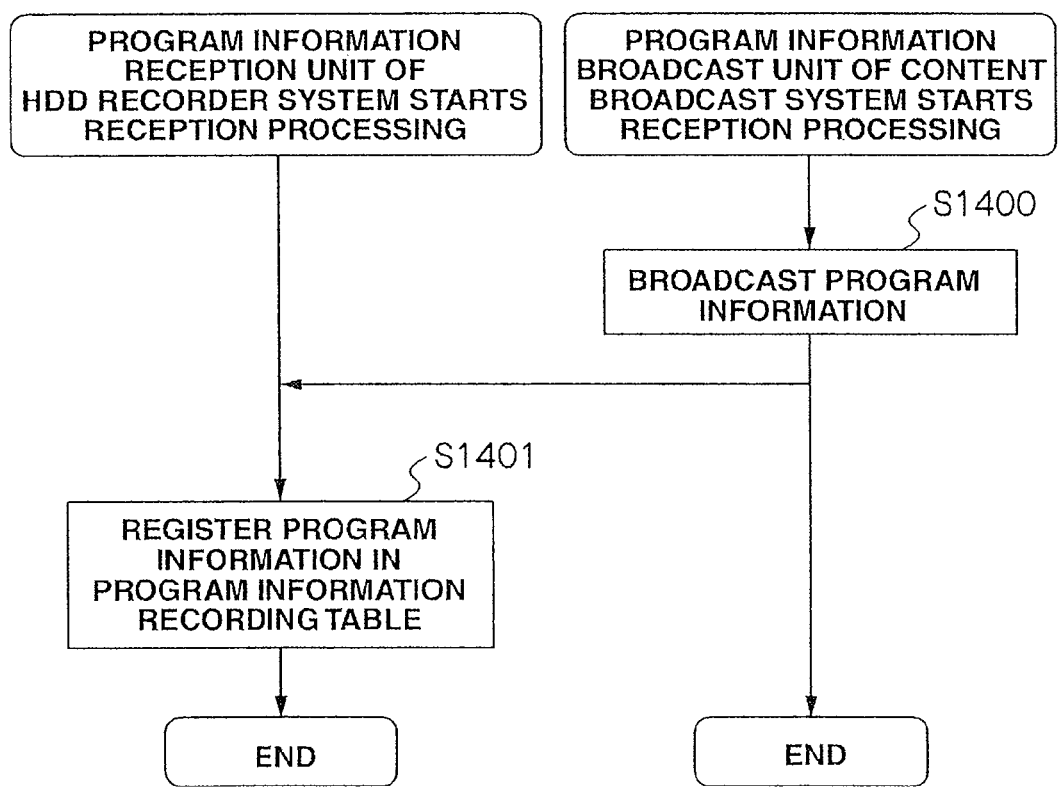
FIG. 14 is a processing flow upon an HDD recorder system receiving program information according to the first embodiment.

The outline of a content provision system is foremost explained.

This system is configured from a content broadcast system that periodically distributes program information primarily of TV programs, an HDD recorder system for recording and playing TV programs, an online storage system that provides a service for storing contents in the HDD recorder system by way of backup or archiving (hereinafter referred to as "migration"), a content sale/distribution system for selling and distributing contents such as TV programs and movies, and an introductory article registration system for providing introductory articles of TV programs and movies. The introductory article corresponding to the recommended content to be provided to the user is created with the online storage system and sent to the HDD recorder system.

The HDD recorder system associates the program information and content upon recording the content and manages this with a local ID. The content sale/distribution system associates the received program information and content to be sold and manages this with a local ID. The introductory article registration system associates the received program information and the corresponding introductory article and manages this with a local ID.

The HDD recorder system records the history of the category and cast of the content as the user's hobby source information upon recording and playing the content.

The online storage system acquires a management table of the recorded contents from the HDD recorder system that requested the recommended information, acquires a management table of the sale contents from the content sale/distribution system, and acquires a management article of the introductory articles from the introductory article registration system. Subsequently, the online storage system associates the contents recorded by the HDD recorder system, the sale contents of the content sale/distribution system, and the introductory article contents of the introductory article registration system based on the program title, explanation, category and cast as the program information registered in the respective management tables, assigns a global ID to these contents, and manages the contents with an all content management table.

The online storage system acquires the user's hobby source information from the HDD recorder system owned by the user, and uses the category or cast with the greatest recording/playback count as the user's hobby information.

The online storage system searches for unviewed contents from the management table of the recorded contents that matches the user's hobby information, and thereby decides the recommended contents as contents to be recommended to the user. If the recommended contents are a serial program, all contents of the serial program are decided as the recommended contents using the all content management table.

The online storage system uses the all content management table to decide the introductory article contents corresponding to the recommended contents and which match the user's hobby information.

The online storage system creates a recommended information file to be displayed to the user based on the recommended contents and the introductory article contents, and sends this to the HDD recorder system, which is the request source of the recommended information.

The HDD recorder system displays the received recommended information file to the user, and plays the content selected by the user. The HDD recorder system plays the content by reading it from the HDD recorder system if such content is in the HDD recorder system, reading it from the online storage system if such content is in the online storage system, and reading it from the content sale/distribution system after performing buying procedures if such content is in the content sale/distribution system.

The first embodiment is now explained with reference to the attached drawings. This embodiment realizes a content provision system 1 which creates information (recommended contents) of a recommended program among the TV programs recorded with the HDD recorder system 101 and which matches the user's hobby using the online storage system 133, and provides such information to the user. Although this embodiment classifies the user's hobby based on the category and cast of the TV program, the classification is not limited thereto.

FIG. 1 shows the outline of the configuration of a content provision system.

The content provision system 1 is configured from a content broadcast system 156 that periodically distributes program information of TV programs, an HDD recorder system 101 installed in a household 100 for recording and playing TV programs, an online storage system 133 for providing a service of storing the contents in the HDD recorder system 101 by way of backup or migration, a content sale/distribution system 145 for selling and distributing contents such as TV dramas and movies, an introductory article registration system 119 for recording introductory articles of TV programs and movies as contents, and a mobile terminal 127 for playing the contents recorded with the HDD recorder system 101 from outside the household 100.

The HDD recorder system 101, the online storage system 133, the content sale/distribution system 145, the introductory article registration system 119, and the mobile terminal 127 are mutually connected to a network 162 such as the Internet via a communication cable 164 such as a LAN cable or wireless communication.

The constituent features of the respective systems are now explained.

The content broadcast system 156 is foremost explained.

The content broadcast system 156 is primarily configured from a storage apparatus 160 for storing a program information management table 161, a memory 158 for temporarily storing the program information broadcast unit 159 for subsequent execution, and a program information communication unit 157 for broadcasting the program information via airwaves. Incidentally, program information is information concerning each TV program.

The program information broadcast unit 159 is a program to be temporarily read from the storage apparatus 160 into the memory 158 upon execution. The program information broadcast unit 159 periodically acquires the program information management table 161, and broadcasts the program information.

FIG. 2 shows an example of the program information management table 161.

The program information management table 161 is created, for instance, by registering information of programs (including attribute information of programs) periodically acquired by the content broadcast system 156 from the respective TV stations.

The program information management table 161 is a table for managing the program information broadcast within a given period by region. For example, FIG. 2 shows a table registering program information to be broadcast in Tokyo within the next week.

The program information management table 161 is configured from a "program ID" column 200, a "date" column 201, a "region" column 202, a "channel number" column 203, a "broadcast time" column 204, a "title" column 205, a "program explanation" column 206, a "category" column 207, a "cast" column 208, a "series name" column 209, a "total number of broadcasts" column 210, and an "episode number" column 211.

The "program ID" column 200 registers the identification number for the content broadcast system 156 to manage the information of the respective TV programs in the self-system. The "date" column 201 registers the date that the TV program will be broadcast. The "region" column 202 registers the region in which the TV program will be broadcast. The "channel number" column 203 registers the channel number that the TV program will be broadcast. The "broadcast time" column 204 registers the start time and end time that the TV program will be broadcast. The "title" column 205 registers the title of the TV program. The "program explanation" column 206 registers the brief explanation of the TV program. The "category" column 207 registers the category of the TV program. For instance, the category could be drama, movie, music and so on. The "cast" column 208 registers the main actors appearing in the TV program to be broadcast.

The "series name" column 209 registers the name for identifying a serial program such as a serial drama. A serial program will all have the same series name.

The "total number of broadcasts" column 210 registers the total number of broadcasts until the serial program is complete.

The "episode number" column 211 registers the broadcast episode number among the total number of broadcasts of the serial program. If the program is not a serial program, for instance, "0" is registered in the "total number of broadcasts" column 210 and the "episode number" column 211.

The title, program explanation, category, and cast are collectively referred to as program attribute information.

The HDD recorder system 101 is now explained.

The HDD recorder system 101 is configured from a program information reception unit 102 for receiving the broadcast of the content broadcast system 156, a communication unit 103 for connecting to the network 162, a display unit 104 for displaying information in the HDD recorder system 101 to the user, a storage apparatus 113, and a memory 105.

The storage apparatus 113 stores a recorded content group 114, a program information recording table 117, a configuration information management table 116, a recorded content management table 118, and a hobby source management table 115. The various tables 115 to 118 will be explained later.

The recorded content group 114 stores a plurality of recorded contents. The recorded contents (hereinafter referred to as the "recorded contents") are contents that are created by recording programs. The recorded contents are the content data to be used by the user.

The memory 105 temporarily stores a recorded content ID assignment unit 106 for the HDD recorder system 101 to assign an ID that is necessary for identifying and managing the recorded contents in the self-system, a management table sending unit 107 for sending the recorded content management table 118 to the request source, a recording unit 108 for recording programs, a playback unit 109 for playing the recorded contents, a backup/migration unit 110 for backing up or migrating the recorded contents to the online storage system 133, and a recommended information request unit 111 for requesting the online storage system 133 to send recommended information.

FIG. 3 shows an example of the program information recording table 117.

The program information recording table 117 is a table created by replicating the program information received from the content broadcast system 156, and the subject matter of the respective columns 300 to 311 is the same as the subject matter of the respective columns 200 to 211 of the program information management table 161. When the HDD recorder system 101 records programs, the program information in the program information recording table 117 and the recorded contents are associated, and the program information in the program information recording table 117 is used as additional information of the recorded contents.

FIG. 4 shows an example of the configuration information management table 116.

The configuration information management table 116 is used when the HDD recorder system 101 communicates with the online storage system 133.

The configuration information management table 116 is configured from an "IP address of online storage system" column 400 for identifying the online storage system 133 to become the destination of the HDD recorder system 101, a "user ID" column 401 and a "password" column 402 for authenticating the connection of the HDD recorder system 101 and the online storage system 133, and an "HDD recorder ID" column 403 to be used by the online storage system 133 for identifying the HDD recorder system 101.

For example, the foregoing information is provided from the online storage system 133 when applying for the service of the online storage system 133, and registered by the user from the HDD recorder system 101. In the ensuing explanation, let it be assumed that the communication of the HDD recorder system 101 and the online storage system 133 is conducted using the user ID and password registered in the configuration information management table 116.

FIG. 5 shows an example of the recorded content management table 118.

The recorded content management table 118 is a table for the HDD recorder system 101 to manage the recorded contents in the self-system.

The recorded content management table 118 is configured from a "recorded content ID" column 500, a "region" column 501, a "channel number" column 502, a "broadcast date and time" column 503, a "title" column 504, a "program explanation" column 505, a "category" column 506, a "cast" column 507, a "series name" column 508, a "total number of broadcasts" column 509, an "episode number" column 510, a "playback count" column 511, a "backup flag" column 512, a "migration flag" column 513, and a "recorded contents storage location" column 514.

The "recorded content ID" column 500 registers the ID for the HDD recorder system 101 to manage the recorded contents in the self-system.

The "broadcast date and time" column 503 registers the date of the program information and the broadcast time corresponding to the date and time of recording.

The "playback count" column 511 registers the number of times that the recorded content was played.

The "backup flag" column 512 registers "0" as the initial value, and is set with "1" when the recorded content is backed up to the online storage system 133.

The "migration flag" column 513 registers "0" as the initial value, and is set with "1" when the recorded content is migrated to the online storage system 133.

Incidentally, the term "backup" means to store the recorded contents in the online storage system 133 while also leaving such recorded contents in the HDD recorder system 101. The term "migration" means to store the recorded contents in the online storage system 133 while deleting such recorded contents from the HDD recorder system 101.

The recorded contents storage location" column 514 registers the address of the storage apparatus 113 storing the recorded contents.

The other item columns 501, 502, and 504 to 510 are replicated from the program information recording table 117 according to the date and time of recording, and the explanation thereof is omitted.

Among the information registered in the recorded content management table 118, there is information referred to as program identifying information. This program identifying information includes the region, channel number, and broadcast date and time, but is not limited thereto so as long as it is information capable of identifying the recorded contents and specifying the programs.

FIG. 6 shows an example of the hobby source management table 115.

The hobby source management table 115 is a table to be used when deciding the user's hobby, and identifies the user's hobby information based on certain information. The hobby source management table 115 is acquired based on information of the recorded content management table 118.

The hobby source management table 115 is a table to be used when deciding the user's hobby, and is configured from a "hobby analysis information" column 600 and a "playback count" column 601.

The "hobby analysis information" column 600 is configured from a "category" column 601 and a "cast" column 602. The hobby source management table 115 is provided to the HDD recorder system 101 in advance by setting a list of categories and casts. The hobby source management table 115 may also be initially registered with nothing, and record the history by registering the unregistered category and cast each time the recording/playback history is recorded. Although this embodiment explains a case of only adding the playback count as the user's operation history, the recording count may also be added.

Returning to FIG. 1, the configuration of the content sale/distribution system 145 is further explained.

The content sale/distribution system 145 is configured from a program information reception unit 146 for receiving the broadcast of the content broadcast system 156, a communication unit 147 for connecting to the network 162, a memory 148, and a storage apparatus 152.

The memory 148 temporarily stores a content sale/distribution unit 149 for conducting buying procedures or distributing the contents, a management table sending unit 150 for sending the sale content management table 155 to the request source, and a sale content ID assignment unit 151 for the content sale/distribution system 145 to assign an ID for managing the contents in the self-system.

The storage apparatus 152 stores a sale content group 153, and a sale content management table 155 for managing the contents with an ID. The sale content group shows a plurality of sale contents to be provided to the user. The sale contents are contents owned by the content sale/distribution system 145, and contents such as dramas and movies for sale.

FIG. 7 shows an example of the sale content management table 155.

The sale content management table 155 is configured from a "sale content ID" column 700, a "program identifying information" column 701, a "title" column 702, a "program explanation" column 703, a "category" column 704, a "cast" column 705, a "series name" column 706, a "total number of broadcasts" column 707, an "episode number" column 708, a "price" column 709, and a "sale content storage location" column 710.

The "sale content ID" column 700 registers the ID for the content sale/distribution system 145 to manage the sale contents in the self-system.

The "program identifying information" column 701 registers the content identifying information for uniquely identifying the programs, and set with the combination of region, channel number, and broadcast date and time. As shown in the sale content ID "S_ID5" of FIG. 7, since there are cases where the broadcast program is re-aired subsequently, even if the program description is the same, two or more pieces of program identifying information may exist.

Information of the "title" column 702, the "program explanation" column 703, the "category" column 704, and the "cast" column 705 of the sale content management table 155 is registered in advance by the content sale/distribution vendor. As indicated above, the title, program explanation, category, and cast are collectively referred to as program attributes (attribute information).

The sale content management table 155 manages the "program identifying information" column 701 which registers content identifying information based on the program information management table 161 by associating it with the other item columns 702 to 710 which are being managed in advance.

Returning to FIG. 1, the configuration of the introductory article registration system 119 is now explained.

The introductory article registration system 119, for instance, a system that registers program introductory articles of TV magazines as contents. Since a plurality of reporters create articles from different perspectives such as the category and cast, a plurality of articles are registered for one program. For example, with program C in which the category is a quiz program with cast A and cast B appearing the program, an article concerning the questions to be asked in the quiz, an article concerning cast A, and an article concerning cast B are registered. Reporters are able to update the registered articles to the latest content as necessary.

The introductory article registration system 119 is configured from a program information reception unit 120 for receiving the broadcast of the content broadcast system 156, a communication unit 121 for connecting to the network 162, a memory 124, and a storage apparatus 125.

The memory 124 temporarily stores a management table sending unit 122 for sending the introductory article management table 126 to the request source, and an introductory article ID assignment unit 123 for the introductory article registration system 119 to assign an ID for uniquely identifying the introductory article contents in the self-system.

The storage apparatus 125 stores the introductory article management table 126.

FIG. 8 shows an example of the introductory article management table 126.

The introductory article management table 126 is configured from an "introductory article ID" column 800, a "program identifying information" column 801, a "title" column 802, a "program explanation" column 803, a "category" column 804, a "cast" column 805, a "series name" column 806, a "total number of broadcasts" column 807, an "episode number" column 808, a "hobby analysis information" column 809, and an "article description" column 810.

The "introductory article ID" column 800 registers the ID for the introductory article registration system 119 to manage the introductory article contents in the self-system.

The "hobby analysis information" column 809 registers information (hereinafter referred to as the "hobby analysis information") concerning the category of the program or the cast who appears in the program. If the article description is focusing on the category of the program, the reporter of the introductory article registration system 119 registers the introductory article contents to be provided to the user according to the category of the hobby analysis information. If the article description is focusing the cast of the program, the reporter of the introductory article registration system 119 registers the introductory article contents according to the cast of the hobby analysis information. Here, in addition to previous information, an article describing the recent activities of the cast is registered. For example, the article description registered according to cast A will be something to the effect of "The popular gag of cast A was first performed in this program." The program attributes (title, program explanation, category, and cast) of the introductory article management table 126 are registered in advance by the vendor registering the introductory article.

The "article description" column 810 registers the article description to be introduced.

The other item columns 801 to 808 are the same as the columns described above, and the explanation thereof is omitted.

The introductory article management table 126 manages the "program identifying information" column 801 registered based on the program information management table 161 by associating it with the other item columns 802 to 810 that are being managed in advance.

Returning to FIG. 1, the configuration of the online storage system 133 is now explained.

The online storage system 133 is configured from a communication unit 134 for connecting to the network 162, a memory 135, and a storage apparatus 138.

The memory 135 temporarily stores a recommended information provision unit 136 for providing recommended information that introduces the recommended contents to the user, and a backup/migration unit 137 for storing the backed up or migrated recorded contents in the online storage system 133, or sending the migrated contents to the HDD recorder system 101 for playback.

The storage apparatus 138 stores a backup/migration content group 139, a per-user stored content management table 140, an online storage user management table 141, a provider service management table 142, an all content management table 143, and a backed up hobby source management table 144.

The backup/migration content group 139 shows that there are a plurality of backup contents and migration contents. Here, the term "backup contents" refer to the recorded contents that were backed up from the HDD recorder system. The term "migration contents" refer to the recorded contents that were migrated from the HDD recorder system 101.

FIG. 9 shows an example of the online storage user management table 141.

The online storage user management table 141 is a table to be used for the online storage system 133 to identify the HDD recorder system 101 owned by the user.

The online storage user management table 141 is configured from an "user ID" column 900 and a "password" column 901 to be assigned for using the online storage system 133, an "HDD recorder ID" column 902 showing the HDD recorder system 133 owned by the user, an "IP address" column 903 showing the address of the HDD recorder system 101, and a "storage location of hobby source management table" column 904 in the HDD recorder system 101.

The "storage location of hobby source management table" column 904 registers the storage location in the storage apparatus 138.

For example, when the user applies for the online storage system 133, the IP address and the storage location of the hobby source management table 115 are registered.

FIG. 10 shows an example of the provider service management table 142.

The provider service management table 142 is a table that is required for the online storage system 133 to exchange information with the content sale/distribution system 145 or the introductory article registration system 119, and is a table for identifying the introductory article registration service vendor and the content purchase/sale service.

The provider service management table 142 is configured from a "provider ID" column 1000 to be assigned for the online storage system 133 to identify the provider, a "service" column 1001 showing the service type of the provider, and an "IP address" column 1002 to be assigned for identifying the provider to become the destination of the online storage system 133. For example, the administrator of the online storage system 133 registers the values of the respective item columns 1000 to 1002 upon starting the service of the online storage 133.

FIG. 11 shows an example of the per-user stored content management table 140.

The per-user stored content management table 140 is a table for managing the storage location of the backup contents and the migration contents with the online storage system 133.

The per-user stored content management table 140 is configured from a "user ID" column 1100, an "HDD recorder ID" column 1101, a "recorded content ID" column 1102, a "region" column 1103, a "channel number" column 1104, a "broadcast date and time" column 1105, a "title" column 1106, a "program explanation" column 1107, a "category" column 1108, a "cast" column 1109, a "series name" column 1110, a "total number of broadcasts" column 1111, an "episode number" column 1112, a "playback count" column 1113, a "backup flag" column 1114, a "migration flag" column 1115, a "recorded content storage location" column 1116, and an "online contents storage location" column 1117.

The "user ID" column 1100 registers the ID of the user to be assigned for identifying the online storage system 133.

The "HDD recorder ID" column 1101 registers the ID for identifying the HDD recorder of the HDD recorder system 101 owned by the user.

The "online contents storage location" column 1117 registers the address of the storage apparatus 138 storing the backed up or migrated recorded contents.

The other item columns 1102 to 1116 register the replicated information of the recorded content management table 118 when the recorded contents are backed up or migrated.

FIG. 12 shows an example of the all content management table 143.

The all content management table 143 is a table for managing all contents required for creating recommended information.

The all content management table 143 is configured from an "all contents ID" column 1200 assigned for unifying and managing the recorded contents, sale contents, and introductory article contents which were being managed under different IDs, a "provider ID" column 1201 showing the providers that are able to provide the contents, a "program identifying information" column 1202, a "title" column 1203, a "program explanation" column 1204, a "category" column 1205, a "cast" column 1206, a "series name" column 1207, a "total number of broadcasts" column 1208, an "episode number" column 1209, a "price" column 1210 showing the price of that content, and a "per-hobby article description" column 1211 showing the information that pairs the hobby analysis information and the article description.

The all contents ID column 1200 of the "all contents ID" column 1200 associates the recorded contents recorded with the HDD recorder system 101, the sale contents of the content sale/distribution system 145, and the introductory article contents of the introductory article registration system 119 based on the program name, program explanation, program category, and program cast (program attribute information) of the program information broadcast from the content broadcast system 156, and manages such contents with a global (common) ID.

The item columns 1202 to 1209 are the same as the item columns described above and the explanation thereof is omitted.

In the ensuing explanation, the all contents ID is sometimes referred to as a universal ID (UID).

The backed up hobby source management table 144 is a table for managing the hobby source management table 115 backed up from the HDD recorder system 101. Thus, the backed up hobby source management table 144 is similar to the hobby source management table 115, and the explanation thereof is omitted.

Even if the HDD recorder system 101 is replaced due to a failure or the like, the hobby source management table can be restored by the online storage system 133 sending the backed up hobby source management table 144 to the replaced HDD recorder system 101. Thus, the HDD recorder system 101 will not have to recreate the user's hobby from scratch.

FIG. 13 shows an example of the hobby analysis management table 166.

The hobby analysis management table 166 is a table to be created each time recommended information is created, and is a table for managing the analysis of the user's hobby.

The hobby analysis management table 166 is configured from a "user ID" column 1300, a "hobby analysis information" column 1301, a "playback count" column 1302, and a "rank" column 1303.

The "playback count" column 1302 registers the total playback count where "1" as the playback count is added to the hobby analysis information in which the category and cast of the played recorded content coincide when such recorded content is played.

The "rank" column 1303 registers the rank in descending order of the playback count based on the hobby analysis information for each user ID.

Returning to FIG. 1, the configuration of the mobile terminal 127 is now explained.

The mobile terminal 127 is configured from a communication unit 128 for connecting to the network 162, a memory 132, and a display unit 165 for displaying the information in the mobile terminal 127 to the user.

The memory 132 stores a playback unit 129 for playing the recorded contents, and a recommended information request unit 130 for requesting the recommended information. As a result of the recommended information request unit 130 requesting the recommended information, the user is able to confirm the recommended information with the mobile terminal 127. The mobile terminal 127 stores the recommended contents to be used by the user in the memory 132 of the mobile terminal 127 based on the recommended information.

The processing flow for realizing the content provision system 1 which creates information (recommended contents) of a recommended program among the TV programs recorded with the HDD recorder system 101 and which matches the user's hobby using the online storage system 133, and provides such information to the user.

The processing flow is explained by being divided into (1-2) ID assignment processing of assigning an ID to contents between different systems, (1-3) creation processing of hobby source information, (1-4) creation processing of recommended information, and (1-5) playback processing of the requested contents.

(1-2) ID Assignment Processing of Assigning ID to Contents Between Different Systems The ID assignment processing of assigning an ID to contents between different systems is explained by being divided into the flowcharts of (1-2-1) program information reception processing of the HDD recorder system 101, (1-2-2) recording processing in the HDD recorder system 101, (1-2-3) content backup/migration processing, (1-2-4) program information reception processing in the content sale/distribution system 145, and (1-2-5) program information reception processing in the introductory article registration system 119.

(1-2-1) Program Information Reception Processing of HDD Recorder System 101

The processing flow upon the HDD recorder system 101 receiving the program information is now explained with reference to FIG. 14.

The program information broadcast unit 159 of the content broadcast system 156 and the program information reception unit 102 of the HDD recorder system 101 periodically execute the following processing flow.

The program information broadcast unit 159 of the content broadcast system 156 periodically acquires the program information from the program information management table 161, and broadcasts such program information (S1400).

When the program information reception unit 102 of the HDD recorder system 101 receives the program information via the network 162, it registers the received program information in the program information recording table 117 (S1401).

(1-2-2) Recording Processing in HDD Recorder System 101

Figure 15:
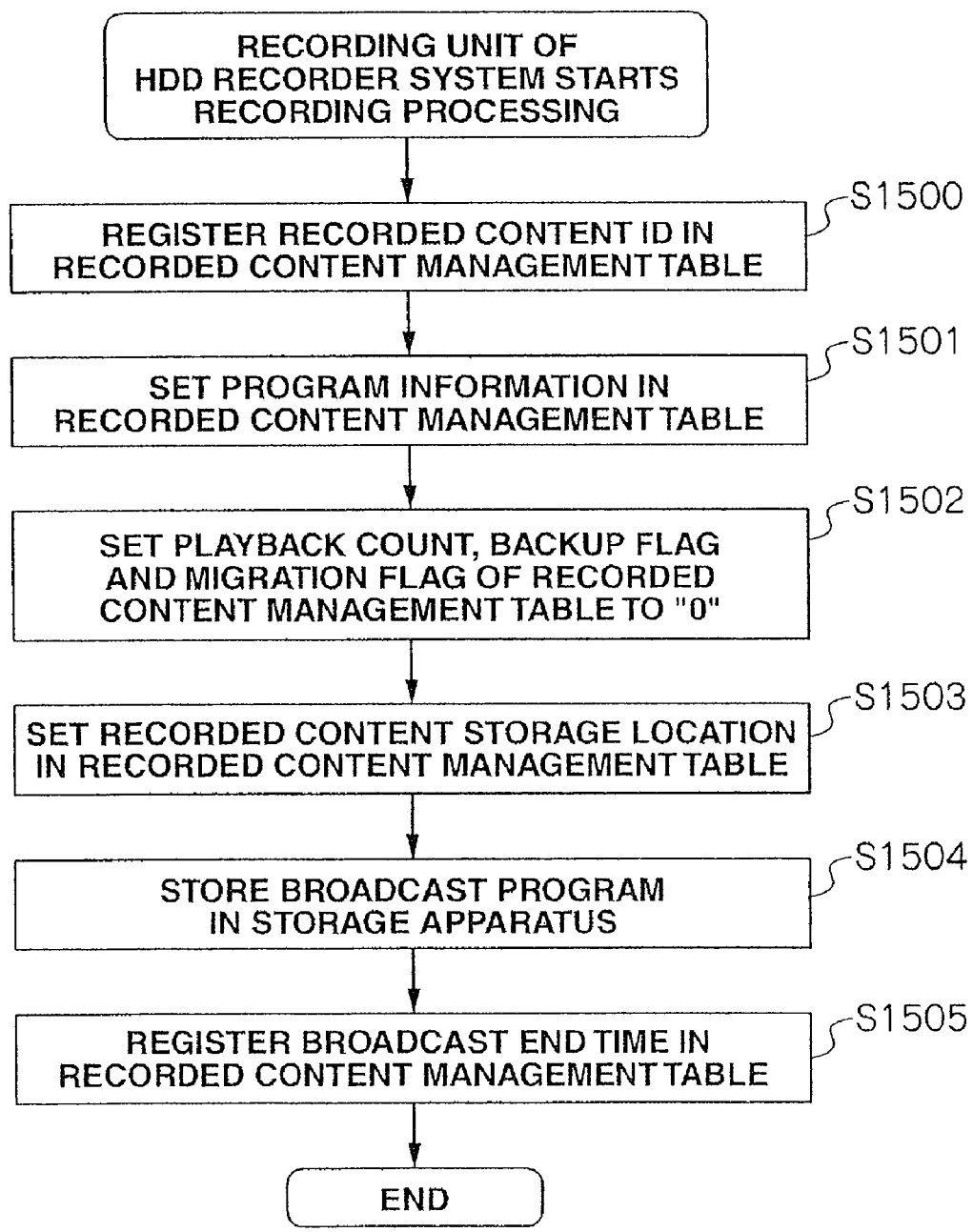
FIG. 15 is a processing flow upon recording with the HDD recorder system according to the first embodiment.

The processing flow upon recording contents with the HDD recorder system 101 is now explained with reference to FIG. 15.

The recording unit 108 of the HDD recorder system 101 executes the following processing flow when the user presses the record button (not shown) of the HDD recorder system 101.

The recording unit 108 of the HDD recorder system 101 allocates the recorded content ID to the recorded content to be stored in the storage apparatus 113, and registers this in the "recorded content ID" column 500 of the recorded content management table 118 (S1500).

The recording unit 108 acquires the program information corresponding to the channel number and the broadcast start time of the broadcast time from the program information recording table 117, and sets this in the recorded content management table 118 (S1501).

The recording unit 108 sets "0" in the "playback count" column 511, the "backup flag" column 512, and the "migration flag" column 513 of the recorded content management table 118 (S1502).

The recording unit 108 decides the storage location of the recorded content, and sets this in the "recorded contents storage location" column 514 of the recorded content management table 118 (S1503).

The recording unit 108 stores the broadcast program in the storage apparatus 113 (S1504).

The recording unit 108 registers the broadcast end time in the "broadcast date and time" column 503 of the recorded content management table 118 (S1505).

When using the information of the recorded contents to analyze the user's hobby, this can be realized as follows. At step S1505, "1" is added to the "playback count" column 603 of the hobby analysis information of the hobby source management table 115 that coincides with the category and cast set as the program attributes of the recorded content. If the user wishes to change the weight (influence) on the user's hobby based on the playback and recording operations, the user should multiply the "weighting factor" to "1" upon adding "1" to the playback count.

(1-2-3) Content Backup/Migration Processing

Figure 16:
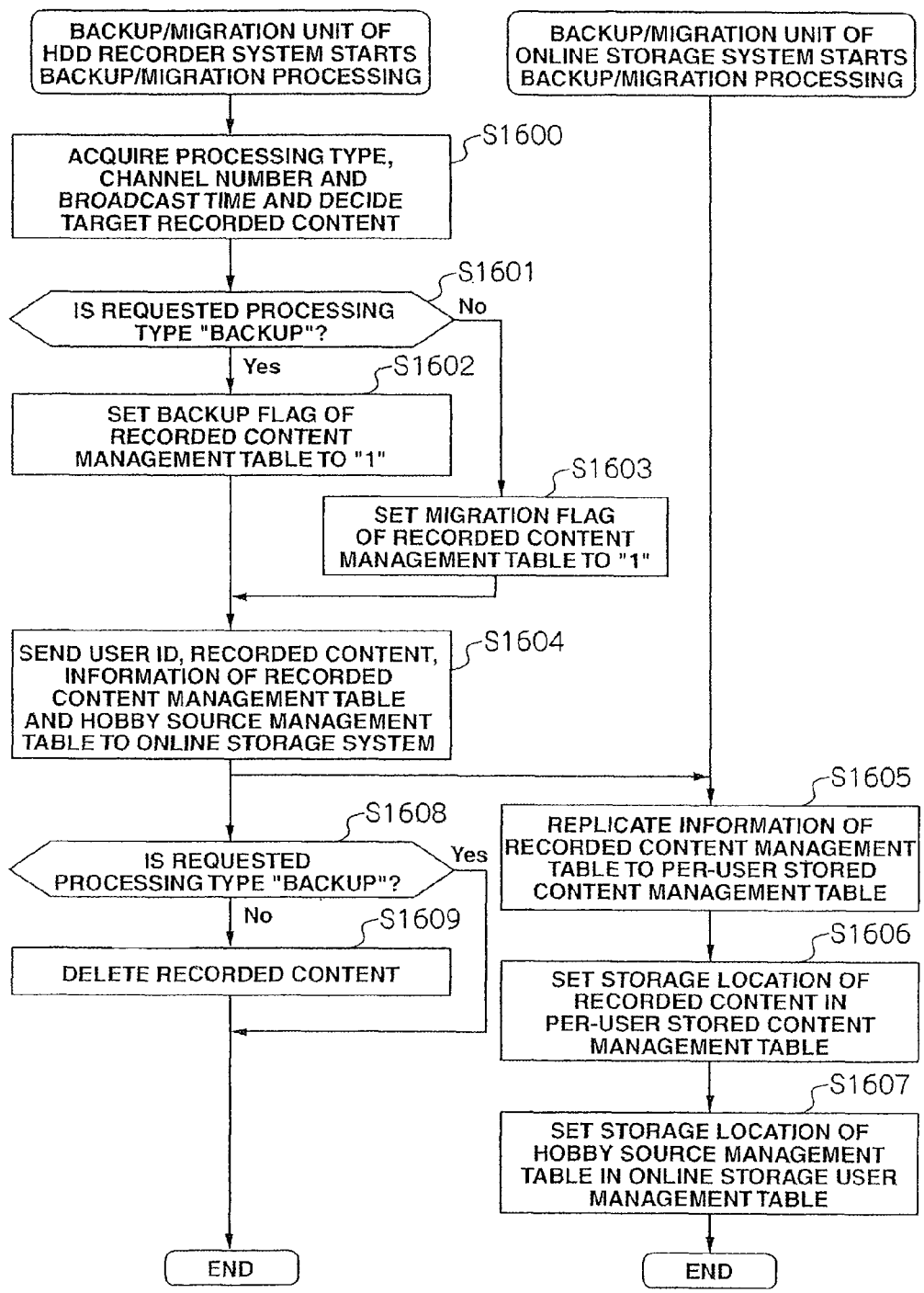
FIG. 16 is a processing flow upon backing up/migrating a recorded content according to the first embodiment.

The processing flow upon backing up/migrating the recorded contents are now explained with reference to FIG. 16.

The backup/migration unit 110 of the HDD recorder system 101 executes the following processing flow when the user presses the backup button (not shown) or the migration button (not shown) of the HDD recorder system 101.

The backup/migration unit 110 of the HDD recorder system 101 acquires the processing type, channel number, and broadcast date and time based on the backup request from the user, and decides the recorded contents that match the acquired conditions from the (S1600). Here, the processing type is either the backup processing or the migration processing.

The backup/migration unit 110 determines whether the processing type requested by the user is backup processing (S1601).

If the processing type is backup processing (S1601: Yes), the backup/migration unit 110 sets the backup flag of the recorded content management table 118 corresponding to the decided recorded content to "1" (S1602).

If the processing type is migration processing (S1601: No), the backup/migration unit 110 sets the migration flag of the recorded content management table 118 corresponding to the decided recorded content to "1" (S1603).

The backup/migration unit 110 sends the user ID, the recorded contents, the information in the recorded content management table 118 corresponding to the recorded contents, and the hobby source management table 115 to the online storage system 133 (S1604).

The backup/migration unit 137 of the online storage system 133 confirms the user ID and the HDD recorder ID of the online storage user management table 141 based on the received information, and replicates the information of the recorded content management table 118 to the per-user stored content management table 140 that coincides with the confirmed user ID and the HDD recorder ID (S1605).

The backup/migration unit 137 stores the recorded contents in the storage apparatus 138, and registers the storage location in the "online contents storage location" column 1117 of the per-user stored content management table 118 (S1606).

When the backup/migration unit 137 stores the hobby source management table 115 in the storage apparatus 138 and registers the storage location in the "storage location of hobby source management table" column 904 of the online storage user management table 141 (S1607), the processing performed by the online storage system 133 is ended.

Subsequently, the backup/migration unit 110 of the HDD recorder system 101 determines once again whether the processing type is backup processing (S1608). If the processing type is backup processing (S1608: Yes), the backup/migration unit 110 ends the processing.

If the processing type is migration processing (S1608: No), the backup/migration unit 110 deletes the recorded contents replicated in the online storage system 133, and sets "0" in the "recorded contents storage location" column 514 of the recorded content management table 118 corresponding to the deleted recorded contents (S1609).

Like this, the backup contents and the recorded contents of the HDD recorder system 101 can be associated or the migration contents and the recorded contents of the HDD recorder system 101 can be associated by the backup/migration unit 137 acquiring the entries of the per-user stored content management table 140.

(1-2-4) Program Information Reception Processing in Content Sale/Distribution System 145

Figure 17:
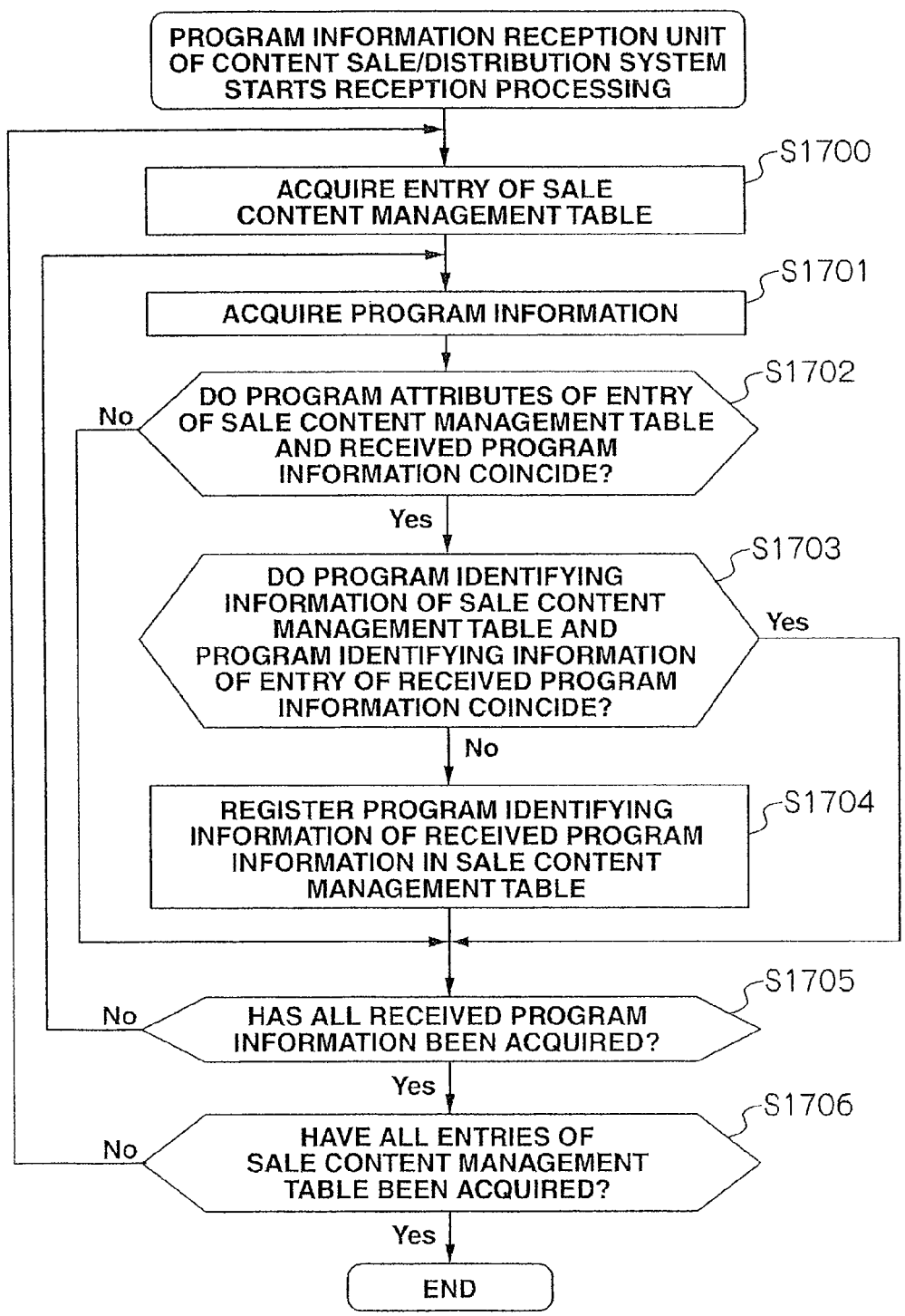
FIG. 17 is a processing flow upon receiving program information with a content sale/distribution system according to the first embodiment.

The processing flow upon the content sale/distribution system 145 receiving the program information is now explained with reference to FIG. 17.

The program information reception unit 146 of the content sale/distribution system 145 periodically executes the following processing flow.

The program information reception unit 146 of the content sale/distribution system 145 searches for the sale content IDs in ascending order among the sale content IDs registered in the sale content management table 155, and acquires one entry (sale content) (S1700).

The program information reception unit 146 receives the program information management table 16 of the content broadcast system 156, searches for the program IDs in ascending order among the received program information, and acquires one piece of program information (S1701).

The program information reception unit 146 determines whether program attributes of the entry of the sale content management table and the received program information coincide (S1702). As described above, program attributes are information concerning the title, program explanation, category, and cast. If the program attributes coincide, the program information reception unit 146 performs the processing at step S1703. If the program attributes do not coincide, the program information reception unit 146 performs the processing at step S1705.

If the program attributes coincide (S1702: Yes), the program information reception unit 146 determines whether the program identifying information of the sale content management table 155 and the program identifying information of the received program information coincide (S1703). If both program identifying information coincide (S1703: Yes), the program information reception unit 146 performs the processing at step S1705.

If the program identifying information do not coincide (S1703: No), since this means that the program identifying information is not registered in the sale content management table 155, the program information reception unit 146 registers the program identifying information of the received program information in the program identifying information column of the sale content management table 155 (S1704). The program identifying information of the received program information and the attribute information of the sale content management table 155 are associated, thereby completing the sale content management table 155.

If the program identifying information of the received program information and the attribute information of the sale content management table 155 are associated (S1702: No, S1703: Yes), the program information reception unit 146 determines whether the received program information has all been acquired (S1705). If the received program information has not all been acquired (S1705: No), the program information reception unit 146 performs the processing at step S1701 once again.

If the received program information has all been acquired (S1705: Yes), the program information reception unit 146 determines whether the sales contents of the sale content management table 155 have all been acquired (S1706). If the sales contents of the sale content management table 155 have not all been acquired (S1706: No), the program information reception unit 146 performs the processing at step S1700 once again. If the sales contents of the sale content management table 155 have all been acquired (S1706: Yes), the program information reception unit 146 ends this reception processing.

(1-2-5) Program Information Reception Processing in Introductory Article Registration System 119

The processing flow upon the introductory article registration system 119 receiving the program information is now explained.

The processing flow upon the introductory article registration system 119 receiving the program information is executed according to the same processing routine as the processing explained with reference to FIG. 17 other than that the program information reception unit 120 of the introductory article registration system 119 associates the program identifying information of the received program information and the attribute information of the introductory article management table 126 using the introductory article management table 126, and not using the foregoing sale content management table 155. The program information reception unit 120 is able to set the program identifying information corresponding to the program attribute of the introductory article management table 126 based on this processing.

(1-3) Creation Processing of Hobby Source Information

The processing of creating the hobby source information is now explained. Here, the hobby source information refers to information that is used for analyzing the user's hobby information. Although this embodiment uses the playback count of the recorded contents as the hobby source information, this is not limited to information concerning the playback count so as long as the information is able to analyze the user's hobby information.

Figure 18:
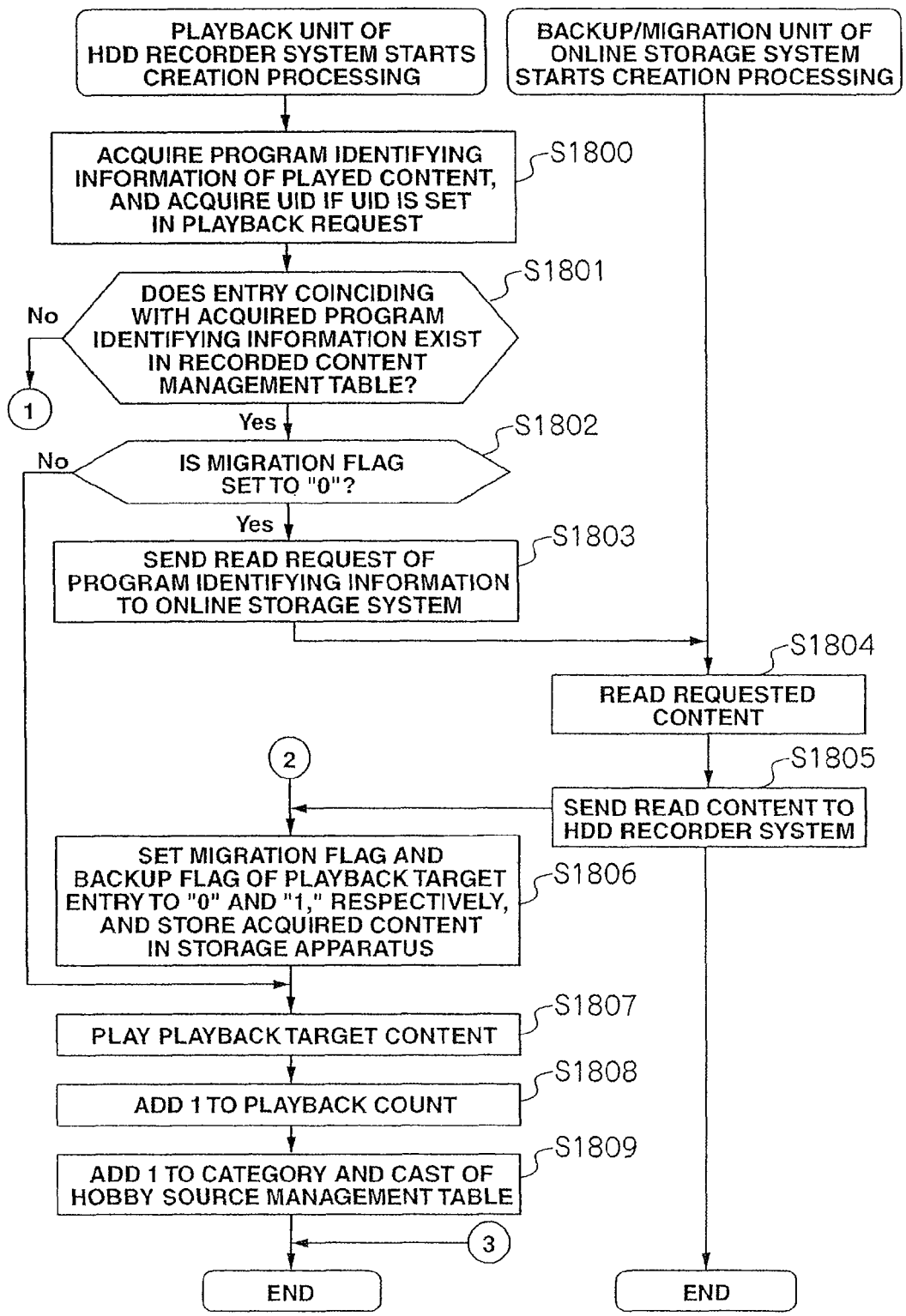
FIG. 18 is a processing flow upon playing a recorded content according to the first embodiment.
Figure 19:
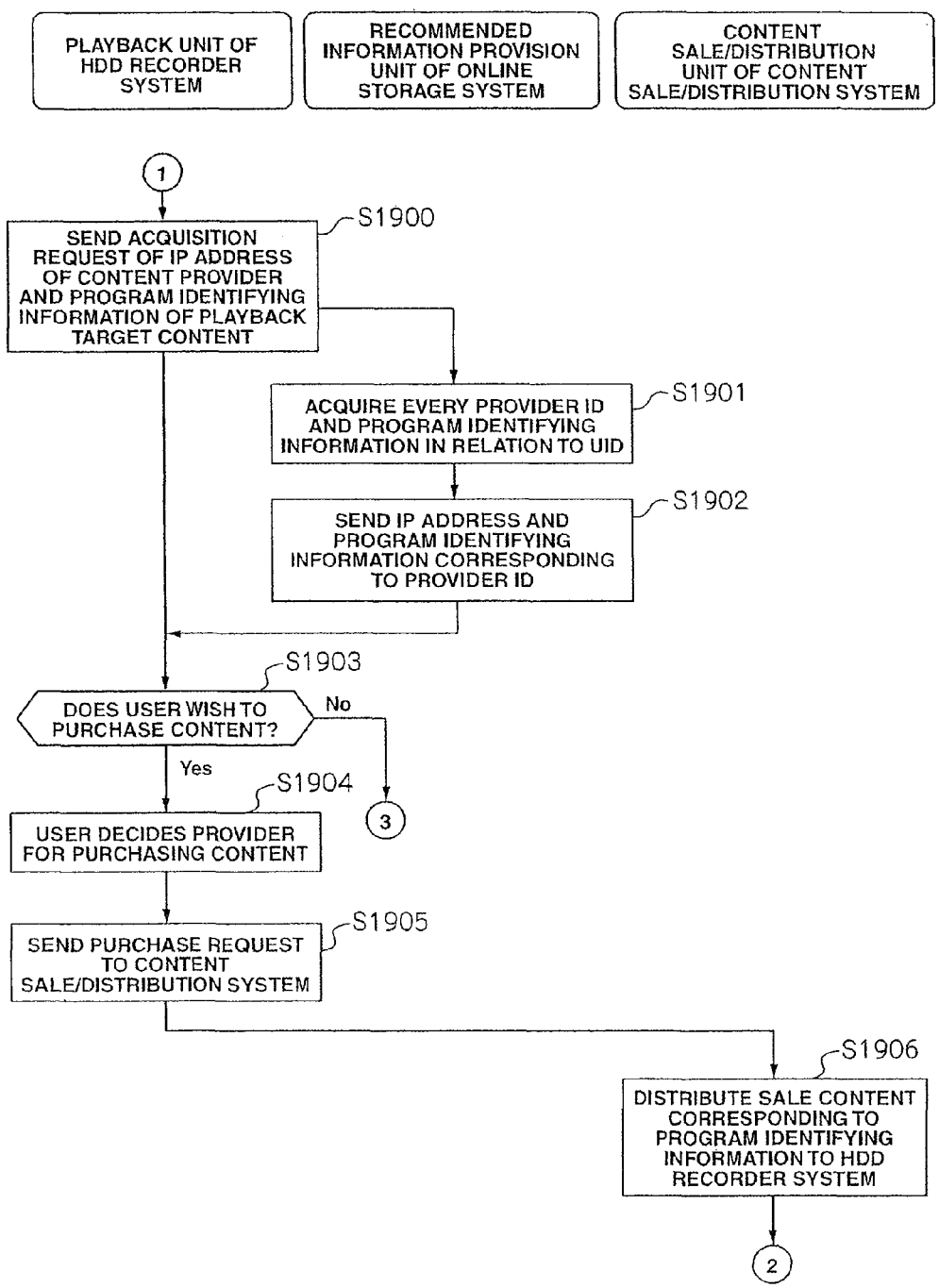
FIG. 19 is a processing flow upon playing a recorded content according to the first embodiment.

The processing flow of creating hobby source information upon playing the recorded contents is now explained with reference to FIG. 18 and FIG. 19.

The playback unit 109 of the HDD recorder system 101 executes the following processing flow when the user presses the play button (not shown) of the HDD recorder system 101.

When the playback unit 109 of the HDD recorder system 101 receives a playback request, it acquires the program identifying information of the playback contents. If the UID is set in the playback request, the UID is also acquired (S1800).

The playback unit 109 determines whether an entry that coincides with the program identifying information acquired from the playback request exists in the recorded content management table 118 (S1801). If an entry that coincides with the program identifying information acquired from the playback request does not exist in the recorded content management table 118 (S1801: No), the playback unit 109 performs the processing at S1900 described later.

If an entry that coincides with the program identifying information acquired from the playback request exists in the recorded content management table 118 (S1801: Yes), the playback unit 109 determines whether the migration flag of the recorded contents subject to a playback request is set to "0" (S1802). If the migration flag is not set to "0" (S1802: No), since this means that the recorded contents are stored in the HDD recorder system 133, the playback unit 109 performs the processing at step S1807.

If the migration flag is set to "0" (S1802: Yes), the playback unit 109 sends a request for reading migrated program identifying information to the backup/migration unit 137 of the online storage system 133 (S1803).

When the backup/migration unit 137 of the online storage system 133 receives the read request, it acquires the program identifying information to be read. The backup/migration unit 137 reads the requested content from the per-user stored content management table 140 using the correspondent's user ID and program identifying information (S1804).

The backup/migration unit 137 sends the read contents to the playback unit 109 of the HDD recorder system 101 (S1805).

The playback unit 109 sets the migration flag and the backup flag of the recorded content management table 118 corresponding to the playback target content to "0" and "1," respectively, and stores the acquired content in the storage apparatus 113 (S1806).

When the playback unit 109 plays the playback target content (S1807), the playback unit 109 adds "1" to the playback count of the recorded content management table 118 corresponding to the played content (S1808).

When the playback unit 109 respectively adds "1" to the category and cast of the hobby source management table 115 that coincide with the category and cast of the played content, it ends the playback processing (S1809).

The processing to be performed when the playback unit 109 determines that an entry that coincides with the program identifying information acquired from the playback request does not exist in the recorded content management table 118 (S1801: No) is further explained below.

The playback unit 109 sends an acquisition request to the online storage system 133 in order to acquire the IP address of the content sale/distribution system 145 and the program identifying information of the playback target content (S1900). The UID acquired from the playback request is set in the acquisition request.

The recommended information provision unit 136 of the online storage system 133 acquires all provider IDs and program information of the all content management table 143 corresponding to the UID set in the acquisition request (S1901).

Subsequently, the recommended information provision unit 136 identifies the IP address corresponding to the provider ID acquired at S1901 from the provider service management table 142, and sends the identified IP address and the program identifying information to the HDD recorder system 101 (S1902).

When the HDD recorder system 101 receives the IP address and the program identifying information, the playback unit 109 determines whether the user wishes to purchase a content (S1903). If the user does not wish to purchase a content (S1903: No), the playback unit 109 ends the playback processing.

If the user wishes to purchase a content (S1903: Yes), the playback unit 109 decides the provided from which the content is to be purchased based on the IP address and the program identifying information that the user received (S1904).

The playback unit 109 sends a purchase request set with a credit card number and program identifying information to the content sale/distribution system 145 of the received IP address (S1905).

The content sale/distribution unit 149 of the content sale/distribution system 145 acquires the credit number and the program identification number set in the purchase request, and, after the buying procedures, decides the sale content corresponding to the program identifying information using the sale content management table 155. The content sale/distribution unit 149 distributes the decided content to the request source HDD recorder system 101 (S1906).

When the HDD recorder system 101 receives the distributed content, since the distributed content is the playback target content, the playback unit 109 subsequently executes the processing at step 1806.

When the content sale/distribution unit 149 is to distribute the content, program information corresponding to that content may be set and sent. Here, when storing the content in the storage apparatus 113 of the HDD recorder system 101, the program information is registered in the recorded content management table 118.

In addition, when the content sale/distribution system 145 is to sell the sale content by storing it in a DVD (Digital Versatile Disc), program information is also stored in the DVD.

At step S1806, although a case was explained where the playback unit 109 stores the content in the storage apparatus 113 and plays the content, the content may also be distributed via streaming.

If the content to be played is a recorded content that has not been backed up or a recorded content that has not been migrated, the playback unit 109 plays such recorded content by reading it from the HDD recorder system 101. In a case where the content to be played is a backup content, the playback unit 109 also plays such content by reading it from the HDD recorder system 101.

Meanwhile, if the content to be played is a migration content, the playback unit 109 plays the content by reading it from the online storage system 133. If the content to be played is a sale content, the playback unit 109 plays the content by reading it from the content sale/distribution system 145.

Although the processing flow of the playback unit 129 of the mobile terminal 127 is not shown, it is the same as the processing flow of the playback unit 109 of the HDD recorder system 101.

In other words, if the playback target content is a recorded content that has not been backed up or a recorded content that has not been migrated, the backup/migration unit 137 of the online storage system 133 foremost stores the playback target content from the HDD recorder system 101 to the online storage system 133. The playback unit 129 thereafter plays the content by reading it from the online storage system 133.

Even if the playback target content is a backup content or a migration content, the playback unit 129 also plays the content by reading it from the online storage system 133.

If the content to be played is a sale content, the playback unit 129 plays the sale content by reading it from the content sale/distribution system 145.

(1-4) Creation Processing of Recommended Information

The processing of the HDD recorder system 101 and the online storage system 133 creating the recommended information is now explained by being divided into the flowcharts of (1-4-1) acquisition processing of various management tables, (1-4-2) analysis processing, (1-4-3) creation processing of recommended information, and (1-4-4) sending processing of recommended information.

(1-4-1) Acquisition Processing of Various Management Tables

The recommended information provision unit 136 of the online storage system 133 creates the all content management table 143 by associating the recorded contents, the sale contents, and the introductory article contents with the program attributes, and manages the recorded contents, the sale contents, and the introductory article contents by assigning an all contents ID (UID) which is a common content ID.

Figure 20:
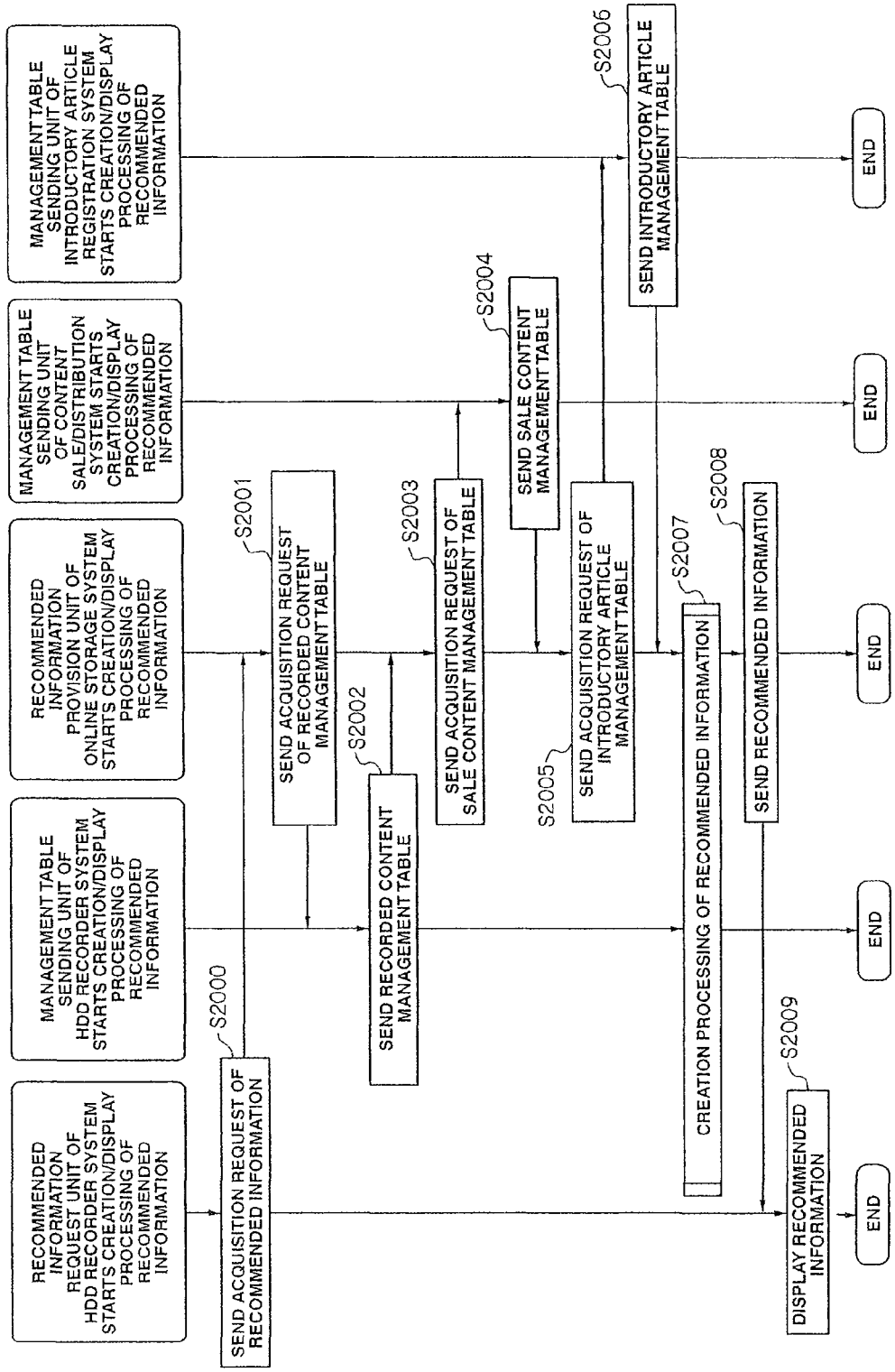
FIG. 20 is a processing flow upon acquiring various management tables according to the first embodiment.

The processing flow upon acquiring various management tables is now explained with reference to FIG. 20.

This processing flow is started when the user presses the creation request button (not shown) of the recommended information of the HDD recorder system 101.

The recommended information request unit 111 of the HDD recorder system 101 sends a recommended information acquisition request to the recommended information provision unit 136 of the online storage system 133 (S2000).

The recommended information provision unit 136 that received the recommended information acquisition request sends the acquisition request of the recorded content management table 118 to the management table sending unit 107 of the HDD recorder system 101 (S2001).

When the management table sending unit 107 of the HDD recorder system 101 that received the acquisition request of the recorded content management table 118 reads the recorded content management table 118, it sends this table 118 to the recommended information provision unit 136 (S2002).

Subsequently, the recommended information provision unit 136 sends the acquisition request of the sale content management table 155 to the management table sending unit 150 of the content sale/distribution system 145 (S2003).

The management table sending unit 150 of the content sale/distribution system 145 that received the acquisition request of the sale content management table 155 reads the sale content management table 155, sends this table 155 to the recommended information provision unit 136 (S2004), and then ends this processing.

The recommended information provision unit 136 sends the acquisition request of the introductory article management table 126 ωacquisition request to the management table sending unit 122 of the introductory article registration system 119 (S2005).

The management table sending unit 122 of the introductory article registration system 119 that received the acquisition request of the introductory article management table 126 sends the introductory article management table 126 to the recommended information provision unit 136 (S2006), and then ends this processing.

The recommended information provision unit performs the creation processing of a file (hereinafter referred to as the "recommended information file) storing the recommended information based on the acquired various tables 118, 155, 126 (S2007). Details concerning the creation processing of the recommended information file will be described later.

The recommended information provision unit 136 sends the created recommended information file to the recommended information request unit 111 of the HDD recorder system 101 (S2008), and then ends this processing.

The recommended information request unit 111 of the HDD recorder system 101 displays the received recommended information file on the display unit 104 (S2009), and then ends this processing.

As a result of this processing, the HDD recorder system 101 is able to provide the recommended information to the user.

Figure 21:
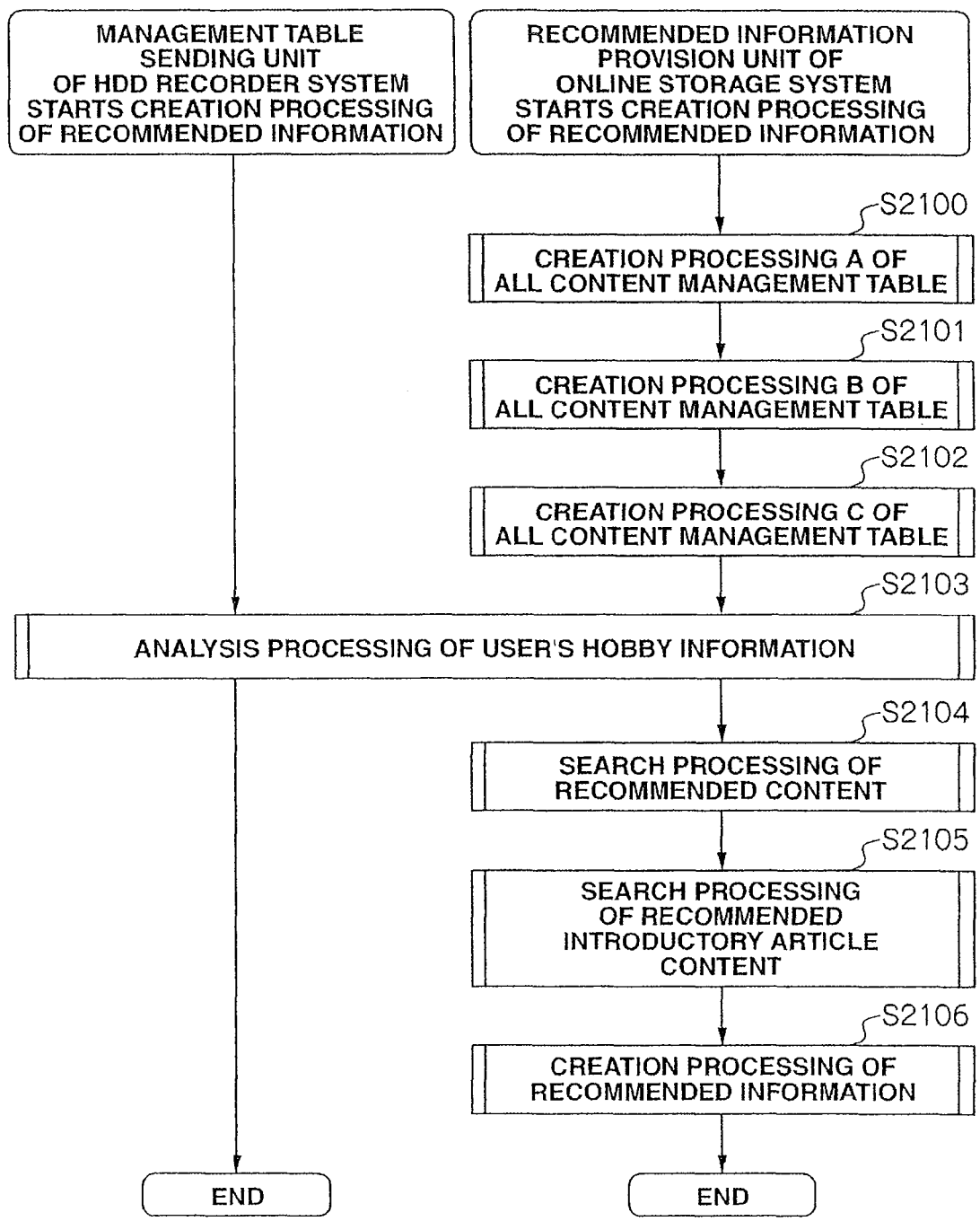
FIG. 21 is a processing flow upon creating recommended information according to the first embodiment.

The processing flow upon creating the recommended information is now explained with reference to FIG. 21. Foremost, the outline of the processing upon creating the recommended information is explained, and the detailed processing flow of each step will be explained later.

Foremost, in creation processing A of the all content management table 143, the recommended information provision unit 136 of the online storage system 133 creates the all content management table 143 using the recorded content management table 118 (S2100).

In creation processing B of the all content management table 143, the recommended information provision unit 136 creates the all content management table 143 using the sale content management table 155 (S2101).

In creation processing C of the all content management table 143, the recommended information provision unit 136 creates the all content management table 143 using the introductory article management table 126 (S2102).

The recommended information provision unit 136 and the management table sending unit 107 of the HDD recorder system 101 perform the user's hobby analysis processing (S2103).

The recommended information provision unit 136 performs the search processing of the recommended contents based on the analysis of the user's hobby information (S2104).

The recommended information provision unit 136 performs the search processing of the recommended introductory article contents based on the analysis of the user's hobby information (S2105).

The recommended information provision unit 136 performs the creation processing of the recommended information file based on the search result of the recommended contents and the search result of the recommended introductory article contents (S2106), and then proceeds to the processing at step S2008.

The recommended information provision unit 136 is able to create the recommended information to be provided to the user based on foregoing step S2100 to step S2106.

Each step is now explained in detail.

(1-4-1a) Creation Processing A

The processing flow upon creating the all content management table 143 from the recorded content management table 118 at step S2100 is now explained with reference to FIG. 22.

The recommended information provision unit 136 acquires one entry that has not yet been acquired by the online storage system 133 among the entries of the recorded content management table 118 (S2200).

The recommended information provision unit 136 acquires one entry of the all content management table 143 (S2201).

If there are a plurality of program attributes due to rebroadcast, the recommended information provision unit 136 determines whether the program attributes of the entries of the recorded content management table 118 and the entries of the all content management table 143 coincide (S2202).

If the program attributes coincide (S2202: Yes), the recommended information provision unit 136 determines whether the program identifying information of the entries of the recorded content management table 118 and the entries of the all content management table 143 coincide (S2203). If the program identifying information coincide (S2203: Yes), the recommended information provision unit 136 performs the processing at step S2206.

If the program identifying information do not coincide (S2203: No), the recommended information provision unit 136 adds the program identifying information of the recorded content management table 118 to the program identifying information column of the all content management table 143 in a list format (S2204), and then performs the processing at step S2206.

If the program attributes do not coincide (S2202: No), since this means that the program attributes have not yet been registered in the all content management table 143, the recommended information provision unit 136 registers the allocated UID, the program identifying information of the recorded content management table 118, and the program attributes in the all content management table 143 (S2205).

The recommended information provision unit 136 determines whether all entries of the all content management table 143 have been acquired (S2206). If all entries have not been acquired (S2206: No), the recommended information provision unit 136 performs the processing at step S2201 once again.

The recommended information provision unit 136 determines whether all entries of the recorded content management table 118 have been acquired (S2207).

If all entries have been acquired (S2207: Yes), the recommended information provision unit 136 ends this processing, and proceeds to the processing at step S2300. Meanwhile, if all entries have not been acquired (S2207: No), the recommended information provision unit 136 performs the processing at step S2200 once again.

(1-4-1b) Creation Processing B

The processing flow upon creating the all content management table 143 from the sale content management table 155 at step S2101 is now explained.

Figure 22:
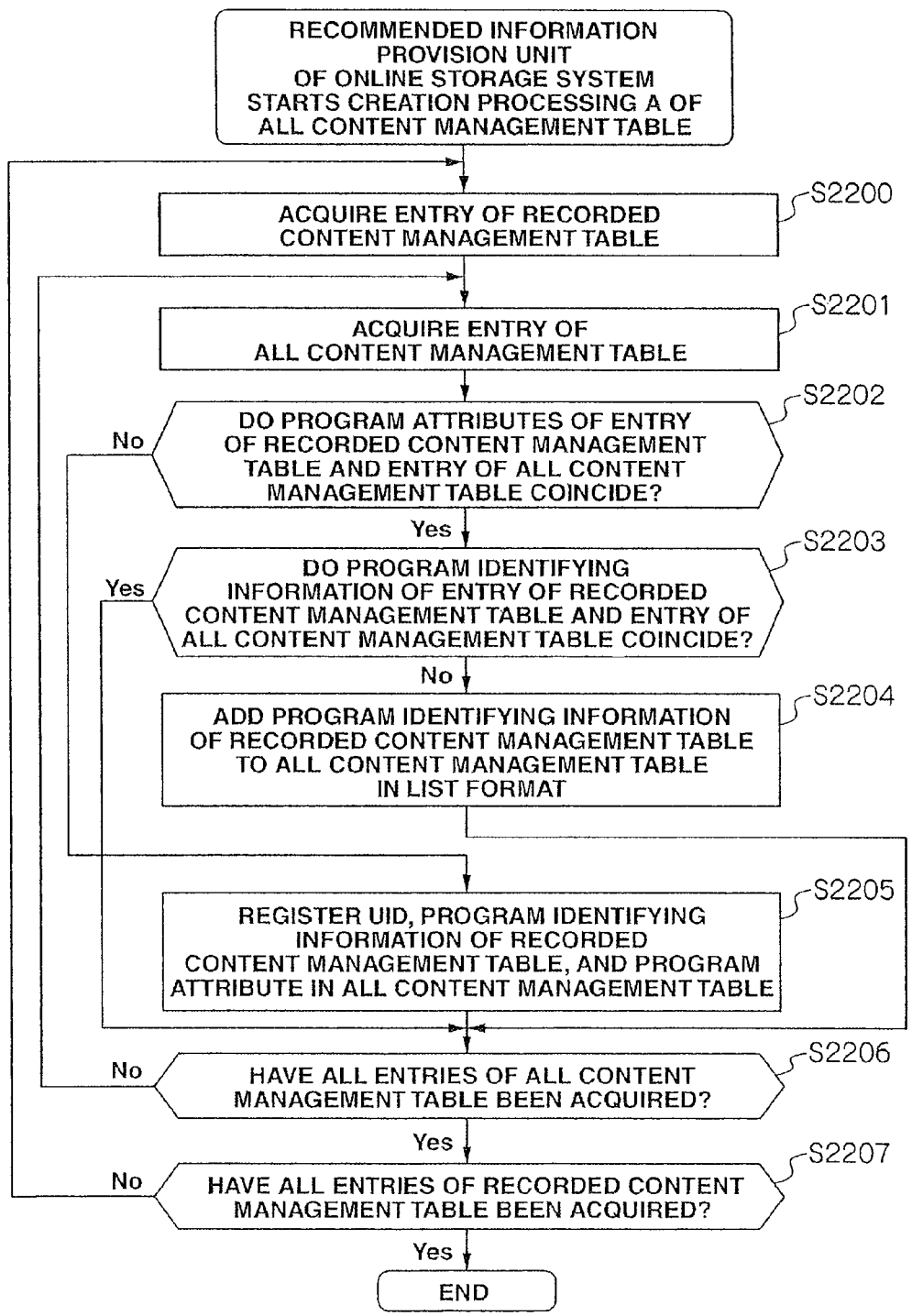
FIG. 22 is a processing flow upon creating an all content management table from a recorded content management table according to the first embodiment.

The processing flow upon creating the all content management table 143 from the sale content management table 155 is the same routine as the processing shown in FIG. 22 other than that the recommended information provision unit 136 performs the processing using the sale content management table 155 instead of the recorded content management table 118. The recommended information provision unit 136 creates the all content management table 143 from the sale content management table 155 based on this processing.

(1-4-1c) Creation Processing C

Figure 23:
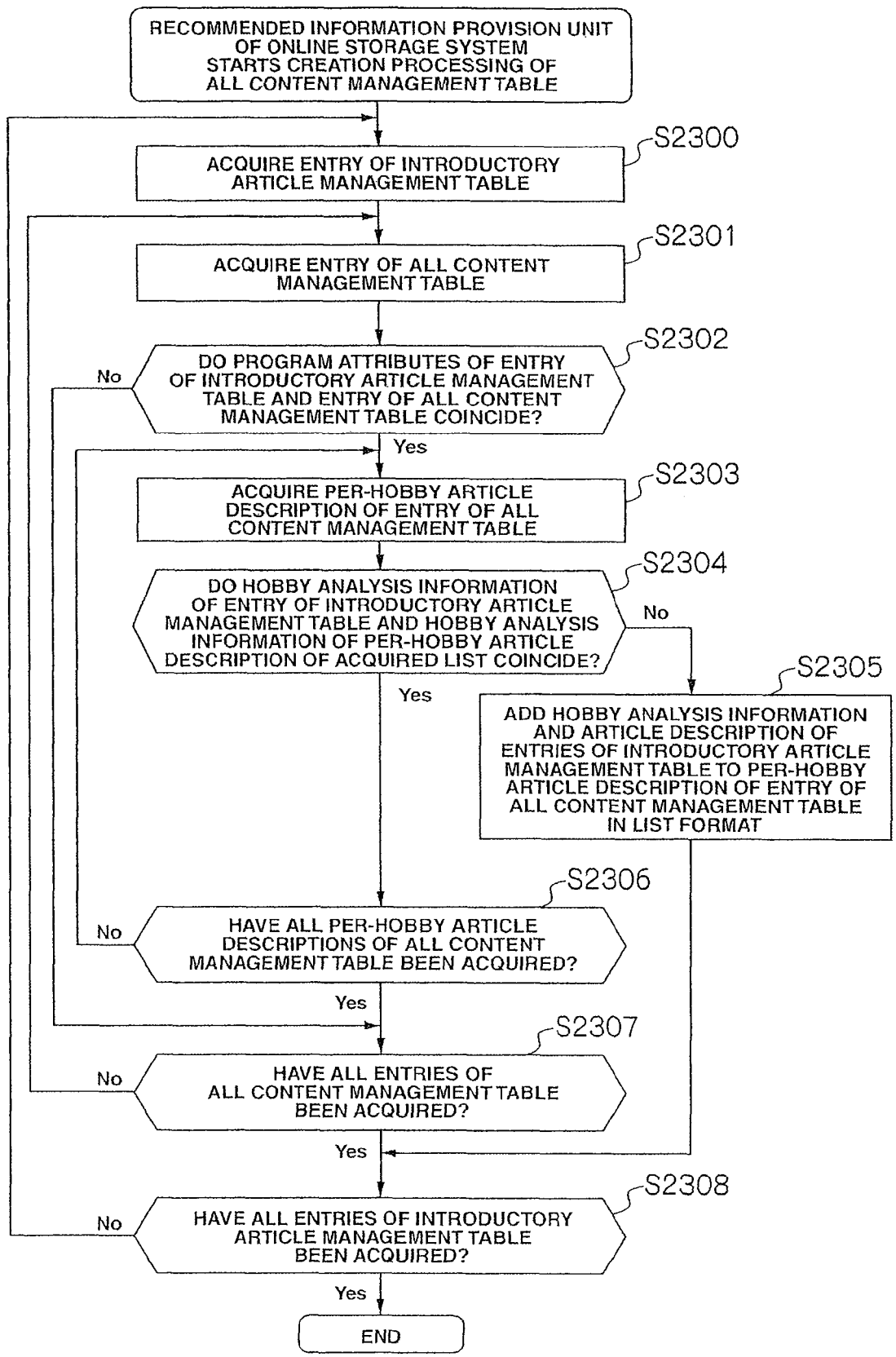
FIG. 23 is a processing flow upon creating an all content management table from an introductory article management table according to the first embodiment.

The processing flow upon creating the all content management table 143 from the introductory article management table 126 at step S2102 is now explained with reference to FIG. 23.

The recommended information provision unit 136 acquires one entry of the introductory article management table 126 (S2300).

The recommended information provision unit 136 acquires one entry from the all content management table 143 (S2301).

The recommended information provision unit 136 determines whether the program attributes of the entry of the introductory article management table 126 and the entry of the all content management table 143 coincide (S2302).

If the program attributes coincide (S2302: Yes), the recommended information provision unit 136 searches for per-hobby article descriptions not yet acquired from the top of the list among the entries of the all content management table 143, and acquires one such per-hobby article description (S2303).

The recommended information provision unit 136 determines whether the hobby analysis information of the entry of the introductory article management table 126 and the hobby analysis information of the per-hobby article description of the acquired list coincide (S2304).

If the hobby analysis information do not coincide (S2304: No), the recommended information provision unit 136 adds the hobby analysis information and the article description of the entries of the introductory article management table 126 to the per-hobby article description of the entry of the all content management table 143 in list format (S2305).

Meanwhile, if the hobby analysis information coincide (S2304: Yes), the recommended information provision unit 136 determines whether all per-hobby article descriptions entered in the all content management table 143 have been acquired (S2306). If all per-hobby article descriptions have not been acquired S2306: No), the recommended information provision unit 136 performs the processing at step S2303 once again.

If the program attributes do not coincide (S2302: No), or if all per-hobby article descriptions have been acquired (S2306: Yes), the recommended information provision unit 136 determines whether all entries of the all content management table 143 have been acquired (S2307). If all entries have not been acquired (S2307: No), the recommended information provision unit 136 performs the processing at step S2301 once again.

If all entries have been acquired (S2307: Yes), the recommended information provision unit 136 determines whether all entries of the introductory article management table 126 have been acquired (S2308). If all entries have not been acquired (S2308: No), the recommended information provision unit 136 performs the processing at step S2300 once again. If all entries have been acquired (S2307: Yes), the recommended information provision unit 136 ends this processing, and performs the processing at step S2103.

Although the recommended information provision unit 136 is comparing the hobby analysis information of the per-hobby article description at step S2304, it may also compare the article descriptions. By the recommended information provision unit 136 comparing the article descriptions, it is also able to overwrite and update the article descriptions of the all content management table 143 when the article descriptions of the introductory article management table 126 are updated.

The recommended information provision unit 136 will be able to identify which content is being sold by which content sale/distribution system 145 by acquiring the entries of the all content management table 143 created with the foregoing processing.

(1-4-2) Analysis Processing

The analysis processing at step S2103, the search processing at step S2104, and the search processing at step 2105 are explained by being divided into the flowcharts of (1-4-2a) analysis processing of user's hobby information, (1-4-2b) search processing of recommended contents based on hobby information, and (1-4-2c) search processing of recommended articles based on hobby information.

(1-4-2a) Analysis Processing of User's Hobby Information

Figure 24:
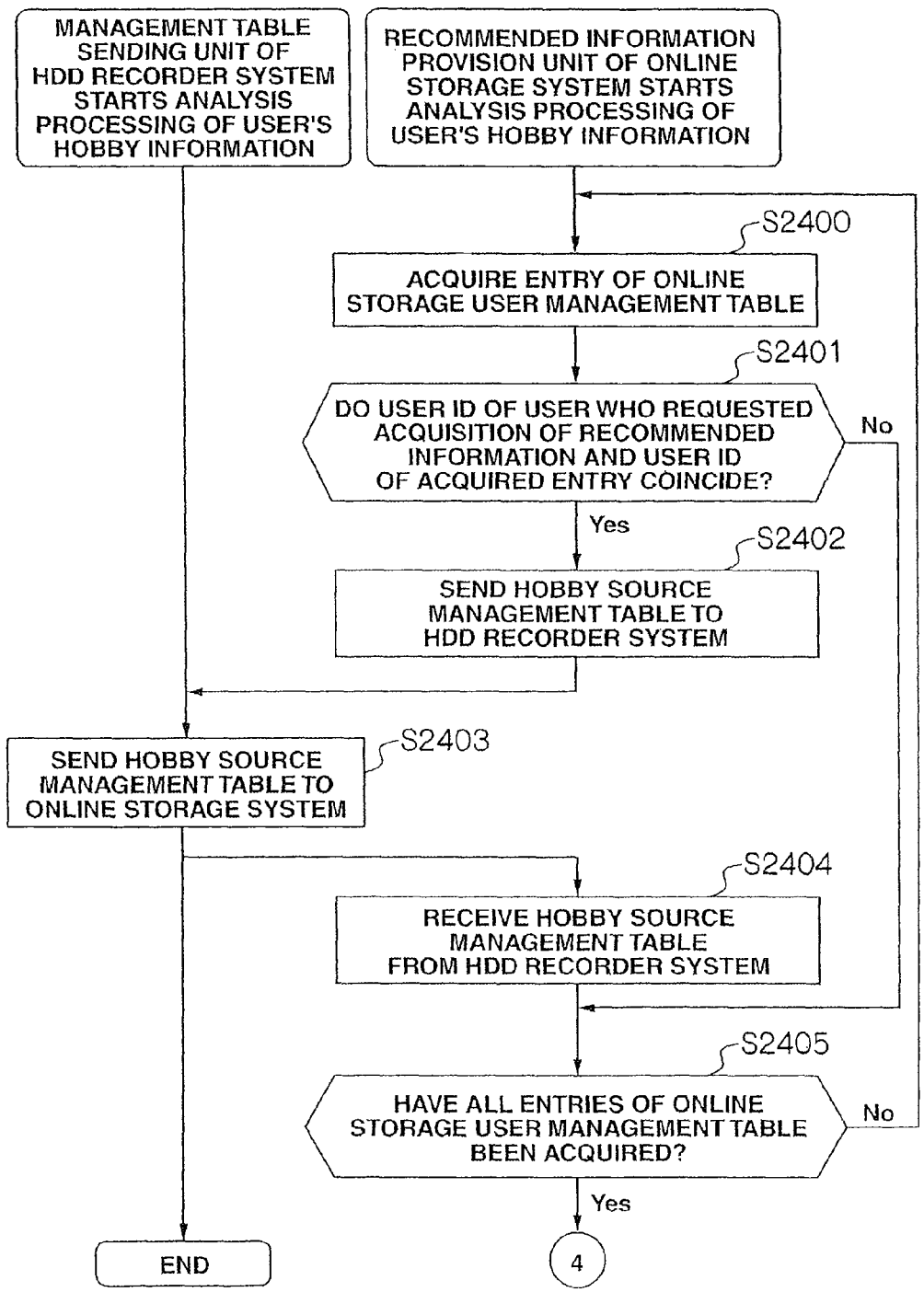
FIG. 24 is a processing flow upon analyzing a user's hobby information according to the first embodiment.
Figure 25:
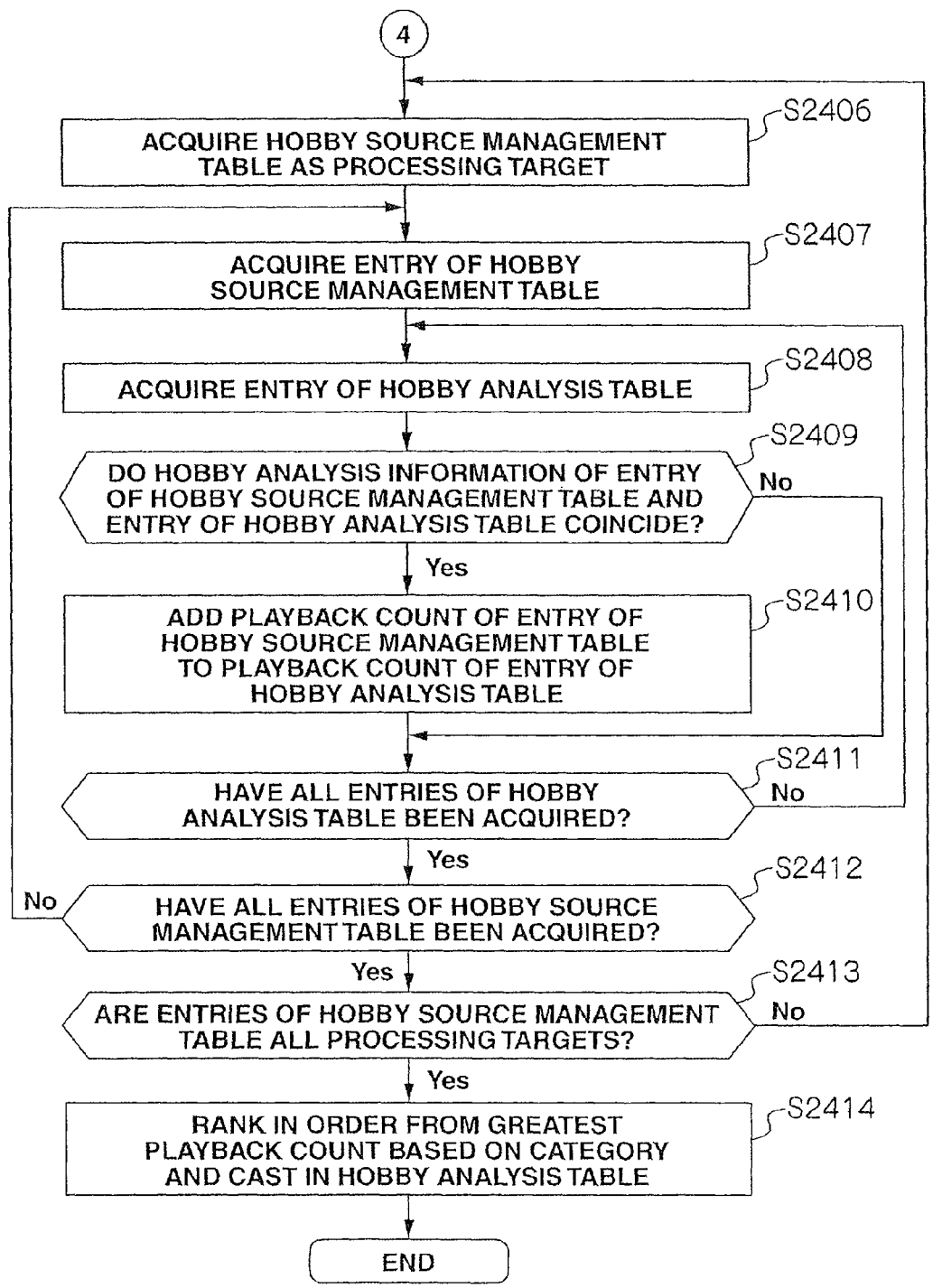
FIG. 25 is a processing flow upon analyzing a user's hobby information according to the first embodiment.

The processing flow upon analyzing the user's hobby information is now explained with reference to FIG. 24 and FIG. 25.

The recommended information provision unit 136 acquires one entry of the online storage user management table 141 (S2400).

The recommended information provision unit 136 determines whether the user ID of the user who requested the acquisition of the recommended information and the user ID of the acquired entry coincide (S2401). If the user IDs do not coincide (S2401: No), the recommended information provision unit 136 performs the processing at step S2405.

If the user IDs coincide (S2401: Yes), the recommended information provision unit 136 acquires the IP address from the entry of the online storage user management table 141, and sends the acquisition request of the hobby source management table 115 to the management table sending unit 107 of the HDD recorder system 101 to which the IP address is set (S2402).

The management table sending unit 107 of the HDD recorder system 101 sends the hobby source management table 115 to the recommended information provision unit 136 of the request source online storage system 133 S2403.

The recommended information provision unit 136 receives the requested hobby source management table 115 from the HDD recorder system 101 (S2404).

The recommended information provision unit 136 determines whether all entries of the online storage user management table 141 have been acquired (S2405). If all entries of the online storage user management table 141 have not been acquired (S2405: No), the recommended information provision unit 136 performs the processing at step S2400 once again.

If all entries of the online storage user management table 141 have been acquired (S2405: Yes), the recommended information provision unit 136 acquires one hobby source management table 115 of the HDD recorder system 101 owned by the user and sets it as the processing target (S2406).

The recommended information provision unit 136 acquires one entry from the hobby source management table 115 (S2407).

The recommended information provision unit 136 acquires one entry of the hobby analysis table 166 (S2408).

The recommended information provision unit 136 determines whether the hobby analysis information of the entry of the hobby source management table 115 and the entry of the hobby analysis table 166 coincide (S2409). If the hobby analysis information do not coincide (S2409: No), the recommended information provision unit 136 performs the processing at step S2411.

If the hobby analysis information coincide (S2409: Yes), the recommended information provision unit 136 adds the playback count corresponding to the entry of the hobby source management table 115 to the playback count corresponding to the entry of the hobby analysis management table 166 (S2410).

The recommended information provision unit 136 determines whether all entries of the hobby analysis table 166 have been acquired (S2411). If all entries have not been acquired (S2411: No), the recommended information provision unit 136 performs the processing at step S2508 once again.

If all entries of the hobby analysis table 166 have been acquired (S2411: Yes), the recommended information provision unit 136 determines whether all entries of the hobby source management table 115 have been acquired (S2412). If all entries have not been acquired (S2412: No), the recommended information provision unit 136 performs the processing at step S2507 once again.

If all entries of the hobby source management table 115 have been acquired (S2412: Yes), the recommended information provision unit 136 subsequently determines whether all entries of the hobby source management tables 115 of the HDD recorder system 101 owned by the user have been set as processing targets (S2413). If all entries have not been acquired (S2413: No), the recommended information provision unit 136 performs the processing at step S2506 once again.

If all entries of the hobby source management table 115 have been acquired (S2413: Yes), the recommended information provision unit 136 ranks the entries in descending order of the playback count based on the category and cast of the hobby analysis table 166 (S2414), and then ends this processing. The recommended information provision unit 136 thereafter performs the processing at step S2104 described above.

(1-4-2b) Search Processing of Recommended Contents Based on Hobby Information

Figure 26:
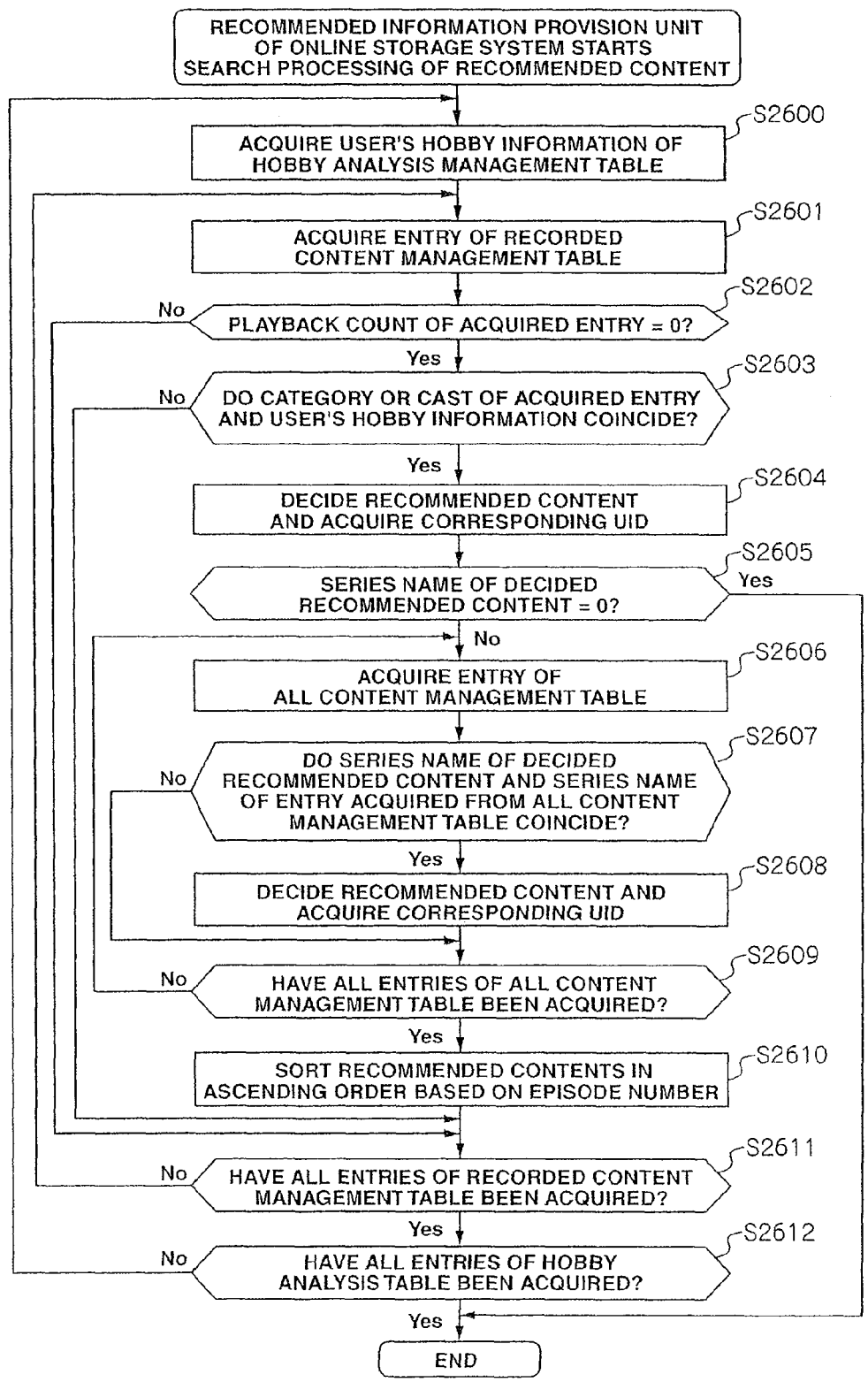
FIG. 26 is a processing flow upon searching for a recommended content based on hobby information according to the first embodiment.

The processing flow upon searching for the recommended contents based on the hobby information is now explained with reference to FIG. 26.

The recommended information provision unit 136 searches for the user's hobby information (category and cast), which has not yet been acquired, of the hobby analysis table 166 in ascending order of the rank, and then acquires one entry (S2600).

The recommended information provision unit 136 searches for entries of the recorded content management table 118 in the HDD recorder system 101 that sent the recommended information creation request in ascending order of the recorded content IDs, and then acquires one entry (S2601).

The recommended information provision unit 136 determines whether the playback count of the entry acquired from the recorded content management table 118 is "0" (S2602). If the playback count is not "0" (S2602: No), since this is a program that has been viewed by the user, the recommended information provision unit 136 performs the processing at step S2611.

If the playback count is "0" (S2602: Yes), since this is a program that has not yet been viewed by the user, the recommended information provision unit 136 determines whether the category or cast of the entry acquired from the recorded content management table 118 and the user's hobby information acquired from the hobby analysis table 166 coincide (S2603). If they do not coincide (S2603: No), since this means that the acquired recorded content is not within the user's hobby range, the recommended information provision unit 136 performs the processing at step S2611.

Meanwhile, if they coincide (S2603: Yes), since this means that the acquired recorded content is within the user's hobby range, the recommended information provision unit 136 decides this content as a recommended content, and acquires the corresponding UID from the recorded content management table 118 and the all content management table 143 (S2604).

Subsequently, the recommended information provision unit 136 determines whether the series name of the decided recommended content is "0" (S2605).

If it is determined that the decided recommended content is not a serial program (S2605: Yes), the recommended information provision unit 136 ends this processing.

Meanwhile, if it is determined that the decided recommended content is a serial program (S2605: No), the recommended information provision unit 136 acquires one entry of the all content management table 143 (S2606).

The recommended information provision unit 136 determines whether the series name of the decided recommended content and the series name of the entry acquired from the all content management table 143 coincide (S2607).

If the series names coincide (S2607: Yes), since this means that the entry acquired from the all content management table 143 is a serial program of the decided recommended content, the recommended information provision unit 136 decides this content as the recommended content, and acquires the corresponding UID from the recorded content management table 118 and the all content management table 143 (S2608).

If the series names do not coincide (S2607: No), since this means that the entry acquired from the all content management table 143 is not a serial program of the decided recommended content, the recommended information provision unit 136 determines whether all entries of the all content management table 143 have been acquired (S2609). If all entries of the all content management table 143 have not been acquired (S2609: No), the recommended information provision unit 136 performs the processing at step S2606 once again.

If all entries of the all content management table 143 have been acquired (S2609: Yes), the recommended information provision unit 136 sorts the recommended contents decided from the content group of the recorded content management table 118 in ascending order based on the episode number of the recorded content management table 118 (S2610).

The recommended information provision unit 136 determines whether all entries of the recorded content management table 118 in the HDD recorder system 101 that sent the recommended information creation request have all been acquired (S2611). If all entries of the recorded content management table 118 have not been acquired (S2611: No), the recommended information provision unit 136 performs the processing at step S2601 once again.

If all entries of the recorded content management table 118 have been acquired (S2611: Yes), the recommended information provision unit 136 subsequently determines whether all entries of the hobby analysis table 166 have been acquired (S2612). If all entries of the hobby analysis table 166 have not been acquired (2612: No), the recommended information provision unit 136 performs the processing at S2600 once again. Meanwhile, if all entries of the hobby analysis table 166 have been acquired (S2612: Yes), the recommended information provision unit 136 ends this processing, and then performs the processing at step S2105 described above.

In order to prevent the same recorded content being decided as the recommended content each and every time, the recommended information provision unit 136 leaves a history of the recommended contents, and performs processing to select the recommended content among the contents that are not recorded in the history to prevent the same content from being selected every time.

(1-4-2c) Search Processing of Recommended Articles Based on Hobby Information

Figure 27:
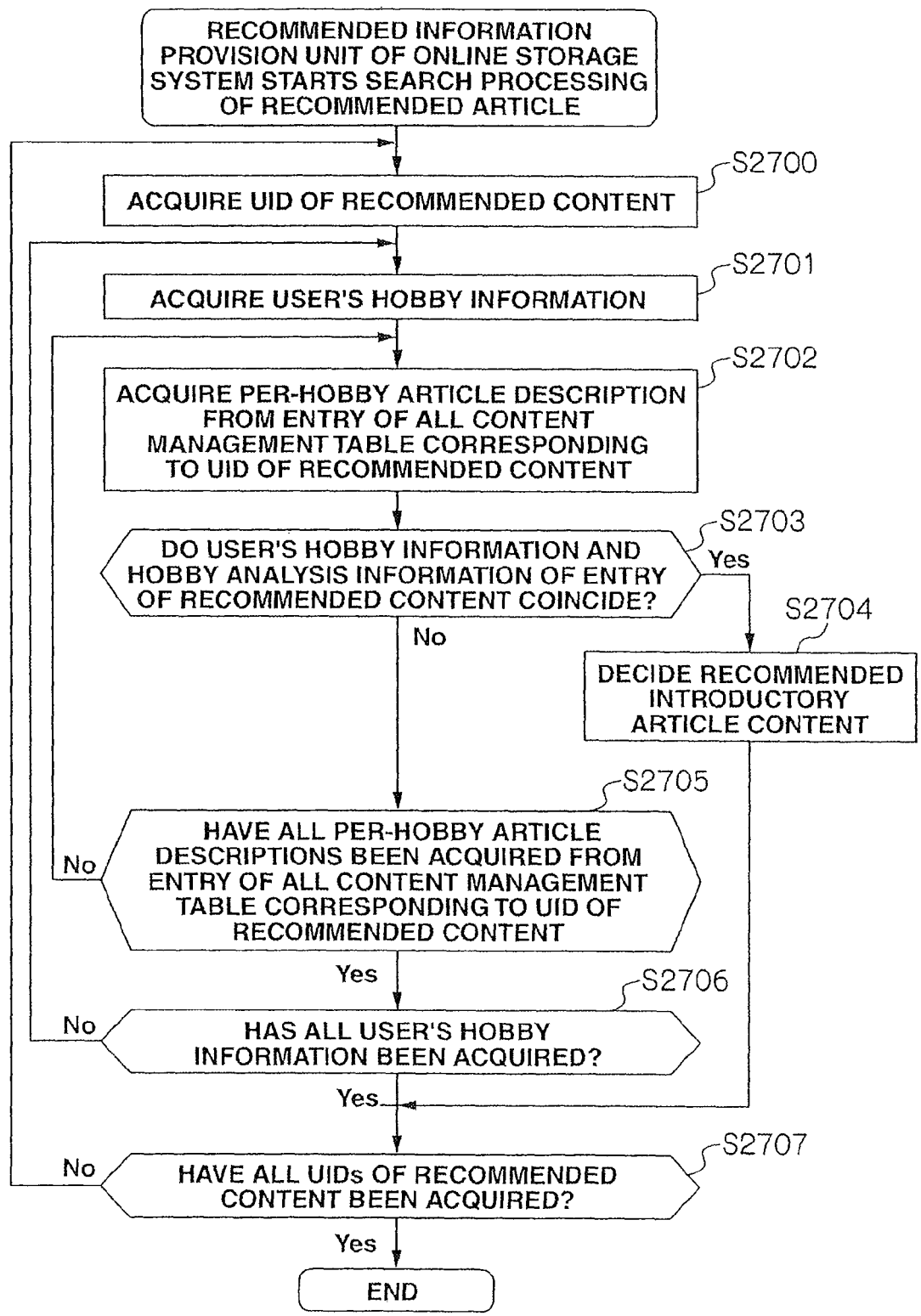
FIG. 27 is a processing flow upon searching a recommended article content based on hobby information according to the first embodiment.

The processing flow upon searching for recommended articles based on the hobby information is now explained with reference to FIG. 27.

The recommended information provision unit 136 acquires one recommended content from the decided recommended contents, and acquires the UID corresponding to the recommended content from the all content management table 143 (S2700).

The recommended information provision unit 136 searches for the user's hobby information (category, cast) from the entries of the hobby analysis table 166 in ascending order of the rank based on the playback count of the hobby information, and acquires one piece of user's hobby information (S2701).

The recommended information provision unit 136 acquires one per-hobby article description that has not yet been acquired from the entry of the all content management table 143 corresponding to the UID of the recommended content (S2702).

The recommended information provision unit 136 determines whether the user's hobby information and the hobby analysis information of the entry of the recommended content coincide (S2703).

If the user's hobby information and the hobby analysis information of the entry of the recommended content coincide (S2703: Yes), the recommended information provision unit 136 decides this per-hobby article description as the recommended introductory article content (also referred to as the recommended content) (S2704).

If the user's hobby information and the hobby analysis information of the entry of the recommended content do not coincide (S2703: No), or if the recommended introductory article content has been decided (S2704), the recommended information provision unit 136 determines whether all per-hobby article descriptions have been acquired from the entry of the all content management table 143 corresponding to the UID of the recommended content (S2705). If all per-hobby article descriptions have not been acquired (S2705: No), the recommended information provision unit 136 performs the processing at step S2702 once again.

If all per-hobby article description have been acquired (S2705: Yes), the recommended information provision unit 136 subsequently determines whether all user's hobby information has been acquired from the hobby analysis table 166 (S2706). If all user's hobby information has not been acquired (S2706: No), the recommended information provision unit 136 performs the processing at step S2702 once again.

Meanwhile, if all user's hobby information has been acquired (S2706: Yes), the recommended information provision unit 136 determines whether all UIDs of the recommended contents have been acquired (S2707). If all UIDs of the recommended contents have not been acquired (S2707: No), the recommended information provision unit 136 performs the processing at step S2700 once again.

If all UIDs of the recommended contents have been acquired (S2707: Yes), the recommended information provision unit 136 ends this processing, and then performs the processing at step S2106.

(1-4-3) Creation Processing of Recommended Information

Figure 28:
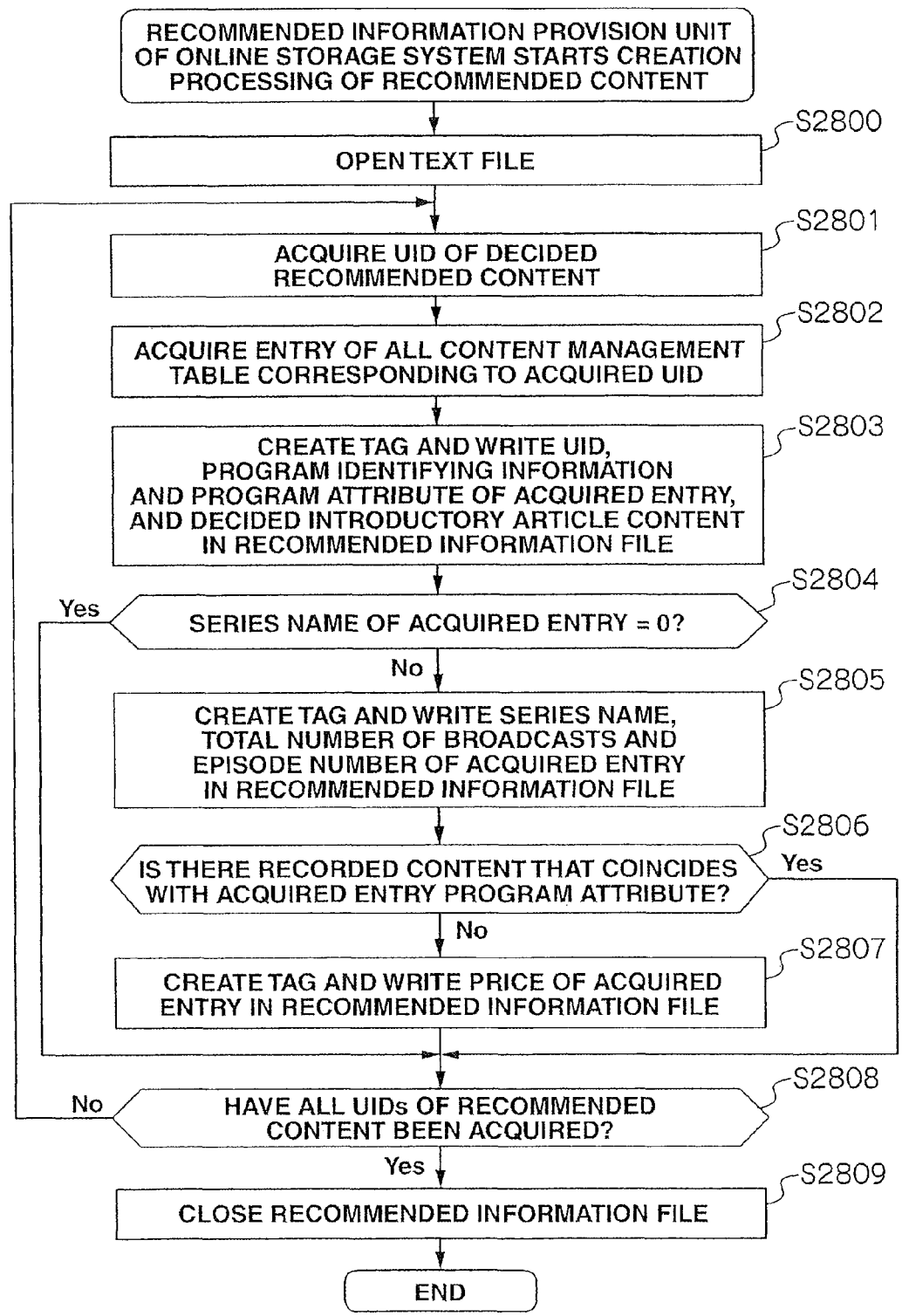
FIG. 28 is a processing flow upon creating a recommended information file according to the first embodiment.

The processing flow upon creating the recommended contents in a file format is now explained with reference to FIG. 28.

The recommended information provision unit 136 opens a new text file in order to create the recommended contents searched at step S2104 and step S2105 in a text file format (S2800). Since the recommended contents are written into this new text file, the recommended information provision unit 136 sets this text file as the recommended information file.

The recommended information provision unit 136 searches for the UIDs of the decided recommended contents in ascending order, and then acquires one UID of the decided recommended contents (S2801).

The recommended information provision unit 136 acquires the entry of the all content management table 143 corresponding to the acquired UID (S2802).

The recommended information provision unit 136 creates a tag, and writes the UID of the acquired entry, the program identifying information, the program attributes and the decided recommended introductory article content into the recommended information file (S2803).

The recommended information provision unit 136 determines whether series name of the acquired entry is "0" (S2804). If the acquired entry is a serial program (S2804: Yes), the recommended information provision unit 136 performs the processing at step S2808.

If the acquired entry is not a serial program (S2804: No), the recommended information provision unit 136 creates a tag input with item information, and writes the series name of the acquired entry, the total number of broadcasts, and the episode number into the recommended information file (S2805).

The recommended information provision unit 136 determines whether there is a recorded content that coincides with the program attributes of the acquired entry based on the recorded content management table 118 (S2806). In other words, the recommended information provision unit 136 determines whether the acquired entry has already been recorded. If the acquired entry has already been recorded (S2806: Yes), the recommended information provision unit 136 performs the processing at step S2808 without writing the price information of the acquired entry into the recommended information file.

If the acquired entry has not yet been recorded (S2806: No), the recommended information provision unit 136 creates a tag input with the price item information, and writes the price of the acquired entry into the recommended information file (S2807).

The recommended information provision unit 136 determines whether all UIDs of the recommended contents have been acquired (S2808). If all UIDs of the recommended contents have not been acquired (S2808: No), the recommended information provision unit 136 performs the processing at step S2801 once again.

If all UIDs of the recommended contents have been acquired (S2808: Yes), since this means that the all recommended contents have been written into the recommended information file, the recommended information provision unit 136 closes the recommended information file (S2809). The recommended information provision unit 136 is able to create the recommended information file based on the foregoing processing.

FIG. 29 shows an example of displaying, in a text format, the recommended information file created by the recommended information provision unit 136 executing the foregoing processing steps.

For example, let it be assumed that the rank of "Act1" of "User0" in the hobby analysis management table 166 created with the hobby information analysis processing at step S2103 is "1." Here, in the search processing of the recommended contents at step S2104, the recorded content of "R_ID2" in which the playback count is "0" and the cast is "Act1" is foremost decided as the recommended content among the recorded contents registered in the recorded content management table 118. Since "R_ID2" is a serial program content with a registered series name, the contents having the same series name registered in the all content management table 143 are also decided as the recommended content.

As a result of the search processing of the recommended contents, the contents assigned with an all contents ID of "U_ID2," "U_ID3," and "U_ID4" are decided as the recommended contents.

Subsequently, in the search processing of the recommended introductory article contents at step S2105, the article description in which the hobby analysis information of the per-hobby article description is "Act1" is decided as the recommended introductory article content using the all content management table 143. Consequently, "Rep6" corresponding to "U_ID2," "Rep8" corresponding to "U_ID3" and "Rep10" corresponding to "U_ID4" are decided as the recommended introductory article contents.

Based on the foregoing information, the recommended information provision unit 136 executes the creation processing of recommended information, creates a recommended information file F as shown in FIG. 29, and provides this to the user via the display unit 104 of the HDD recorder system 101.

In the foregoing embodiment, although the creation of the recommended information was triggered by the user's request, the recommended information provision unit 136 may also periodically perform step S2100 to step S2106, thereafter send the recommended information to the HDD recorder system 101 or the mobile terminal 127 and thereby provide the recommended information to the user.

For example, the recommended information provision unit 136 may send the recommended information via email to the mobile terminal 127. If the mobile terminal 127 is equipped with GPS, the recommended information provision unit 136 will normally send the recommended information to the HDD recorder system 101, but if the recommended information provision unit 136 detects that the mobile terminal 127 has left the household based on GPS information, it may change the destination from the HDD recorder system 101 and send the recommended information to the mobile terminal 127.

If a recommended information acquisition request is issued from the mobile terminal 127 and a recorded content that only exists in the HDD recorder system 101 is to be played, since replication of the content from the HDD recorder system 101 to the online storage system 133 is required, a delay will occur. Thus, in this case, the recommended information provision unit 136 may exclude the recorded contents that are only stored in the online storage system 133 from the recommended contents. If the backup flag and the migration flag of the per-user stored content management table 140 are set to "0," since the recommended information provision unit 136 is able to determine that such content is stored only in the HDD recorder system 101, it may exclude such content from the recommended contents.

Although in this embodiment the recommended information provision unit 136 acquired the channel number and the broadcast date and time from the program information to be broadcast, it may also acquire such information from the G-code.

(1-5) Effect of Present Embodiment

According to the present embodiment, the option of contents to be recommended to the user is not limited to the contents that were actually recorded with the HDD recorder system, and can be expanded to the contents in the online storage system and to the contents sold with the content sale/distribution system. Thus, contents that are even more favored by the user can be recommended.

In addition, with this content provision system, a plurality of sequential contents can be introduced, and, even if the user forgets to record a specific episode number, the user is able to play such episode number by purchasing it from the content sale/distribution system, and the user-friendliness is thereby improved.

As a result of providing introductory article contents that match the user's hobby, it is possible to possible to increase the incentive of users to view and listen to the recommended contents.

(2) Second Embodiment

The second embodiment is now explained with reference to the attached drawings.

This embodiment aims to realize a system capable of providing recommended contents that more closely match the user's hobby by analyzing, in addition to the user's hobby information in the HDD recorder system 101A, the user's hobby information from contents (content data) such as email, Web access history, blog, SNS community, and audio information of a voice recorder.

Figure 30:
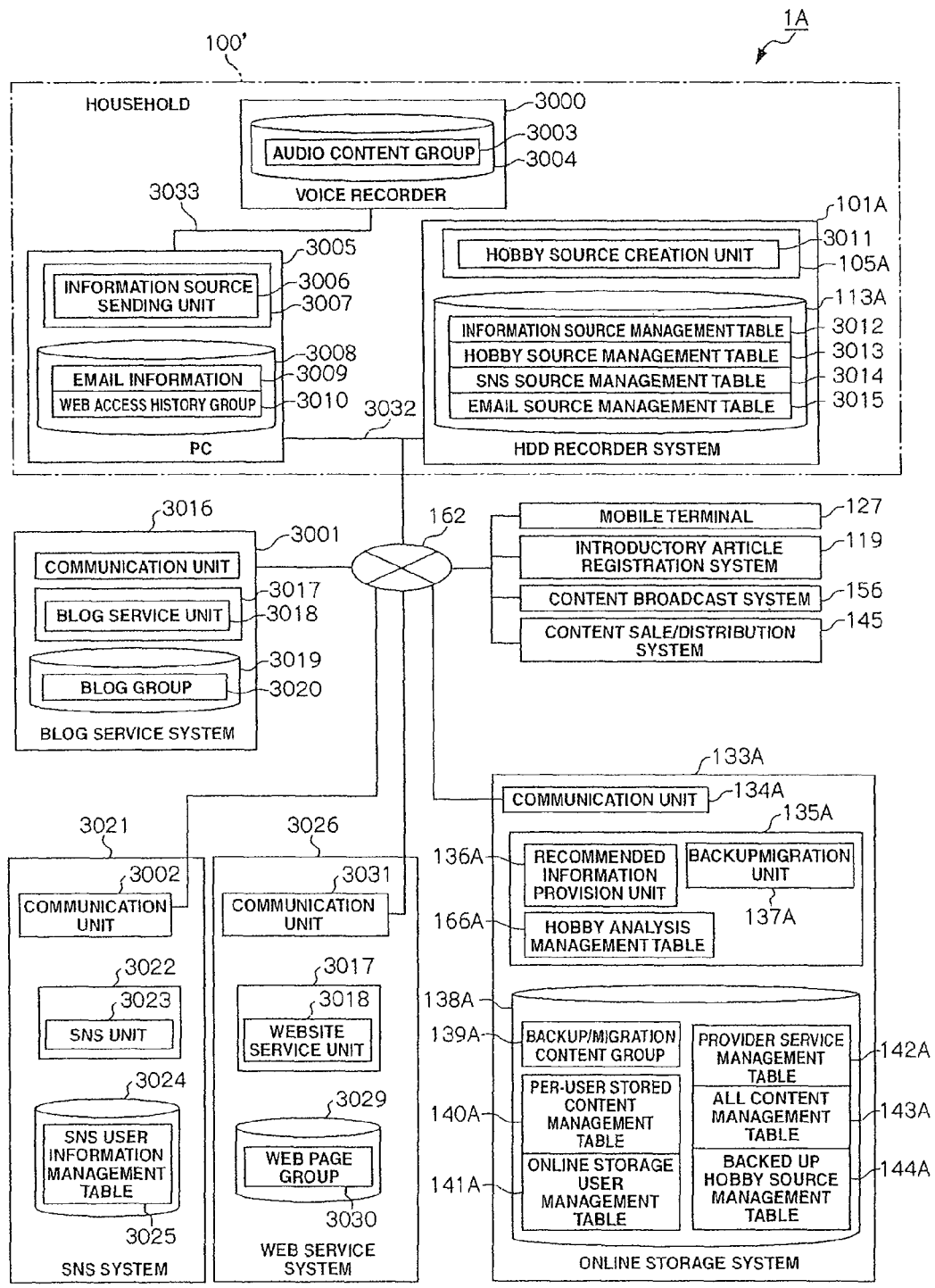
FIG. 30 is a block diagram showing the configuration of a content provision system according to the second embodiment.

FIG. 30 shows the schematic configuration of a content provision system 1A according to the second embodiment.

The content provision system 1A of this embodiment is configured by a PC 3005, a voice recorder 3000, and an HDD recorder system 101A installed in a household 100' being connected to a blog service system 3016, an SNS system 3021, a Web service system 3026, and an online storage system 133A via a network 162.

The PC 3005 is used by the user for accessing email, blog site, SNS site, and Website, and is provided with a storage apparatus 3008 and a memory 3007.

The storage apparatus 3008 of the PC 3005 stores email information 3009 collectively storing the sent and received emails, and a Web access history group 3010 storing the history of past accesses to Websites.

The memory 3007 of the PC 3005 temporarily stores an information source sending unit 3006 for sending the email text data of the email information and the URL data of the Web access history to the HDD recorder system 101A.

The voice recorder 3000 is connected to the PC 3005, for example, with a USB 3033. The HDD recorder system 101A acquires audio content from the voice recorder 3000 via the PC 3005. The voice recorder 3000 is connected to the PC 3005, and is of a status where it is able to recognize a file system of the voice recorder 3000 from the PC 3005 and access files.

The voice recorder 3000 is configured from a storage apparatus 3004. The storage apparatus 3004 stores an audio content group 3003 recorded by the voice recorder 3000. An audio content group 3003 is a plurality of audio contents recorded by the voice recorder 3000.

The HDD recorder system 101A is configured from a storage apparatus 113A storing various tables 3012 to 3015, and a memory 105A for temporarily storing the hobby source creation unit 3011. Configuration of the various tables will be described later.

The blog service system 3016 is configured from a communication unit 3001 for connecting to the network 162, a memory 3017 for temporarily storing a blog service unit 3018 that provides a blog service, and a storage apparatus 3019 storing a blog group 3020. A blog group shows that there are a plurality of blogs posted by the user.

The SNS system 3012 is configured from a communication unit 3002 for connecting to the network 162, a memory 3022 for temporarily storing an SNS unit 3023 that provides SNS, and a storage apparatus 3024 storing an SNS user information management table 3025.

The Web service system 3026 is configured from a communication unit 3031 for connecting to the network 162, a memory 3027 for temporarily storing a Website service unit 3028 that provides a service for posting a Website, and a storage apparatus 3024 storing a Web page group 3030. A Web page group shows that there are a plurality of Web pages.

Since the online storage system 133A is configured the same as the configuration explained in the first embodiment, the explanation thereof is omitted. Nevertheless, since that target contents are different from the first embodiment, the components that have the same function as the components explained in the first embodiment are given the suffix of "A" to the reference number in FIG. 30.

FIG. 31 shows an example of the information source management table 3012.

The information source management table 3012 is a table for the HDD recorder system 101A to manage information, and is configured from an "information source ID" column 3100, an "information type" column 3101, an "information source" column 3102, a "weight" column 3103, a "last acquisition date and time" column 3104, a "user ID" column 3105, and a "password" column 3106.

The "information source ID" column 3100 registers the ID for the HDD recorder system 101A to manage the information source in the self-system.

The "information type" column 3101 registers the type of information source to be used for deciding the processing contents when the hobby source creation unit 3011 of the HDD recorder system 101A creates the hobby source information.

The "information source" column 3102 registers the destination from which the information of the information type is to be acquired.

The "weight" column 3102 shows the ratio of the information sources valued by the user, and registers the value to be multiplied to the hit count upon calculating the hit count of the hobby source management table 3013. The level of influence to the user's hobby can be changed by changing the numerical value of the weight 3102.

The "last acquisition date and time" column 3103 registers the last acquisition date and time that the hobby source creation unit 3011 acquired the information source.

The "user ID" column 3105 and the "password" column 3106 register the user ID and password to be used for logging into SNS using API.

Figure 32:
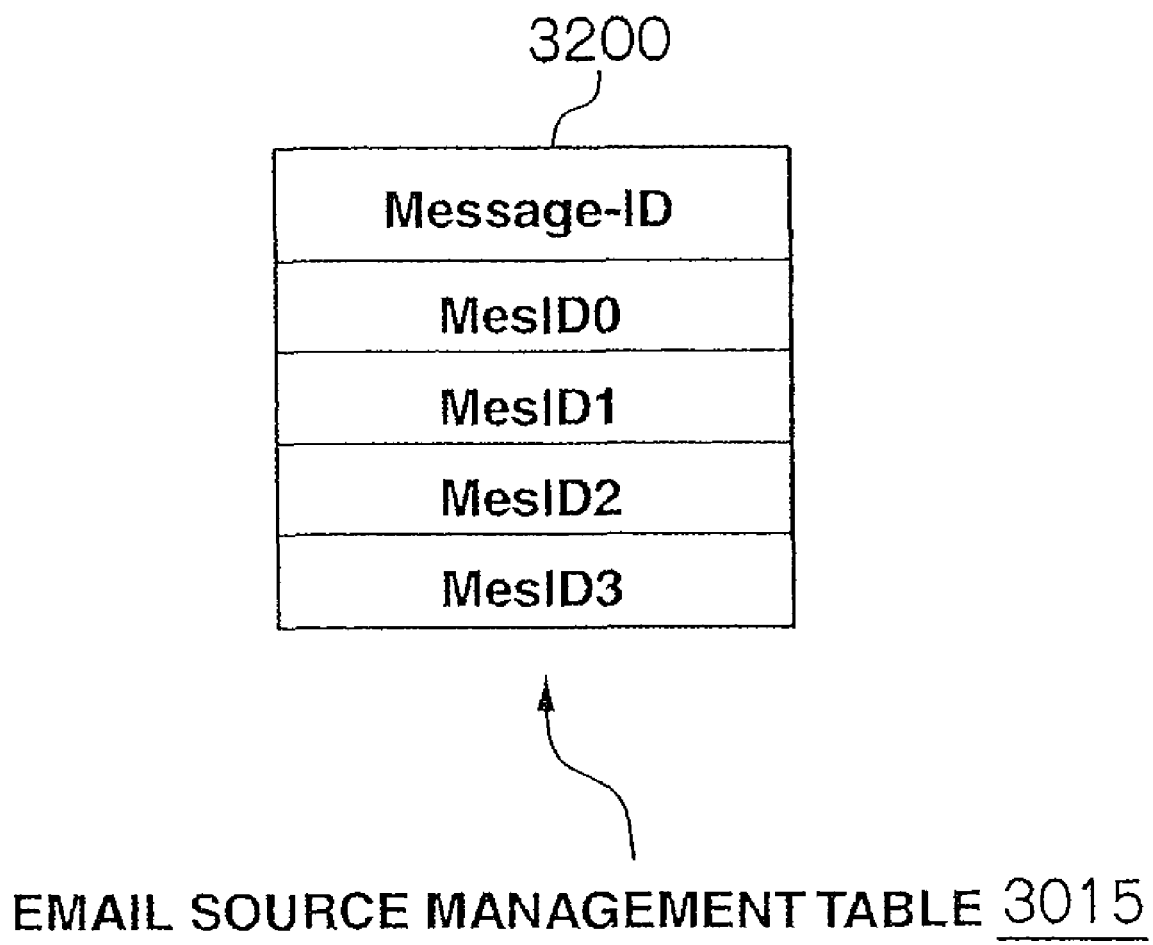
FIG. 32 is a chart showing an email source management table according to the second embodiment.

FIG. 32 shows an example of the email source management table 3015.

The email source management table 3015 is a table for managing the email information 3009 of the HDD recorder system 101A, and is configured from a "Message-ID" column 3200. The "Message-ID" column 3200 registers the identifier for uniquely identifying the emails created by the email client.

FIG. 33 shows an example of the SNS user information management table.

The SNS user information management table 3025 is a table for the SNS system 3021 to manage the information of the user using SNS, and is configured from a "community ID" column 3300, and a "community name" column 3301. The "community ID" column 3300 registers the ID for the SNS system 3021 manage the community name in the self-system.

The "community name" column 3301 registers the community name to which the user belongs in SNS.

Figure 34:
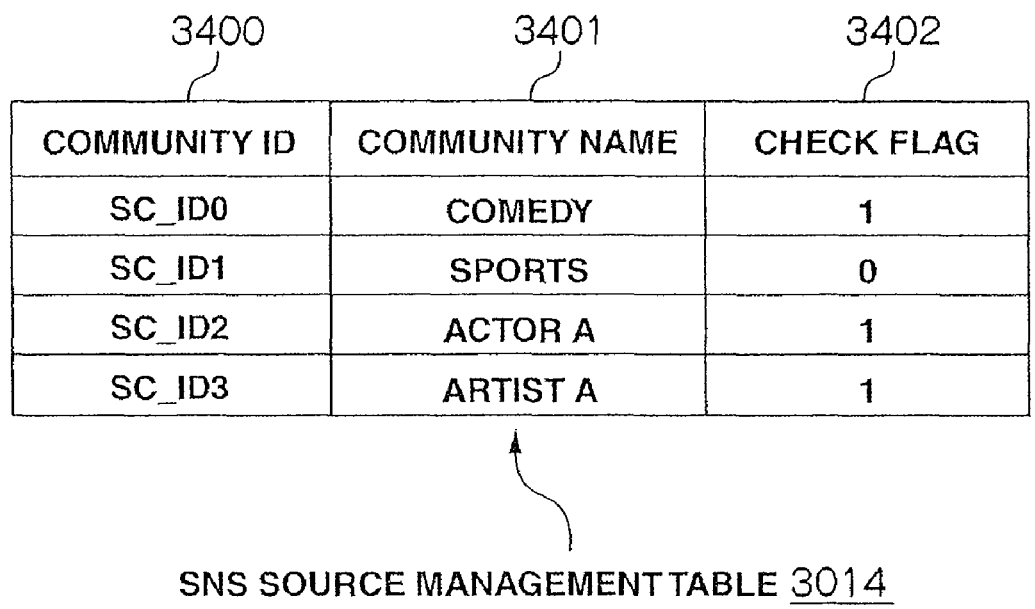
FIG. 34 is a chart showing an example of an SNS source management table according to the second embodiment.

FIG. 34 shows an example of the SNS source management table.

The SNS source management table 3014 is a table for the HDD recorder system 101A to manage the information of the user using SNS, and is configured from a "community ID" column 3400, a "community name" column 3401, and a "check flag" column 3402.

The subject matter of the "community ID" column 3400 and the "community name" column 3401 is the same as the subject matter of the "community ID" column 3300 and the "community name" column 3301 described above, and the explanation thereof is omitted.

Upon comparing the community names of the SNS user information management table 3025 and the community names of the SNS source management table 3014, the "check flag" column 3402 is set to "1" if there is a same community name, and set to "0" if there is no same community name.

FIG. 35 shows an example of the hobby source management table 3013.

The hobby source management table 3013 is configured from a "hobby analysis information" column 3500 and a "hit count" column 3501. The "hit count" column 3501 registers the number of hits of the hobby analysis information when searched by the hobby source creation unit 3011.

(2-1) Creation Processing of Hobby Source Information

Subsequently, the hobby source creation unit 3011 creates the hobby source management table 3013 from the user's email, Web access history, blog, SNS community, and audio information of the voice recorder 3000.

Figure 36:
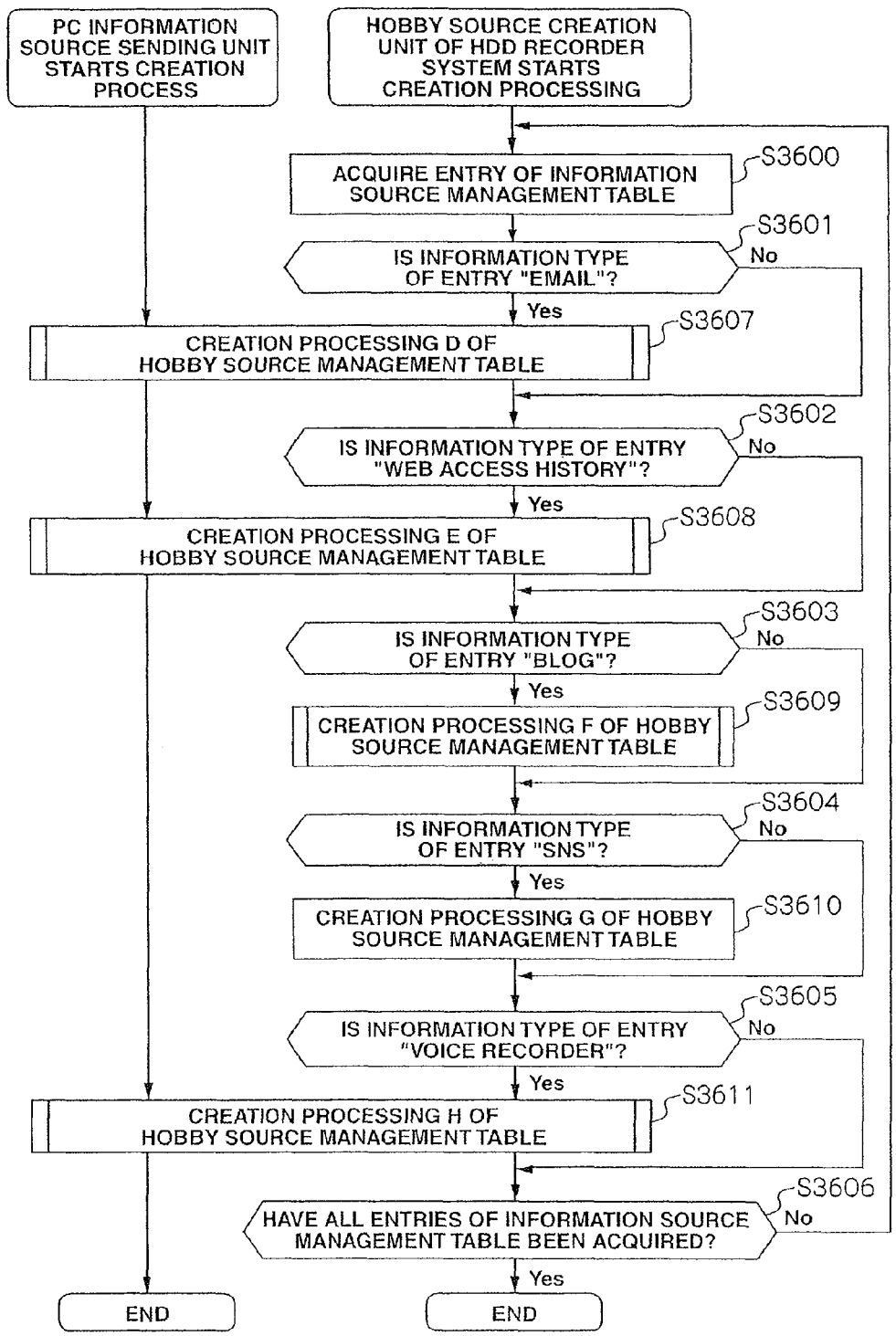
FIG. 36 is a processing flow showing the outline upon creating hobby source information according to the second embodiment.

The processing flow of the outline upon creating the hobby source information is now explained with reference to FIG. 36. The hobby source creation unit 3011 of the HDD recorder system 101A executes the following processing flow upon receiving the acquisition request of the hobby source management table 3013 from the recommended information provision unit 136 at step S2502.

The hobby source creation unit 3011 of the HDD recorder system 101A searches for entries of the information source management table 3012 in ascending order of the information source IDs, and then acquires one entry (S3600).

The hobby source creation unit 3011 determines whether the information type of the acquired entry is email (S3601). If the information type is email (S3601: Yes), the hobby source creation unit 3011 executes creation processing D of the hobby source management table 3013 described later based on the email information (S3607).

Meanwhile, if the information type is not email (S3601: No), the hobby source creation unit 3011 determines whether the information type of the acquired entry is Web access history (S3602). If the information type is Web access history (S3602: Yes), the hobby source creation unit 3011 executes creation processing E of the hobby source management table 3013 described later based on the Web access history (S3608).

If the information type is not Web access history (S3602: No), the hobby source creation unit 3011 subsequently determines whether the information type of the acquired entry is blog (S3603). If the information type is blog (S3603: Yes), the hobby source creation unit 3011 executes creation processing F of the hobby source management table 3013 described later based on the blog (S3609).

If the information type is not blog (S3603: No), the hobby source creation unit 3011 determines whether the information type of the acquired entry is SNS (S3604). If the information type is SNS (S3604: Yes), the hobby source creation unit 3011 executes creation processing G of the hobby source management table 3013 described later based on the SNS community name (S3610).

If the information type is not SNS (S3604: No), the hobby source creation unit 3011 determines whether the information type of the acquired entry is the voice recorder 3000 (S3605). If the information type is the voice recorder 3000 (S3605: Yes), the hobby source creation unit 3011 executes creation processing H of the hobby source management table 3013 described later based on the voice recorder 3000 (S3611).

If the information type is not the voice recorder 3000 (S3605: No), the hobby source creation unit 3011 determines whether all entries of the information source management table 3012 have been acquired (S3606). If all entries have not been acquired (S3606: No), the hobby source creation unit 3011 performs the processing at step S3600 once again. If all entries have been acquired (S3606: Yes), the hobby source creation unit 3011 ends this processing, and sends the hobby source management table 3012 to the online storage system 133A.

(2-2) Creation Processing D

Figure 37:
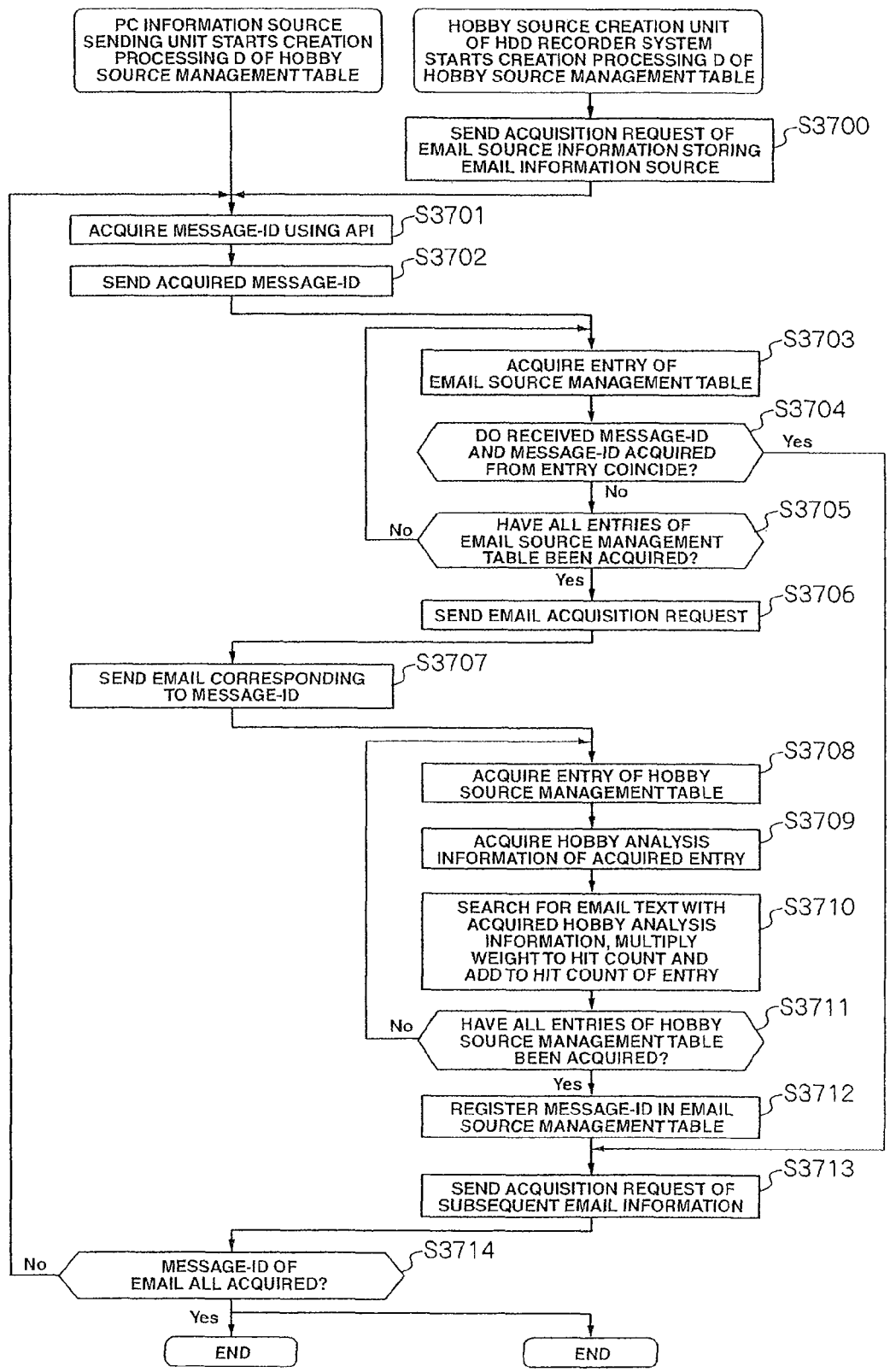
FIG. 37 is a processing flow upon creating a hobby source management table from an email according to the second embodiment.

Creation processing D of the hobby source management table 3013 is now explained in detail. Creation processing D, as shown in FIG. 37, is the processing flow upon creating the hobby source management table 3013 from email.

The hobby source creation unit 3011 of the HDD recorder system 101A sends the acquisition request of the email source information storing the email information source to the PC 3005 (S3700).

The information source sending unit 3006 of the PC 3005 decides the storage location of the email file from the information source acquired from the acquisition request, and acquires one Message-ID of the email using API (S3701).

The information source sending unit 3006 of the PC 3005 sends the acquired Message-ID to the request source HDD recorder system 101A (S3702).

The hobby source creation unit 3011 acquires one entry of the email source management table 3015 (S3703).

The hobby source creation unit 3011 determines whether the received Message-ID and the Message-ID acquired from the entry of the email source management table 3015 coincide (S3704). If the Message-IDs coincide (S3704: Yes), the hobby source creation unit 3011 performs the processing at step S3713.

If the Message-IDs do not coincide (S3704: No), the hobby source creation unit 3011 determines whether all entries of the email source management table 3015 have been acquired (S3705), and executes the processing of step S3703 and step S3704 until all entries are acquired (S3705: No).

If all entries of the email source management table 3015 have been acquired (S3705: Yes), the hobby source creation unit 3011 thereafter sends an acquisition request of the email storing the acquired Message-ID (S3706).

The information source sending unit 3006 of the PC 3005 sends the email corresponding to the Message-ID acquired from the acquisition request (S3707).

The hobby source creation unit 3011 acquires one entry of the hobby source management table 3013 (S3708).

The hobby source creation unit 3011 acquires the hobby analysis information from the acquired entry (S3709).

The hobby source creation unit 3011 searches for the email text based on the acquired hobby analysis information. The hobby source creation unit 3011 multiplies the weight of the information source management table to the hit count, which is the number of times the hobby analysis information was found in the email text, and adds this to the hit count of the entry of the hobby source management table 3013 (S3710). Since the weight of email is "1" according to the information source management table 3012, the hobby source creation unit 3011 adds a value obtained by multiplying "1" to the hit count to the value of the hit count of the hobby source management table 3013.

The hobby source creation unit 3011 confirms whether all entries of the hobby source management table 3013 have been acquired (S3711), and performs the processing of step S3708 to step S3710 until all entries are acquired (S3711: No).

If all entries of the hobby source management table 3013 have been acquired (S3711: Yes), the hobby source creation unit 3011 registers the Message-ID in the email source management table 3015 (S3712).

The hobby source creation unit 3011 sends the acquisition request of the subsequent email information (S3713), and then ends creation processing D.

The information source sending unit 3006 of the PC 3005 confirms whether all Message-IDs of the emails have been acquired (S3714). If all entries have not been acquired (S3714: No), the information source sending unit 3006 performs the processing at step S3701 once again. If all Message-IDs of the emails have been acquired (S3714: Yes), the information source sending unit 3006 ends the creation processing D.

(2-3) Creation Processing E

Figure 38:
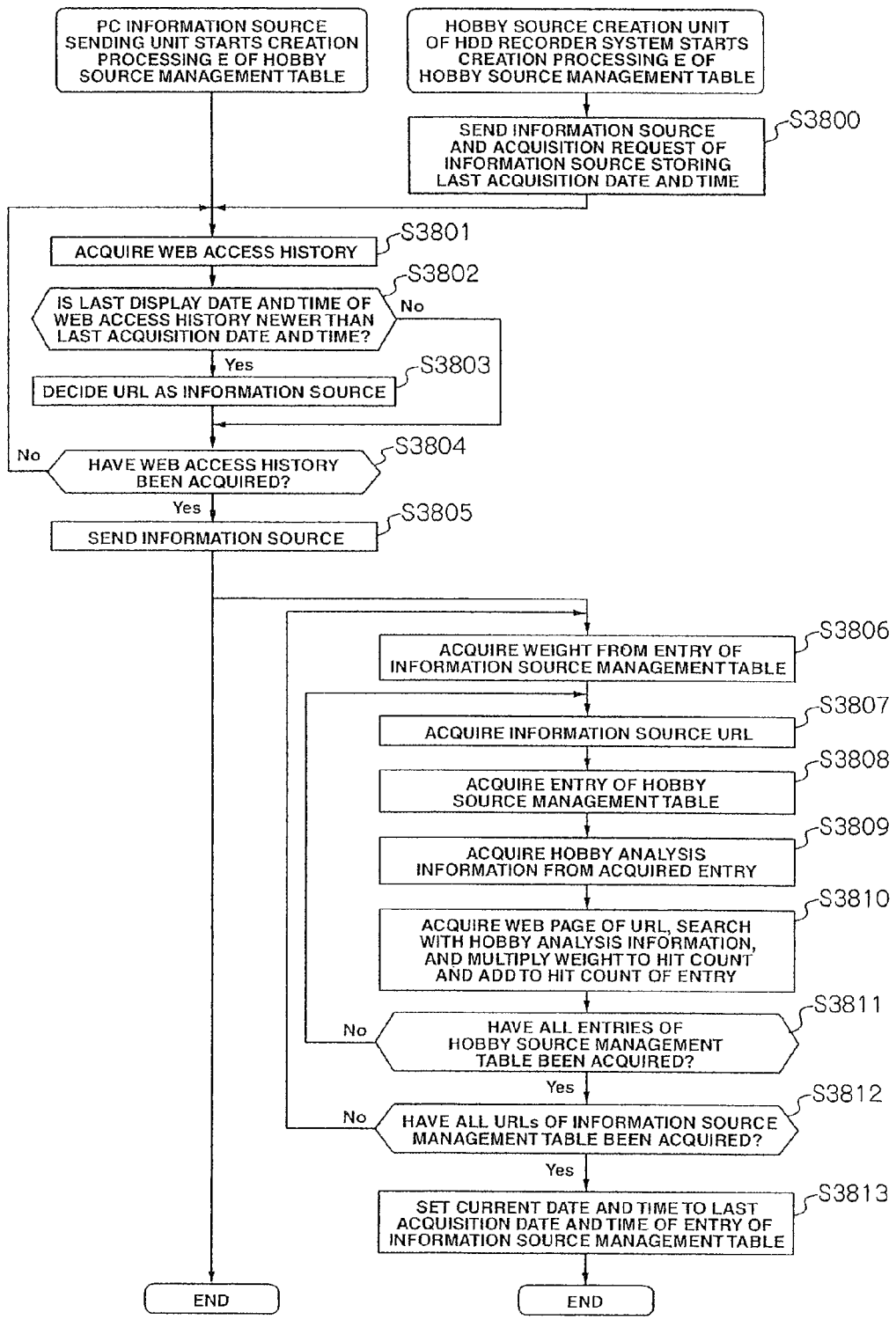
FIG. 38 is a processing flow upon creating a hobby source management table from Web access history according to the second embodiment.

Creation processing E of the hobby source management table 3013 is now explained. Creation processing E, as shown in FIG. 38, is the processing flow upon creating the hobby source management table 3013 from Web access history.

The hobby source creation unit 3011 of the HDD recorder system 101A sends the information source, and the acquisition request of the information source storing the last acquisition date and time (S3800).

The information source sending unit 3006 of the PC 3005 decides the storage location of the file from the information source acquired from the acquisition request, and acquires one Web access history that has not yet been acquired (S3801).

The information source sending unit 3006 determines whether the last display date and time of the Web access history is newer than the last acquisition date and time acquired from the acquisition request (S3802). If the last acquisition date and time acquired from the acquisition request is newer (S3802: No), the information source sending unit 3006 performs the processing at step S3804.

If the last display date and time of the Web access history is newer (S3802: Yes), since this means that the last display date and time of the Web access history is the latest information, the information source sending unit 3006 decides the URL showing the Web access history as the information source (S3803).

Like this, the information source sending unit 3006 determines whether all Web access history has been acquired (S3804), and performs the processing of step S3801 to step S3803 until all Web access history is acquired.

If all Web access history has been acquired (S3804: Yes), the information source sending unit 3006 sends the information source to the acquisition request source HDD recorder system 101A (S3805).

The hobby source creation unit 3011 of the HDD recorder system 101A acquires the weight from the entry of the information source management table 3012 (S3806). Since the information source in this processing is Web access history, the weight is "1."

The hobby source creation unit 3011 of the HDD recorder system 101A acquires one URL from the acquired information source (S3807).

The hobby source creation unit 3011 of the HDD recorder system 101A acquires one entry from the hobby source management table 3013 (S3808).

The hobby source creation unit 3011 of the HDD recorder system 101A acquires the hobby analysis information from the acquired entry (S3809).

The hobby source creation unit 3011 of the HDD recorder system 101A acquires the Web page of the URL, and searches for how many times the hobby analysis information is found in the content of the Web page. The hobby source creation unit 3011 multiplies the weight to the hit count of the hobby analysis information in the Web page, and adds this to the hit count of the entry of the hobby source management table 3013 (S3810). Since the weight of the Web history is "1" according to the information source management table 3012, the hobby source creation unit 3011 adds the value obtained by multiplying "1" to the hit count to the value of the hit count of the hobby source management table 3013.

The hobby source creation unit 3011 of the HDD recorder system 101A determines whether all entries of the hobby source management table 3013 have been acquired (S3811). If all entries have not been acquired (S3811: No), the hobby source creation unit 3011 performs the processing at step S3808 once again.

Meanwhile, if all entries of the hobby source management table 3013 have been acquired (S3811: Yes), the hobby source creation unit 3011 of the HDD recorder system 101A determines whether all URLs of the information source have been acquired (S3812). If all URLs have not been acquired (S3812: No), the hobby source creation unit 3011 performs the processing at step S3807 once again.

If all URLs of the information source have been acquired (S3812: Yes), the hobby source creation unit 3011 of the HDD recorder system 101A sets the current date and time to the last acquisition date and time of the entry of the information source management table 3012 (S3813), and then ends this creation processing E. Like this, the hobby source creation unit 3011 performs the processing at step S3603.

(2-4) Creation Processing F

Figure 39:
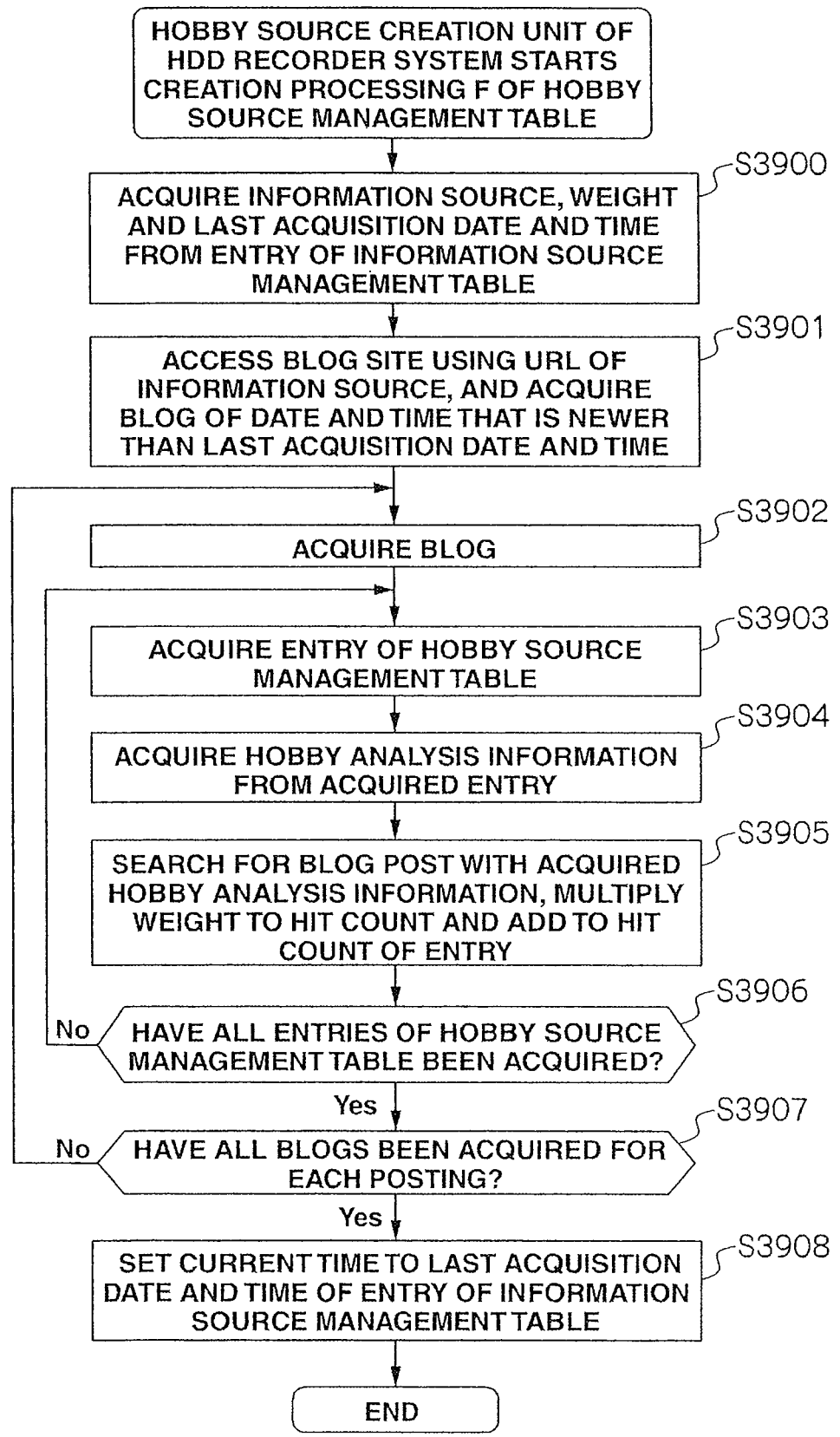
FIG. 39 is a processing flow upon creating a hobby source management table from a blog according to the second embodiment.

Creation processing F of the hobby source management table 3013 is now explained in detail. Creation processing F, as shown in FIG. 39, is the processing flow upon creating the hobby source management table 3013 from a blog.

The hobby source creation unit 3011 of the HDD recorder system 101A acquires the information source, weight, and last acquisition date and time from the entries of the information source management table 3012 (S3900).

The hobby source creation unit 3011 accesses the blog site using the URL of the information source, and acquires a blog of a date and time that is newer than the last acquisition date and time (S3901). Here, RSS (Resource description framework Site Summary) information (metadata of blog) including the date of blog posting is acquired.

The hobby source creation unit 3011, based on the RSS information of the blog, compares the posting date that has not yet been acquired and the current date, searches for blogs in descending order from the posting date with the greatest difference, and acquires one blog with a great difference in the posting date (S3902).

The hobby source creation unit 3011 acquires one entry of the hobby source management table 3013 (S3903).

The hobby source creation unit 3011 acquires the hobby analysis information from the acquired entry (S3904).

The hobby source creation unit 3011 searches the hit count of the hobby analysis information from the content of the acquired blog post. The hobby source creation unit 3011 adds the value obtained by multiplying the weight to the hit count in the content of the blog post to the hit count of the entry (S3905). Since the weight of the blog is "1" according to the information source management table 3012, the hobby source creation unit 3011 adds the value obtained by multiplying "1" to the hit count to the value of the hit count of the hobby source management table 3013.

The hobby source creation unit 3011 determines whether all entries of the hobby source management table 3013 have been acquired (S3906), and performs the processing from step S3903 to step S3905 until all entries are acquired (S3906: No).

If all entries of the hobby source management table 3013 have been acquired (S3906: Yes), the hobby source creation unit 3011 determines whether all blogs per posting have been acquired (S3907). If all blogs per posting have not been acquired (S3907: No), the hobby source creation unit 3011 performs the processing at step S3902 once again.

If all blogs per posting have been acquired (S3907: Yes), the hobby source creation unit 3011 sets the current date and time to the last acquisition date and time of the entry of the information source management table 3012 (S3908), and then ends this processing F. Like this, the hobby source creation unit 3011 performs the processing at step S3604.

(2-5) Creation Processing G

Figure 40:
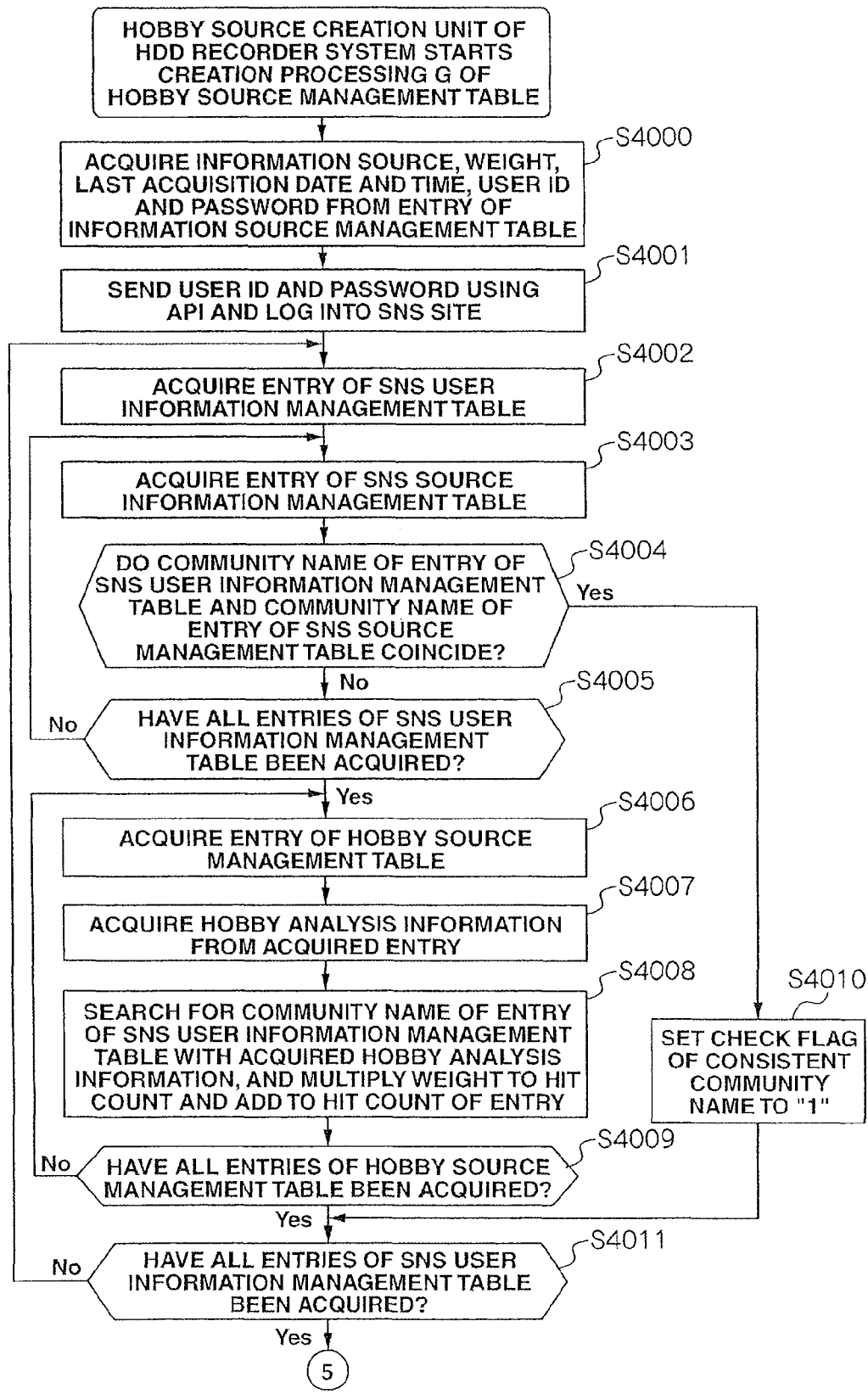
FIG. 40 is a processing flow upon creating a hobby source management table from a community participating in SNS according to the second embodiment.
Figure 41:
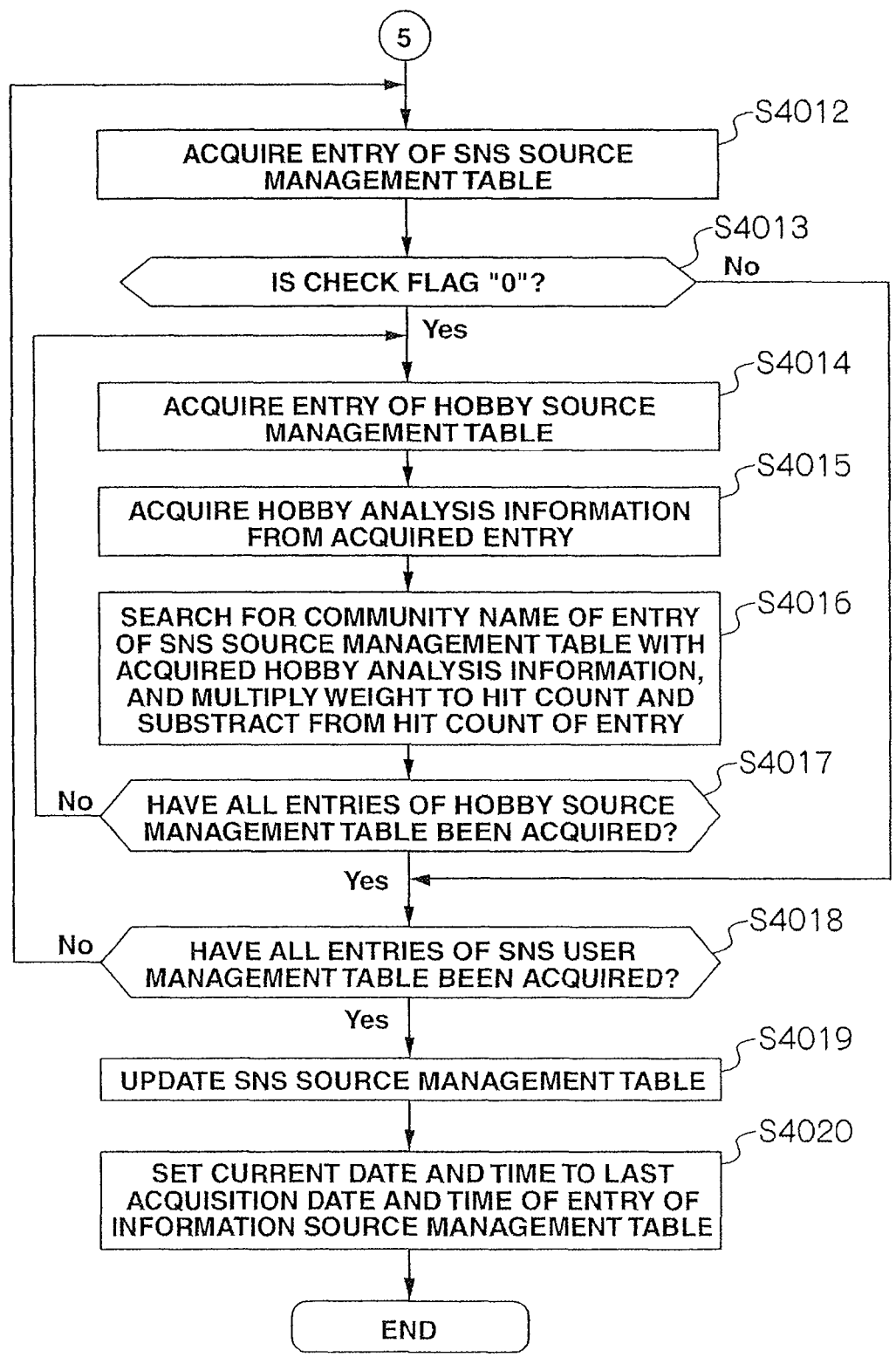
FIG. 41 is a processing flow upon creating a hobby source management table from a community participating in SNS according to the second embodiment.

Creation processing G of the hobby source management table 3013 is now explained in detail. Creation processing G, as shown in FIG. 40 and FIG. 41, is the processing flow upon creating the hobby source management table 3013 from the SNS community.

The hobby source creation unit 3011 of the HDD recorder system 101A acquires the information source, weight, last acquisition date and time, user ID, and password from the entries of the information source management table 3012 (S4000).

The hobby source creation unit 3011 sends the user ID and password using API, and logs into the SNS site (S4001). API, for instance, is the API of the facebook of the SNS site. After the hobby source creation unit 3011 logs in using the API of the facebook, it is able to acquire information such as the facebook user's name, introductory text, or hobby.

The hobby source creation unit 3011 acquires one entry of the SNS user source information management table 3025. Here, the hobby source creation unit 3011 acquires information using API (S4002).

The hobby source creation unit 3011 acquires one entry of the SNS source management table 3014 (S4003).

The hobby source creation unit 3011 determines whether the community name of the entry of the SNS user information management table 3025 and the community name of the entry of the SNS source management table 3014 coincide (S4004). If the community names coincide (S4004: Yes), the hobby source creation unit 3011 sets "1" to the check flag of the corresponding entry of the SNS source management table 3014 (S4010).

If the community names do not coincide (S4004: No), since this means that the community was newly added by the user, the hobby source creation unit 3011 thereafter determines whether all entries of the SNS source management table 3014 have been acquired (S4005). If all entries have not been acquired (S4005: No), the hobby source creation unit 3011 performs the processing at step S4003.

If all entries have been acquired (S4005: Yes), the hobby source creation unit 3011 acquires the entry from the hobby source management table 3013 (S4006).

The hobby source creation unit 3011 acquires the hobby analysis information from the acquired entry (S4007).

The hobby source creation unit 3011 searches for the content of the community from the entry of the SNS source management table 3014 in the acquired hobby analysis information. The hobby source creation unit 3011 multiplies the weight to the hit count of the hobby analysis information in the content of the community, and adds this to the hit count of the entry (S4008).

The hobby source creation unit 3011 determines whether all entries of the hobby source management table 3013 have been acquired (S4009). If all entries have not been acquired (S4009: No), the hobby source creation unit 3011 performs the processing at step S4006 once again.

If all entries of the hobby source management table 3013 have been acquired (S4009: Yes), the hobby source creation unit 3011 determines whether all entries of the SNS user information management table 3025 have been acquired (S4011). If all entries have not been acquired (S4011: No), the hobby source creation unit 3011 performs the processing at step S4002 once again.

If all entries of the SNS user information management table 3025 have been acquired (S4011: Yes), the hobby source creation unit 3011 acquires one entry of the SNS source management table 3014 (S4012).

The hobby source creation unit 3011 determines whether the check flag of the acquired entry is "0" (S4013). If the check flag is "1" (S4013: No), the hobby source creation unit 3011 performs the processing at step S4018.

Meanwhile, if the check flag is "0" (S4013: Yes), since this means that the acquired entry is an entry that the user is no longer interested in, the hobby source creation unit 3011 acquires the entry of the hobby source management table 3013 (S4014).

The hobby source creation unit 3011 acquires the hobby analysis information from the acquired entry (S4015).

The hobby source creation unit 3011 searches for the content of the community from the entry of the SNS source management table 3014 in the acquired hobby analysis information. The hobby source creation unit 3011 deducts the hit count of the entry from the value obtained by multiplying the weight to the hit count of the hobby analysis information in the content of the community (S4016). Since the weight of SNS is "100" according to the information source management table 3012, the hobby source creation unit 3011 subtracts the value of the hit count of the hobby source management table 3013 from the value obtained by multiplying 100 to the hit count.

The hobby source creation unit 3011 determines whether all entries of the hobby source management table 3013 have been acquired (S4017), and performs the processing of step S4014 to step S4016 until all entries are acquired (S4017: No).

If all entries of the hobby source management table 3013 have been obtained (S4017: Yes), the hobby source creation unit 3011 determines whether all entries of the SNS source management table 3014 have been acquired (S4018). If all entries have not been acquired (S4018: No), the hobby source creation unit 3011 performs the processing at step S4012 once again.

If all entries of the SNS source management table 3014 have been acquired (S4018: Yes), the hobby source creation unit 3011 deletes the entry of the SNS source management table 3014 which the user has lost interest, and registers all entries of the SNS user information management table 3025 in the SNS source management table 3014. Here, the hobby source creation unit 3011 sets all check flags of the SNS source management table 3014 to "0" (S4019).

The hobby source creation unit 3011 sets the current date and time to the last acquisition date and time of the entry of the information source management table 3014 (S4020), and then ends this creation processing G. Like this, the hobby source creation unit 3011 performs the processing at step S3605.

(2-6) Creation Processing H

Figure 42:
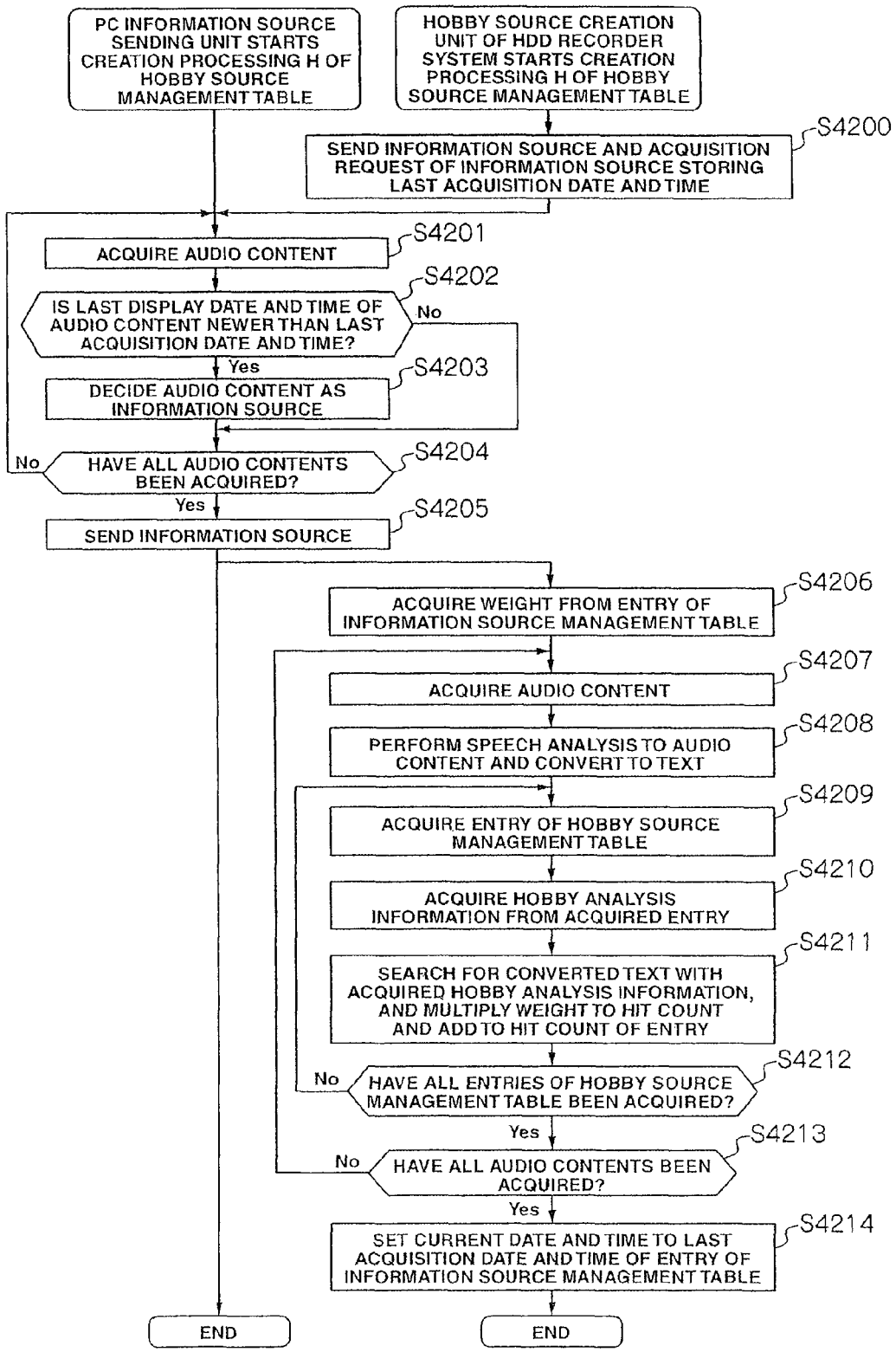
FIG. 42 is a processing flow upon creating a hobby source management table from a voice recorder according to the second embodiment.

Creation processing H of the hobby source management table 3013 is now explained in detail. Creation processing H, as shown in FIG. 42, is the processing flow upon creating the hobby source management table 3013 from the voice recorder.

The hobby source creation unit 3011 of the HDD recorder system 101A sends the information source, and the acquisition request of the information source storing the last acquisition date and time (S4200).

The information source sending unit 3006 of the PC 3005 decides the storage location of the file from the information source acquired from the acquisition request, and acquires the audio contents in order (S4201).

The information source sending unit 3006 of the PC 3005 determines whether the last access date and time of the audio content is newer than the last acquisition date and time acquired from the acquisition request (S4202). If the last access date and time of the audio content is not the latest access date and time (if the playback count is not "0") (S4202: No), the information source sending unit 3006 performs the processing at step S4204.

If the last access date and time of the audio content is the latest last access date and time (S4202: Yes), the information source sending unit 3006 of the PC 3005 decides the audio content as the information source (S4203).

The information source sending unit 3006 of the PC 3005 determines whether all audio contents have been acquired (S4204), and performs the processing of step S4201 to step S4203 until all audio contents are acquired (S4204: No).

If all audio contents have been acquired (S4204: Yes), the information source sending unit 3006 of the PC 3005 sends the information source to the acquisition request source HDD recorder system 101A (S4205).

The hobby source creation unit 3011 acquires the weight from the entry of the information source management table 3012 (S4206), and acquires one audio content as the information source (S4207).

The hobby source creation unit 3011 performs speech analysis to the acquired audio content and converts it into text (S4208), and then acquires on entry of the hobby source management table 3013 (S4209).

The hobby source creation unit 3011 acquires the hobby analysis information from the acquired entry (S4210).

The hobby source creation unit 3011 searches for the converted text in the acquired hobby analysis information (S4211). The hobby source creation unit 3011 adds the value obtained by multiplying the weight to the hit count of the hobby analysis information in the content of the text to the hit count of the entry.

The hobby source creation unit 3011 determines whether all entries of the hobby source management table 3013 have been acquired (S4212), and performs the processing of step S4209 to step S4211 until all entries are acquired (S4212: No).

If all entries of the hobby source management table 3013 have been acquired (S4212: Yes), the hobby source creation unit 3011 determines whether all audio contents have been acquired (S4213). If all audio contents have not been acquired (S4213: No), the hobby source creation unit 3011 performs the processing at step S4207 once again.

If all audio contents have been acquired (S4213: Yes), the hobby source creation unit 3011 sets the current date and time to the last acquisition date and time of the entry of the information source management table 3012 (S4214), and then ends this creation processing H. Like this, the hobby source creation unit 3011 performs the processing at step S3606.

As a result of performing the foregoing creation processing D to H, the hobby source management table 3013 can be created from email, Web access history, blog, SNS community, and audio information of the voice recorder 3000.

At step S2403 explained in the first embodiment, the HDD recorder system 101 sends, together with the hobby source management table 115 subject to playback processing, the hobby source management table 3013 created with the foregoing processing flow to the recommended information provision unit 136A of the online storage system 133. The recommended information provision unit 136, at step S2406, assigns a rank to each hobby analysis information based on the playback count of the hobby source management table 115 and the hit count of the hobby source management table 3013, and then creates the hobby analysis management table 166A.

Like this, the hobby analysis management table 166A of this embodiment is created based on the playback history in the user's HDD recorder system 101A, email, Web access history, blog, SNS community, and audio information of the voice recorder 3000. Thus, when comparing this embodiment and the first embodiment, this embodiment is able to conduct a more detailed analysis regarding the user's hobby, and able to realize the system 1A capable of providing recommended contents that more closely match the user's hobby.

In the processing flow explained in the first embodiment and the second embodiment, although the hobby analysis management tables 166, 166A analyzed the user's hobby and created the recommended information based on such user's hobby information, the recommended information may also be created based on the category or cast directly input by the user in the HDD recorder systems 101, 101A. Here, a hobby source management table 3013 to be input by the user is created, and the HDD recorder system 101 sets only the hit count of the input category or cast to "1," and, thereafter at step S2403, sends only this hobby source management table 3013 to the recommended information provision unit 136.

(2-7) Effect of Present Embodiment

According to the present embodiment, the option of contents to be recommended to the user is not limited to the contents that were actually recorded with the HDD recorder system, and can be expanded to the contents outside the HDD recorder system (blog, Web access history, SNS community). Thus, contents that are even more favored by the user can be recommended.

As a result of providing introductory article contents that match the user's hobby, it is possible to possible to further increase the incentive of users to view and listen to the recommended contents.

(3) Third Embodiment

The third embodiment is now explained with reference to the attached drawings. In the first embodiment, the online storage system 133 created the recommended information. In this embodiment, a system 1B in which the HDD recorder system 101B creates the recommended information is realized.

Figure 43:
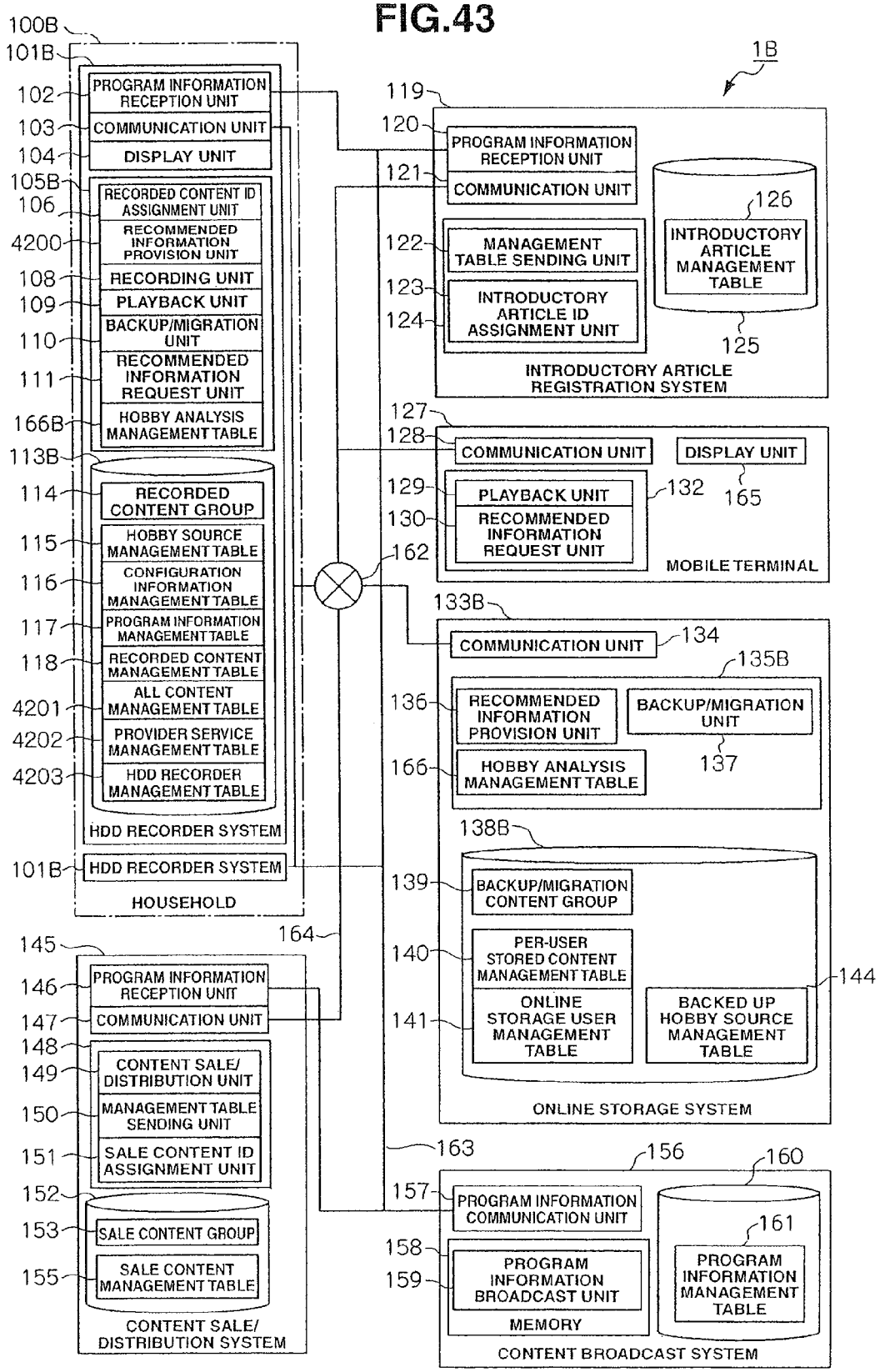
FIG. 43 is a block diagram showing the configuration of a content provision system according to the third embodiment.

FIG. 43 shows an outline of the configuration of the content provision system 1B of the present embodiment.

The configuration that differs from the first embodiment is in that an HDD recorder management table 4203 for identifying the HDD recorder system 101B owned by the user, a provider service management table 4202 for identifying the content sale/distribution system 145 and the introductory article registration system 119, a recommended information provision unit 4200, and an all content management table 4201 exist in the storage apparatus 113B of the HDD recorder system 101B.

The memory 135B of the online storage system 133B temporarily stores the backup/migration unit 137. The hobby analysis management table 166B of this embodiment is not stored in the storage apparatus 138B of the online storage system 133B, and is stored in the memory 105B of the HDD recorder system 101B.

(3-1) Creation Processing of Recommended Contents

The processing for creating a recommended file is now explained sequentially.

Foremost, the recommended information provision unit 4200 performs the same processing (step S2200 to step S2207) explained with reference to FIG. 22, and creates the all content management table 4201 from the recorded content management table 118 in the HDD recorder system 101B.

Subsequently, the recommended information provision unit 4200 identifies the IP address of the content sale/distribution system 145 and the introductory article registration system 119 from the provider service management table 4202. The recommended information provision unit 4200 creates the all content management table 4201 from the sale content management table 155 in the HDD recorder system 101B. The creation processing step is as explained in the first embodiment.

Subsequently, the recommended information provision unit 4200 performs the same processing (step S2300 to step S2308) explained with reference to FIG. 23, and creates the all content management table 4201 from the introductory article management table 126.

The recommended information provision unit 4200 thereafter identifies the IP address of the HDD recorder system 101B owned by the user from the HDD recorder management table 4203, performs the same processing (step S2400 to step S2414) explained with reference to FIG. 24 and FIG. 25, and analyzes the user's hobby information.

After the user's hobby information is analyzed, with respect to the search processing of the recommended contents, the search processing of the recommended article contents and the creation processing of the recommended information file, the recommended information can be created by the recommended information provision unit 4200 performing the same processing routine as the processing routine explained in the first embodiment.

In this embodiment, although the HDD recorder system 101B is managing the provider service management table 4202, this may also be managed by the online storage system 133 as in the first embodiment. Here, the online storage system 133 acquires information required for creating the recommended information from the content sale/distribution system 145 and the introductory article registration system 119. The HDD recorder system 101 can be realized by acquiring the required information from the online storage system 133 upon creating the recommended information.

As described above, a system in which the HDD recorder system creates the recommended information can be realized.

(3-2) Effect of Present Embodiment

According to the present embodiment, the option of contents to be recommended to the user is not limited to the contents that were actually recorded with the HDD recorder system, and can be expanded to the contents in the online storage system and to the contents sold with the content sale/distribution system. Thus, contents that are even more favored by the user can be recommended.

In addition, with this content provision system, a plurality of sequential contents can be introduced, and, even if the user forgets to record a specific episode number, the user is able to play such episode number by purchasing it from the content sale/distribution system, and the user-friendliness is thereby improved.

As a result of providing introductory article contents that match the user's hobby, it is possible to possible to increase the incentive of users to view and listen to the recommended contents.

In particular, this embodiment yields the effect of being able to alleviate the processing load of the online storage system.

(4) Fourth Embodiment

The fourth embodiment is now explained with reference to the attached drawings. In the first embodiment, TV programs to be broadcast were the target contents for providing the recommended information. In this embodiment, a system in which provides recommended information targeting music is realized.

Although the first embodiment associated the contents with the program title, program explanation, category, and cast, this embodiment associates the music contents with the album name, artist name and track name of the music content. The track name is, for example a song name. CDDB information is configured from an album name, artist name, and track name. The configuration that differs from the first embodiment is explained below.

Figure 44:
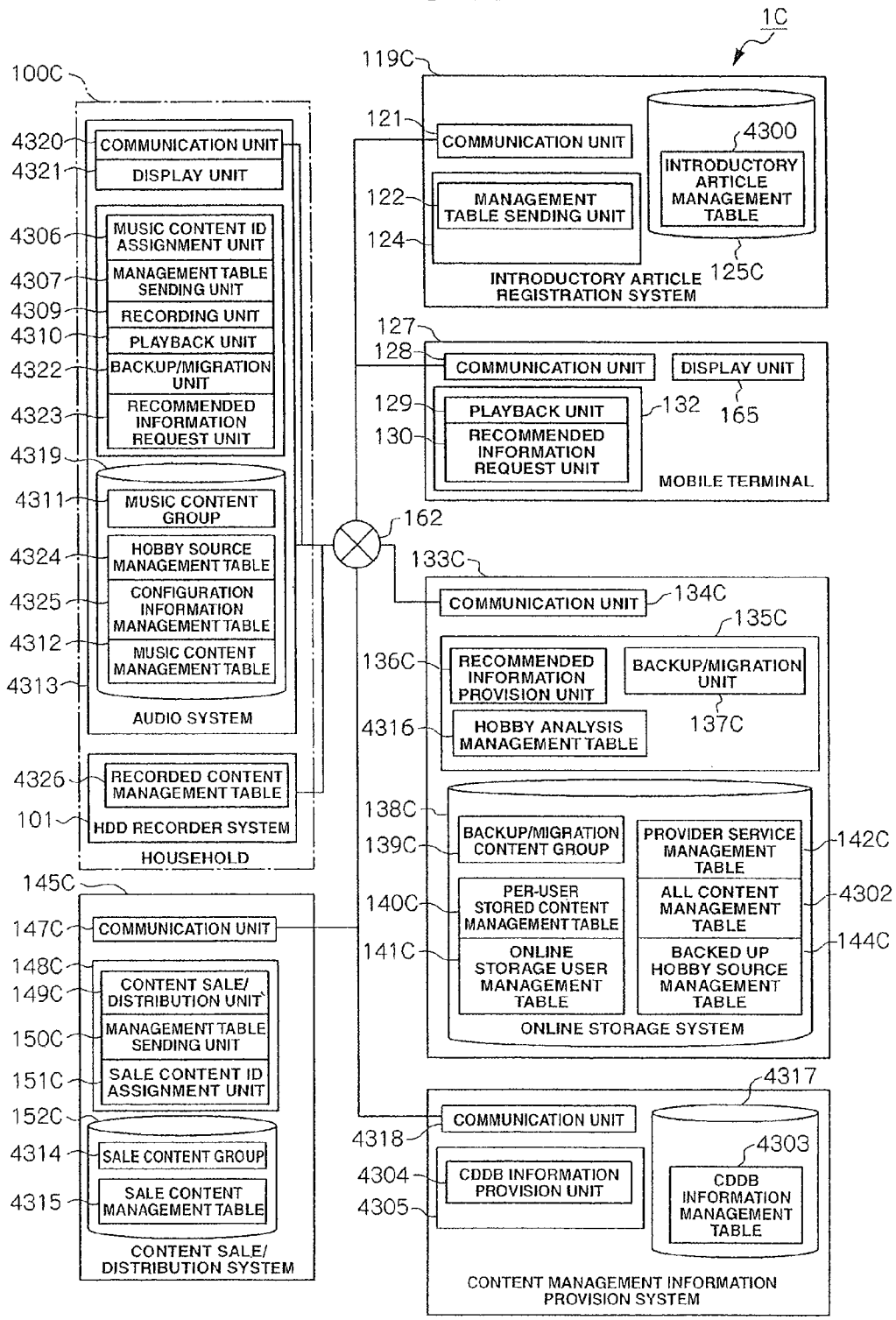
FIG. 44 is a block diagram showing the configuration of a content provision system according to the fourth embodiment.

FIG. 44 shows the outline of the configuration of a content provision system 1C according to the fourth embodiment.

The content provision system 1C in this embodiment is configured by an audio system 4313, a content management information provision system 4305, a content sale/distribution system, an introductory article registration system, a mobile terminal 127, and an online storage system 133C being connected via a network 162.

The content management information provision system 4305 is configured from a storage apparatus 4317 storing a CDDB information management table 4303, a communication unit 4318 for connecting to the network 162, and a memory (not shown) for storing a CDDB information provision unit 4304 for providing CDDB information. Here, CDDB information is attribute information of the music content configured from an album name, an artist name, and a track name.

The storage apparatus 152C of the content sale/distribution system 145 stores a sale content management table 4315 and a sale content group 4314. The content sale/distribution system 145 is a provider handling music contents, and manages the sale contents in the sale content management table 4315. The remaining configuration of 147C to 151C is the same as the configuration of 147 to 151 explained in the first embodiment, and the explanation thereof is omitted.

The audio system 4313 is configured from a music content group 4311 in which a plurality of music contents are stored in the storage apparatus 4319, a music content management table 4312, and a music content ID assignment unit 4306 for assigning an ID so that the audio system 4313 can manage the music contents in the self-system.

The management table sending unit 4307 sends the music content management table 4312 to the online storage system 133C. As a result of the audio system 4313 creating waveform information from the music content and thereafter acquiring the content management information corresponding to the waveform information from the content management information provision system 4305, the sale contents and the introductory articles can be associated.

The communication unit 4320 and the display unit 4321 are configured the same as the communication unit 103 and the display unit 104 explained in the first embodiment. Further, the backup/migration unit 4322, the recommended information request unit 4323, the hobby source management table 4324, and the configuration information management table 116 are also configured the same as the configuration explained in the first embodiment, and the explanation thereof is omitted.

In this embodiment, when providing the music information as the recommended information of the music content, the introductory article management table 4300, the sale content group 4314, the sale content management table 4315, the hobby analysis management table 4316, and the all content management table 4302 are a modified configuration of the configuration of the first embodiment that provided TV programs as the recommended information of the recorded contents.

Since the online storage system 133C is configured the same as the configuration explained in the first embodiment, the explanation thereof is omitted. Nevertheless, since that target contents are different from the first embodiment, the components that have the same function as the components explained in the first embodiment are given the suffix of "C" to the reference number in FIG. 44.

FIG. 45 shows an example of the CDDB information management table 4304.

The CDDB information management table 4304 is a table for managing the CDDB information with the content management information provision system 4305. The CDDB information management table 4304 is configured from a "CDDB_ID" column 4500, a "waveform information" column 4501 showing the waveform characteristic to the song, a CD "album name" column 4502, a CD "artist name" column 4503, and a CD "track name" column 4504.

The method of acquiring the CDDB information management table 4304 will be explained later with reference to FIG. 49.

FIG. 46 shows an example of the music content management table 4312.

The music content management table 4312 is a table for managing the music contents.

The music content management table 4312 is configured from a "music content ID" column 4600, a "waveform information" column 4601 that defines the track, a CD "album name" column 4602, an "artist name" column 4603, a "track name" column 4604, a "playback count" column 4605 showing the playback count of the music content, a "backup flag" column 4606 showing whether the music content was backed up to the online storage system 133C, a "migration flag" column 4607 showing whether the music content was migrated to the online storage system 133C, and a "storage location" column 4608 showing the address of the storage apparatus 4319 storing the music content.

For example, waveform information is created from the music content when storing the music content in the storage apparatus upon recording music or purchasing the music content, and allocated with the music content ID and managed in the music content management table.

FIG. 47 shows an example of the sale content management table 4315.

The sale content management table 4315 is a table for managing the music contents for sale.

The sale content management table 4315 is configured from a "sale content ID" column 4700, a "waveform information" column 4701 that defines the track, a CD "album name" column 4702, an "artist name" column 4703, a "track name" column 4704, a "price" column 4705, and a sale content "storage location" column 4706.

The waveform information of the sale content management table 4315 is created when it is to be stored in the storage apparatus 152C, and managed by a sale content ID being allocated to the waveform information. The content sale/distribution system 145C registers and manages the album name, artist name, and track name regarding the contents to be sold in the sale content management table 4315 in advance.

FIG. 48 shows the introductory article management table 4300.

The introductory article management table 4300 is a table for managing the introductory article per song with the introductory article ID.

The introductory article management table is configured from an "introductory article ID" column 4800, a CD "album name" column 4801, an "artist name" column 4802, a "track name" column 4803, a "hobby analysis information" column 4804, and an "article description" column 4805.

The introductory article registration system 119C registers and manages the album name, artist name, and track name regarding the contents corresponding to the introductory articles in the introductory article management table 4300 in advance.

(4-1) Acquisition Processing of CDDB Information

Figure 49:
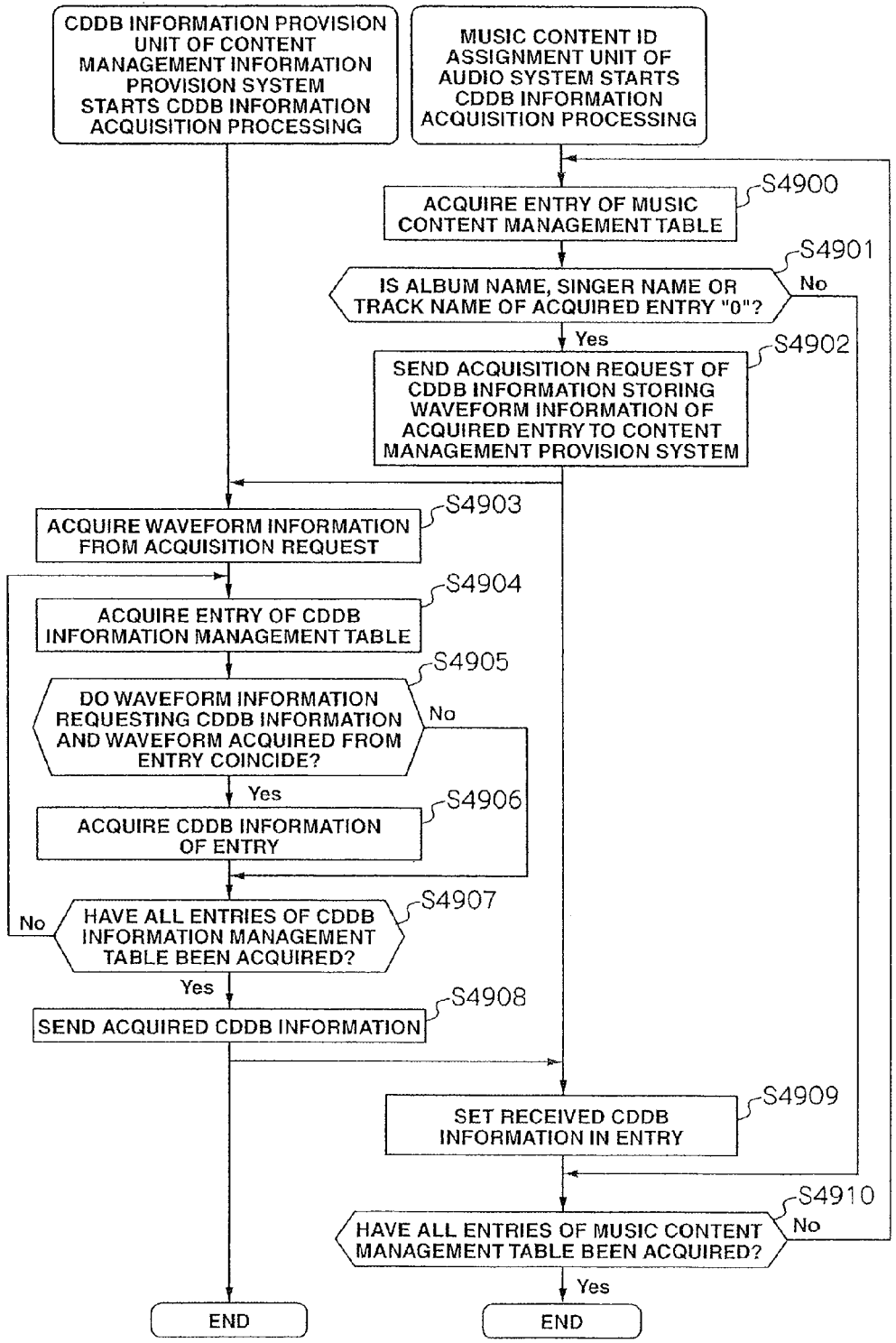
FIG. 49 is a processing flow upon acquiring CDDB information according to the fourth embodiment.

FIG. 49 shows the processing flow upon acquiring the CDDB information.

The music content ID assignment unit 4306 of the audio system 4313 executes the following processing flow when a music content is stored in the storage apparatus 4319 and waveform information is created upon recording music or purchasing a music content.

The music content ID assignment unit 4306 of the audio system 4313 acquires one entry of the music content management table 4312 (S4900).

The music content ID assignment unit 4306 determines whether any one among the album name, artist name and track name of the acquired entry is registered, or whether "0" is registered (S4901). If any one among the album name, artist name and track name of the acquired entry is registered (S4901: No), the music content ID assignment unit 4306 performs the processing at step S4910.

Meanwhile, if "0" is registered (S4901: Yes), the music content ID assignment unit 4306 sends the acquisition request of the CDDB information storing the waveform information of the acquired entry to the content management information provision system 4305 (S4902).

When the CDDB information provision unit 4304 acquires the waveform information from the acquisition request (S4903), it acquires one entry of the CDDB information management table 4303 (S4904).

The CDDB information provision unit 4304 determines whether the waveform information requested in the CDDB information and the waveform information acquired from the entry coincide (S4905).

If the waveform information coincide (S4905: Yes), the CDDB information provision unit 4304 acquires the CDDB information of the entry of the CDDB information management table 4303 (S4906).

If the waveform information do not coincide (S4905: No) or after performing the processing at step S4906, the CDDB information provision unit 4304 determines whether all entries of the CDDB information management table 4303 have been acquired (S4907). The CDDB information provision unit 4304 performs the processing of step S4904 to step S4906 until all entries of the CDDB information management table 4303 are acquired (S4907: No).

If all entries of the CDDB information management table 4303 have been acquired (S4907: Yes), the CDDB information provision unit 4304 sends the acquired CDDB information to the request source audio system 4313 (S4908).

The music content ID assignment unit 4306 sets the received CDDB information in the entry of the music content management table 4312 (S4909).

The music content ID assignment unit 4306 determines whether all entries of the music content management table 4312 have been acquired (S4910). If all entries have not been acquired (S4910: No), the music content ID assignment unit 4306 performs the processing at step S4900 once again. If all entries of the music content management table 4312 have been acquired (S4910: Yes), the acquisition processing is ended.

The processing routine of providing the recommended music information to the user in file format after the audio system 4313 acquires the CDDB information is now explained.

The recorded content management table 4326 is created by acquiring the album name, artist name, and track name of the CDDB information from the content management information provision system 4305 upon recording music or purchasing a music content. The sale content management table 4315 is created in advance by a content sale/distribution vendor. The introductory article management table 4300 is created in advance by an introductory article registration vendor. The per-user stored content management table 140C is created upon backing up or migrating the music content to the online storage system. One is added to the playback count of the music content management table 4312 when the music content is played.

When the recommended information provision unit 136C receives a recommended information creation request from the audio system 4313, it creates the all content management table 4302 by associating the entries of the respective management tables using the album name, artist name, and track name of the music content management table 4312, the sale content management table 4315, and the introductory article management table 4300.

The recommended information provision unit 136C analyzes the user's hobby information using the playback count of the music content management table 4312, and creates the hobby analysis table 4316. In this processing, the artist name is used as the hobby analysis information.

The recommended information provision unit 136C decides the recommended contents and the recommended introductory article contents based on the user's hobby information.

By creating the recommended information file and sending it to the audio system 4313, the recommended information provision unit 136C is able to provide the recommended information to the user.

(4-2) Effect of Present Embodiment

In this embodiment, by the audio system acquiring the CDDB information from the content management information provision unit, the recommended information provision unit of the online storage system is able to associate the music contents, the sale contents, and the introductory articles. Like this, it is possible to realize a system capable of creating the recommended information of music contents.

When the recommended information provision unit is to decide the recommended contents, in addition to the contents of the recorded content management table of the HDD recorder system, the search target can be extended to the music content management table of the audio system, and different types of contents that match the user's hobby can be simultaneously recommended to the user.

(5) Other Embodiments

Although the first content data to be used by the user corresponds to recorded contents, audio contents, email, Web access history, blog, and SAS community, it is not limited thereto, and the first content data may be any content data to be used by the user.

Although the first system corresponds to a HDD recorder system, an audio system, a mobile terminal, a voice recorder, a PC, a blog service system, a Web service system, and an SNS system, it is not limited thereto, and the first system may be any system that stores content data to be used by the user.

Although the second content data to be provided to the user corresponding to sale contents and introductory article contents, it is not limited thereto, and the second content data may be any content data to be provided to the user.

Although the second system corresponds to the content sale/distribution system and the introductory article registration system, it is not limited thereto, and the second system may be any system capable of providing content data to the user.

Although the third system corresponds to the content broadcast system and the content management information provision system, it is not limited thereto, and the third system may be any system capable of managing the attribute information of content data and providing this to the user.

In addition, although the embodiments described using information regarding the playback count and information regarding the hit count as reference information for deciding the user's hobby information, any information may be used to decide the user's hobby information, and is not limited to the information described in the embodiments.

The present invention can be broadly applied to contents and other information connected to an online storage system.

What is claimed is:

1. A content provision system, comprising:
a display;
a first system that stores first content data to be used by a user, and that stores a first hobby source management table, which includes hobby information of the user;
a second system that stores second content data to be provided to the user;
an audio system that stores music content;
a content management information provision system that stores content management information, the content management information including attribute information relating to the music content,
wherein the audio system creates waveform information from the music content and acquires the content management information corresponding to the waveform information from the content management information provision system,
wherein the waveform information and the content management information corresponding to the waveform information are used to create an association between the music content, the sale content, and the introductory articles,
wherein a content sale/distribution system registers and manages sale content, which includes attribute information regarding music available for sale, and
wherein an introductory article registration system manages introductory articles that provide information regarding the music content; and
an online storage system connected to the first system and the second system, and that manages attribute information of content data,
wherein the online storage system comprises:
a storage apparatus that stores a second hobby source management table, the second hobby source management table being a backup of the first hobby source management table;
a creation unit that associates the first content data and the second content data, assigns a common content ID to the first content data and the second content data, and creates management information of all content data configured from the first content data and the second content data based on the attribute information of content data;
an analysis unit that analyzes the hobby information included in the second hobby source management table;
a search unit that searches for unviewed content data that coincides with the analyzed hobby information of the user based on the management information of all content data; and
a provision unit that provides to the user content information that corresponds to the hobby information of the user based on the searched content data, and provides to the user music information based on the association between the music content, the sale content, and the introductory articles,
wherein the provision unit provides the content information and the music information to the user via the display.

2. A content provision method of a content provision system, the content provision system comprising a display, at least a first system that stores first content data to be used by a user, a second system that stores second content data to be provided to the user, an audio system, a content management information provision system, and an online storage system connected to the first system and the second system, and that manages attribute information of content data, wherein the online storage system comprises a storage apparatus, the method comprising:

storing, in the first system, a first hobby source management table, which includes hobby information of the user;

storing music content in the audio system;

storing, in the content management information provision system, content management information, the content management information including attribute information relating to the music content, wherein the audio system creates waveform information from the music content and acquires the content management information corresponding to the waveform information from the content management information provision system, wherein the waveform information and the content management information corresponding to the waveform information are used to create an association between the music content, the sale content, and the introductory articles, wherein a content sale/distribution system registers and manages sale content, which includes attribute information regarding music available for sale, and wherein an introductory article registration system manages introductory articles that provide information regarding the music content;

storing, in the storage apparatus of the online storage system, a second hobby source management table, the second hobby source management table being a backup of the first hobby source management table;

a creation step of associating the first content data and the second content data, assigning a common content ID to the first content data and the second content data, and creating management information of all content data configured from the first content data and the second content data based on the attribute information of content data;

an analysis step of analyzing the hobby information included in the second hobby source management table;

a search step of searching unviewed content data that coincides with the analyzed hobby information of the user based on the management information of all content data; and a provision step of providing to the user content information that corresponds to the hobby information of the user based on the searched content data, and providing to the user music information based on the association between the music content, the sale content, and the introductory articles; and a display step of displaying the content information and the music information to the user via the display.

3. The content provision system according to claim 1, wherein the first system and the second system respectively include a management table for associating and managing content data, content identifying information for identifying the content data, and attribute information of the content data, and wherein the creation unit associates the first content data and the second content data, assigns a common content ID to the first content data and the second content data, and creates management information of all content data based on both the attribute information and the content identifying information.

4. The content provision system according to claim 1, wherein the management information of all content data manages whether content data has continuity, and wherein, if content information to be provided is content information of content data having continuity, the provision unit provides the content information to be provided and a message to the effect that the content information to be provided is content information of content data having continuity to a user.

5. The content provision method of a content provision system according to claim 2, further comprising:

a step performed by the first system and the second system of associating and managing content data, content identifying information for identifying the content data, and attribute information of the content data with their respective management tables, wherein, in the creation step, the first content data and the second content data are associated, a common content ID is assigned to the first content data and the second content data, and management information of all content data is created based on both the attribute information and the content identifying information.

6. The content provision method of a content provision system according to claim 2, wherein the management information of all content data manages whether content data has continuity, and wherein, in the provision step, if content information to be provided is content information of content data having continuity, the content information to be provided and a message to the effect that the content information to be provided is content information of content data having continuity are provided to a user.

* * * * *